US007181493B2

(12) United States Patent
English et al.

(10) Patent No.: US 7,181,493 B2
(45) Date of Patent: Feb. 20, 2007

(54) PLATFORM INDEPENDENT MODEL-BASED FRAMEWORK FOR EXCHANGING INFORMATION IN THE JUSTICE SYSTEM

(75) Inventors: Arthur V. English, Blue Bell, PA (US); David J. Roberts, Sacramento, CA (US); John C. Butler, Mt. Airy, MD (US); Joseph F. Riggione, New Hope, PA (US); Gautam A. Shah, Herndon, VA (US)

(73) Assignee: Unisys Corporation, Blue Bell, PA (US)

( * ) Notice: Subject to any disclaimer, the term of this patent is extended or adjusted under 35 U.S.C. 154(b) by 115 days.

(21) Appl. No.: 10/744,803

(22) Filed: Dec. 23, 2003

(65) Prior Publication Data
US 2005/0216555 A1  Sep. 29, 2005

(51) Int. Cl.
*G06F 15/16* (2006.01)
*G06F 7/00* (2006.01)

(52) U.S. Cl. .................. 709/204; 709/218; 707/100

(58) Field of Classification Search ............ 709/218, 709/201, 203, 204; 707/10; 705/1, 7
See application file for complete search history.

(56) References Cited

U.S. PATENT DOCUMENTS

| 6,199,195 | B1 * | 3/2001 | Goodwin et al. ......... 717/104 |
| 6,327,591 | B1 * | 12/2001 | Osborn et al. ............ 707/10 |
| 6,785,685 | B2 * | 8/2004 | Soetarman et al. ....... 707/101 |
| 2005/0015619 | A1 * | 1/2005 | Lee ..................... 713/201 |

OTHER PUBLICATIONS

Frank J. Antonicelli, III, Stover K. Clark, The County Justice Hub Solution, Mar. 2002, PA County Integration Project, County Commisioners Association of Pennsylvania.*

Birol Berkem, How to increase your business reactivity with UML and MDA? Goal Driven Development Patterns for Synchronizing IT with your Changing Business Environment, GOObiz, Goal Oriented Business.*

(Continued)

*Primary Examiner*—Rupal Dharia
*Assistant Examiner*—Chirag R Patel
(74) *Attorney, Agent, or Firm*—Lise A. Rode; Market Star Woodcock Washburn, LLP

(57) ABSTRACT

A platform independent model for exchanging information among numerous entities in a justice system with diverse system components is implemented in a hub and spoke arrangement. Each spoke includes a software agent that communicates with a system component of an entity of the justice system, translates from a common communication format to a communication format of the system component, and manages the timing of the flow of information to/from the system component. The hub includes an information broker that communicates with each agent in the common communication format, determines what information is needed by which entity, and routes the needed information to/from respective agents for the entities that need the information. The platform independent model includes a plurality of traceable and linked UML models that define the information broker from a business use case model through to a platform independent solution model for implementation on a given solution platform. Since these UML models are readily modifiable and traceable for changes to the justice system, they facilitate implementation of the system in a cost-effective manner from one customer to the next without requiring system redesign.

12 Claims, 76 Drawing Sheets

OTHER PUBLICATIONS

Frank J. Antonicelli III, et al. "The Country Justice Hub Solution" Mar. 2002, PA County Integration Project, County Commissioners Association of Pennsylvania.

Birol Berkem, "How to increase your Business Reactivity with UML and MDA?—Goal Driven Development Patterns for Synchronizing IT with your Changing Business Environment", GOObiz, Goal Oriented Business, © 2005 (version cited in ISR on Aug. 2, 2005).

* cited by examiner

FILE CHARGES

ADJUDICATION

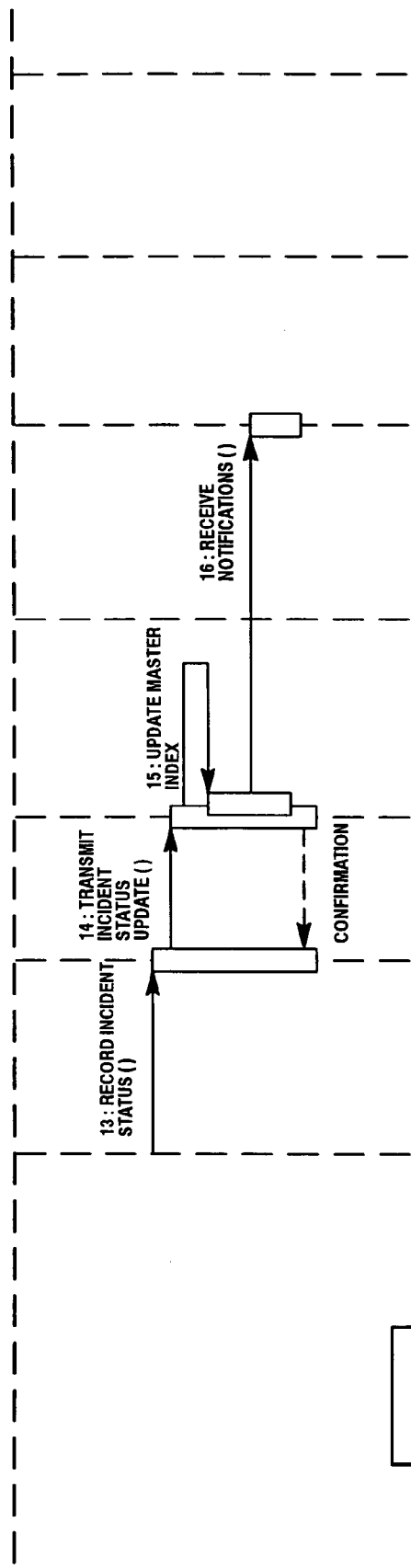
*Figure 31C*
*Figure 31*
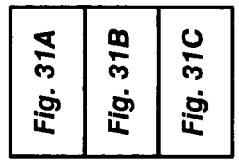

PLATFORM INDEPENDENT MODEL-BASED FRAMEWORK FOR EXCHANGING INFORMATION IN THE JUSTICE SYSTEM

FIELD OF THE INVENTION

The present invention relates to a platform independent, scalable, model-based framework for allowing both new and legacy systems to share information in a secure environment through a common user interface and, more particularly, to a model for a system that allows secure information sharing among users of the criminal and civil justice systems and the intelligence gathering communities.

BACKGROUND OF THE INVENTION

The need to share information among justice agencies through automation is a global issue that has been around for more than 30 years. Since the mid 1960s, the use of automation by law enforcement, courts, prosecution, and corrections proliferated without a real program or technology strategy. Over the years, the global justice community at the national, federal, state, provincial, and local levels created thousands of islands of data or "data pools." Unfortunately, none of these data pools can share data directly via electronic connections with other systems.

Historically, justice information sharing has occurred both vertically and horizontally. Within a city or a county, operational information has been manually shared among law enforcement, the jail, the prosecutor and the courts. Recently, some of this information has been shared electronically as a result of point to point interfaces developed between two systems. At the federal horizontal level, information may be shared between agencies such as the FBI, the Drug Enforcement Administration (DEA), the US Attorney's office, the Federal Courts and the Immigration and Naturalization Service (INS), although such federal agencies have not shared information well to date.

Vertically, information has been manually shared between local and state agencies. Criminal history and fingerprint information is sent to state agencies and entered into state repositories, which can be queried electronically. However, because the information sent to the state is often in paper form, the information contained in state repositories may be incomplete and inaccurate.

There has always been a need to share accurate information between justice agencies in real time and this need has historically been met only on a very limited basis. However, new technology and public demand have caused this need to evolve to include ever-broader amounts of information. The public has become more aware of crimes that could have been prevented if better information sharing systems had been in place and is demanding information sharing between different justice agencies across jurisdictional lines. In response to September 11th, The Patriot Act legalized the sharing of some types of intelligence information by law enforcement; this information was previously kept in standalone systems and not available for information sharing.

The advent of fingerprint scanning devices, digital photography and scanners also have created a demand for the ability to share biometric information; this need will continue to evolve as more forms of biometric technology are accepted and the need to integrate biometrics for increased accuracy and better access control becomes more acute.

The information sharing problem is not unique to any geography. It is a global issue, and some theaters are more prepared to deal with it than others. The events of 9/11 have increased the urgency of implementing integrated justice solutions at the state, local, national, and international levels.

Recently, government agencies have begun to invest in strategies for correcting the global issue of information sharing. There are several goals to be achieved by such automation, including:

First, for criminal justice practitioners, the notion of being able to track an offender through the justice process using an automated system with a single transaction is very desirable. The number of systems touched to locate an individual in the justice process sometimes counts in the twenties. The procedure for locating an individual can be very time consuming even if a user knows how to navigate multiple systems and has a good memory for transaction codes.

Second, as noted above, the need to more effectively share data horizontally and vertically in the justice and public safety community is critical and the problem has become a recognized priority among government leadership at all levels in all geographies: U.K. Prime Minister Tony Blair recently chaired a meeting of his key staff on the issue of data sharing in the justice community. In the wake of 9/11, such information sharing is clearly a priority of the United States government.

Third, justice and public safety agencies around the world have rigorous demands for ease of use, security, privacy, redundancy, scalability, and data sharing. These requirements are compounded by the need to share data while maintaining total control of the agencies' legacy systems. Only recently have technologies emerged that would allow secure information sharing to exist on the scale demanded by justice and public safety agencies.

To date, there have been several attempts to provide integrated justice solutions to address these needs.

iWay Software offers an Integrated Justice Suite that bridges hundreds of different information sources to message formats like XML using adapters that integrate with legacy systems and support network protocols such as FTP, HTTP, message oriented middleware systems, and SOAP-based (Simple Object Access Protocol) web services. Data collection documents of any format are converted to XML and transformed for use in the Microsoft.NET™ and Java™ J2EE™ architectures. iWay Software purports that its technology platform is open and platform independent in that it runs on a variety of hardware platforms and operating systems and works with a variety of application server or integration platforms including the IBM WebSphere Application Server, the Microsoft BizTalk™ Server 2003, and other integration platforms.

iway suggests that it may use Unified Modeling Language (UML) documentation to collect business requirements of its customers to help it understand the operation of its customers' systems; however, iway does not provide a platform independent model upon which it can build an Integrated Justice Information Sharing (IJIS) solution for either .NET™ or J2EE™. Instead, iWay provides a packaged software solution that includes components written in Java™ and J2EE™ that can interface with either .NET™ or J2EE™. Also, iway does not share UML system solutions diagrams with its customers or integrate UML into the modeling of the system hardware and software architectures iway further does not provide UML documentation that permits a system prepared for one platform, e.g., J2EE™, to be readily rewritten for another platform, e.g., .NET™. Moreover, the Integrated Justice Suite utilizes a peer-to-peer architecture for its "Intelligent Adapters" and does not use an integration broker that provides a scalable hub and spoke architecture. As a result, system integration and implementation of the iWay system are difficult.

Thinkstream, Inc. has developed a distributed information networking platform that also utilizes peer-to-peer technology to facilitate scaling for a large justice system application. Thinkstream uses integrators that translate data from the back-end source to an XML format that is understood by all parties on the network, and business logic pertinent to each individual data source can be embedded in the integrators. Each integrator also supports the functions of data query, push, pull, publish and subscribe. However, as with the iWay system, the peer-to-peer architecture makes system integration and implementation difficult. Also, since the Thinkstream system is proprietary and does not use UML documentation, portability of the Thinkstream system is limited.

Mobiam Solutions Inc. offers a Watchdog 360 system that is an enterprise platform optimized for criminal justice system integrations. The architecture is based on a hybrid of a peer-to-peer approach and a hub-and-spoke design for application integration. The hub-and-spoke element of the design provides a centralized master hub to manage a web portal for entry into the system, to create search requests across the attached systems and to provide a centralized point of entry for a subscription engine. On the other hand, the peer-to-peer element processes workflow from sub-hub to sub-hub where the responses are managed on a point to point basis and each sub-hub handles is own processing. The sub-hubs may be configured at the agency level to store the information related to the systems associated with that agency as well as business rules particular to the attached source systems. Adapters are deployed within the sub-hubs to act as the interfaces to the source applications. As with the iWay and Thinkstream systems, the architecture is based on XML standards and Sun's J2EE™ and Microsoft's .NET™ standards. However, the Watchdog 360 system is a proprietary system that is not documented using the UML standard, thereby making changes to the system difficult and limiting portability of the design for application to new systems. Also, the Watchdog 360 system does not include graphical user interface (GUI) tools for building and configuring workflows, designing message formats, or message transformation. The workflows must instead be coded in XML.

Cross Current has deployed a Justice Hub™ integration framework on a B2B technology framework, such as a Microsoft .NET™ platform, with query, notification, imaging and data transfer functionality enabled by adapters to criminal justice agency systems. The Justice Hub™ system includes a web portal, application adapters and a B2B hub that uses Microsoft BizTalk™ software to deliver information integration over the Internet using a hub and spoke architecture and XML technology. Interoperability with the criminal justice agency systems is provided by using public security standards and specifications. Application integration is provided by the BizTalk™ server's support of the BizTalk™ open industry standard for document exchange and routing. Each agency system involved uses an application-specific adapter to connect the system to the Justice Hub™, and the adapters package the extracted data into XML messages for the Justice Hub™ BizTalk™ server. While the standardized adapters may be reused for other agencies having similar data requirements and the same vendor systems, the system, though of open architecture, is not platform independent. The Justice Hub™ system also does not appear to provide business use cases to guide messaging operation. Moreover, as with the Watchdog 360 system, the Justice Hub™ system is not documented using the UML standard, thereby making changes to the system difficult and limiting portability of the design for application to new systems.

Thus, the Integrated Justice Information Sharing (IJIS) solutions offered to date either provide a peer-to-peer platform or fail to provide a truly portable solution (i.e., non-proprietary) with the appropriate documentation using the UML standard, for example.

There is thus a great need in the art for a documentable, model-based, portable, platform independent IJIS solution that allows multiple justice agencies to share information in a secure environment that enables individual agencies to maintain and retain control over legacy systems and data. In particular, an IJIS solution is desired that integrates multiple diverse justice systems using Enterprise Application Integration (EAI) technology to share mission-critical data, documents, images, and transactions at key decision points in the justice system and to push, pull, publish and subscribe information needed to support day to day justice operations. The present invention addresses these needs in the art.

SUMMARY OF THE INVENTION

The Integrated Justice Information Sharing (IJIS) solution framework of the invention addresses the above-mentioned needs in the art by providing a platform-independent model-based framework of reusable assets that will be used as the foundation to build a customized IJIS solution. This set of reusable assets is the Integrated Justice Information Sharing solution framework. The IJIS solution framework integrates multiple diverse justice systems using Enterprise Application Integration (EAI) technology to share mission-critical data, documents, images, and transactions at key decision points. The shared information must be accurate, timely and complete in a highly secure environment. In accordance with the invention, the information is accessible though a Web-based console that provides a common user interface and, by using distributed EAI integration broker technology, the IJIS solution framework of the invention provides guaranteed message delivery, message transformation to translate messages from one justice agency format to another justice agency's format, and business process workflow management.

In particular, the IJIS solution framework of the invention provides the following features:

- A cost-efficient integration architecture that is built using a commercial off-the-shelf (COTS) integration broker—as well as other COTS components (messaging, database, and security) that provide access to a diverse and extendable community of justice agency systems that have agreed to share data at local, state, national, and international levels.
- A Web-based user interface customized for the justice enterprise is provided whereby users will be able to query data using PCs and wireless handheld computers. Using the IJIS web-based user interface, the IJIS solution framework will be viewed as a virtual system by the user where information may be accessed from diverse sources such as the local law enforcement, courts and corrections criminal history records, the statewide warrants file, and the FBI National Crime Information Center (NCIC) without having to specify the location of the information source.
- Custom adapters, database adapters, message queues and publication services give justice agencies the ability to make critical shared data available to other justice agencies. The IJIS solution framework of the invention recognizes that many existing justice systems must be able to contribute to and benefit from the IJIS structure without losing control of their data and their ability to continue to provide the day-to-day operational support they were designed to provide.

The IJIS message infrastructure and the integration broker that executes it enable agreed-upon data from each agency to be "published." Individuals in participating agencies can "subscribe" to this published information using the IJIS web-based user interface. For example, when an arrest is recorded in law enforcement records management system, the IJIS solution framework of the invention notices the parole office responsible for the subject has subscribed to news of any arrest during the time of the subject's parole. The IJIS solution framework prepares a "notification" and sends it to the appropriate parole office.

IJIS business process management built using the integration broker business process designer enables business process workflow for automatically transferring information among agencies. For example, when a person is arrested, the Sheriff's information system may record arrest information. This information in addition to mug shot and fingerprint would need to be sent to the state criminal history repository. The IJIS solution framework of the invention "pushes" the information from the Sheriff's information system to the state criminal history repository.

The IJIS solution framework of the invention is configurable to the highest level of security possible. Secure access to the system is provided using a variety of measures including COTS software components, as well as custom security components. Strong authentication and encryption are used to only allow authorized users to access the system and to ensure that all communications within the IJIS environment are secure. Encryption will be 128-bit Secure Sockets Layer (SSL) or other 128-bit encryption. Strong authentication can be built using smart card technology or biometrics.

The IJIS solution framework of the invention implements both horizontal and vertical integration. In the horizontal dimension, the IJIS solution framework enables the sharing of information (but not limited to) among law enforcement, the court system, jail systems, probation and parole systems, wants and warrants systems, and criminal history repositories. For example, when the assistant prosecutor decides the specific charges that are to be filed, the prosecutor's information system prepares the charging document, digitally signs it, and pushes it to the court system. In the vertical dimension, the IJIS solution framework enables the sharing of information among local, state, national, and international justice agencies. When a person is arrested, the local law enforcement information system can pull information using personal-description data from state, national, and international criminal history records.

The integration broker toolset includes tools for administering, managing, and monitoring the IJIS solution framework of the invention. Every message in the system is logged. If a justice agency employee abuses the system, the event logging feature will help identify the offender as well as the abuse events.

The IJIS solution framework of the invention eliminates redundant data entry. Current justice systems work in autonomous isolation. In many cases, the only information exchange between justice agencies is still paper. Using the push technology of the invention, the IJIS solution framework can provide one time data entry where information is entered once in the system and automatically pushed through the justice system as the criminal case moves through the criminal justice process.

The messaging infrastructure built using the integration broker is standards-based XML. Whenever possible, the XML messages are based on the XML schemas developed by integrated justice standards groups such as the OASIS LegalXML Integrated Justice technical committee and the Global Justice Information Network.

The IJIS solution framework includes supporting business use case, business object, system use case, analysis, platform independent design, platform specific design, and deployment models.

To provide these capabilities, the IJIS solution framework enables secure electronic exchange of information without compromising individual justice agency authority, independence, budgets, organization, and technology infrastructures. To accomplish these goals, the IJIS solution framework of the invention focuses on information exchange, while establishing a portable, platform independent enterprise architecture and technical platform for building an integrated workflow solution.

The tools for developing the IJIS solution framework of the invention include three major components: the IJIS Technology Blueprint, the IJIS EAI Foundation, and the IJIS Reference Solution. These components provide the necessary documentation for the IJIS solution framework of the invention to be made portable and platform independent. In particular, in accordance with the IJIS solution framework of the invention, a software blueprint is created according to the Unisys Business Blueprints™ process and the Rational Unified Process™ (RUP) as described, for example, in U.S. Pat. Nos. 09/834,357 and 10/457,250. A blueprint, as defined therein, is a collection of artifacts that enable the automation of one or more business processes. Each artifact documents one or more aspects relating to a business process and/or the design, implementation or deployment of software relating to those business processes. To begin a process of automating a business process, a blueprint that is preconfigured for a particular industry is typically selected from a set of blueprints. The selected blueprint can then be customized for a particular application by changing, adding or deleting artifacts, changing relationships between artifacts, and the like. In addition, artifacts and blueprints may be interchangeable and customizable, thereby enabling the blueprint to be used for a wide variety of business processes.

The IJIS solution framework of the invention developed using the Unisys Business Blueprints™ process thus comprises a platform independent model for exchanging information among numerous entities in a justice system with diverse system components. Such a system in accordance with the invention includes a plurality of software agents, each software agent communicating with a system component of an entity of the justice system, translating from a common communication format to a communication format of the system component of the entity, and managing the timing of a flow of information to/from the system component of the entity, and an information broker that communicates with each agent in the common communication format, determines which information is needed by which entity, and routes the needed information to/from respective agents for the entities that need the information. In accordance with the invention, the information broker is defined by a plurality of traceable and linked UML models including a business use case and object models for the justice process, system use case, analysis, and a platform independent solution model for implementation of the system on a given solution platform. Preferably, the common communication format is an XML format. The information broker further provides an interface to an entity that enables an entity to query other entities in the system for certain information relating to an individual and/or an event. The information broker so configured enables data to be pushed, pulled, published and subscribed to in accordance with user needs.

The IJIS solution framework of the invention also includes a method of creating a platform specific system from the platform independent model for exchanging information among numerous entities in a justice system with diverse system components. Such a method in accordance with the invention comprises the steps of creating a plurality of software agents, each software agent communicating with a system component of an entity of the justice system, translating from a common communication format to a communication format of the system component of the entity and managing the timing of a flow of information to/from the system component of the entity for implementation on a given solution platform. In accordance with the method, the UML models are implemented on the given solution platform as the platform specific system including the information broker. The information broker, as so implemented, communicates with each agent in the common communication format, determines what information is needed by which entity, and routes the needed information to/from respective agents for the entities that need the information. The method of the invention also includes the step of providing an interface to an entity that enables the entity to query other entities in the justice system for certain information relating to an individual and/or an event.

The step of creating a plurality of traceable and linked UML models defining the information broker in accordance with the invention includes the steps of creating a software infrastructure model, creating a hardware infrastructure model, creating a business use case model, creating a platform independent model, and creating a platform specific model that are modifiable and traceable for changes to the justice system. The step of creating a plurality of traceable and linked UML models defining the information broker may also include the step of creating a business object model, a use case model, and/or an analysis model for the justice system.

These and other benefits and advantages of the invention will become more apparent from the following detailed description of the invention.

BRIEF DESCRIPTION OF THE DRAWINGS

An integrated justice information system (IJIS) solution framework in accordance with the invention is further described below with reference to the accompanying drawings, in which.

DETAILED DESCRIPTION OF ILLUSTRATIVE EMBODIMENTS

A detailed description of illustrative embodiments of the present invention will now be described with reference to FIGS. 1–48. Although this description provides detailed examples of possible implementations of the present invention, it should be noted that these details are intended to be exemplary and in no way delimit the scope of the invention.

It should be understood that the methodology disclosed below can be implemented with the aid of software development tools that execute on a computing device. Such software development tools may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Overview of Criminal Justice System

Figures 1, 1A:
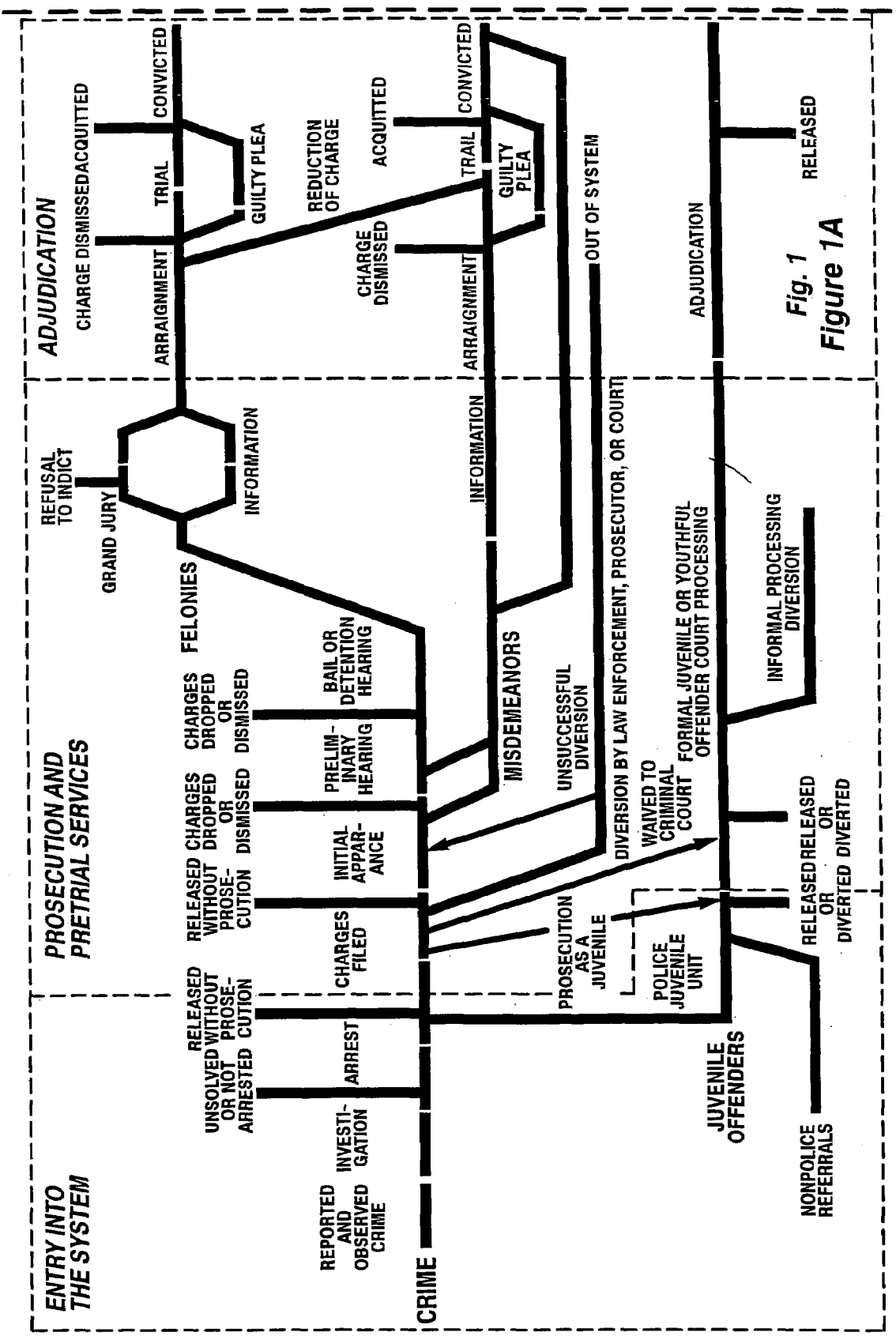
FIG. 1 illustrates the U.S. Department of Justice System Model from which a business use case model of the U.S. Criminal Justice System may be derived in accordance with the invention.
Figure 1B:
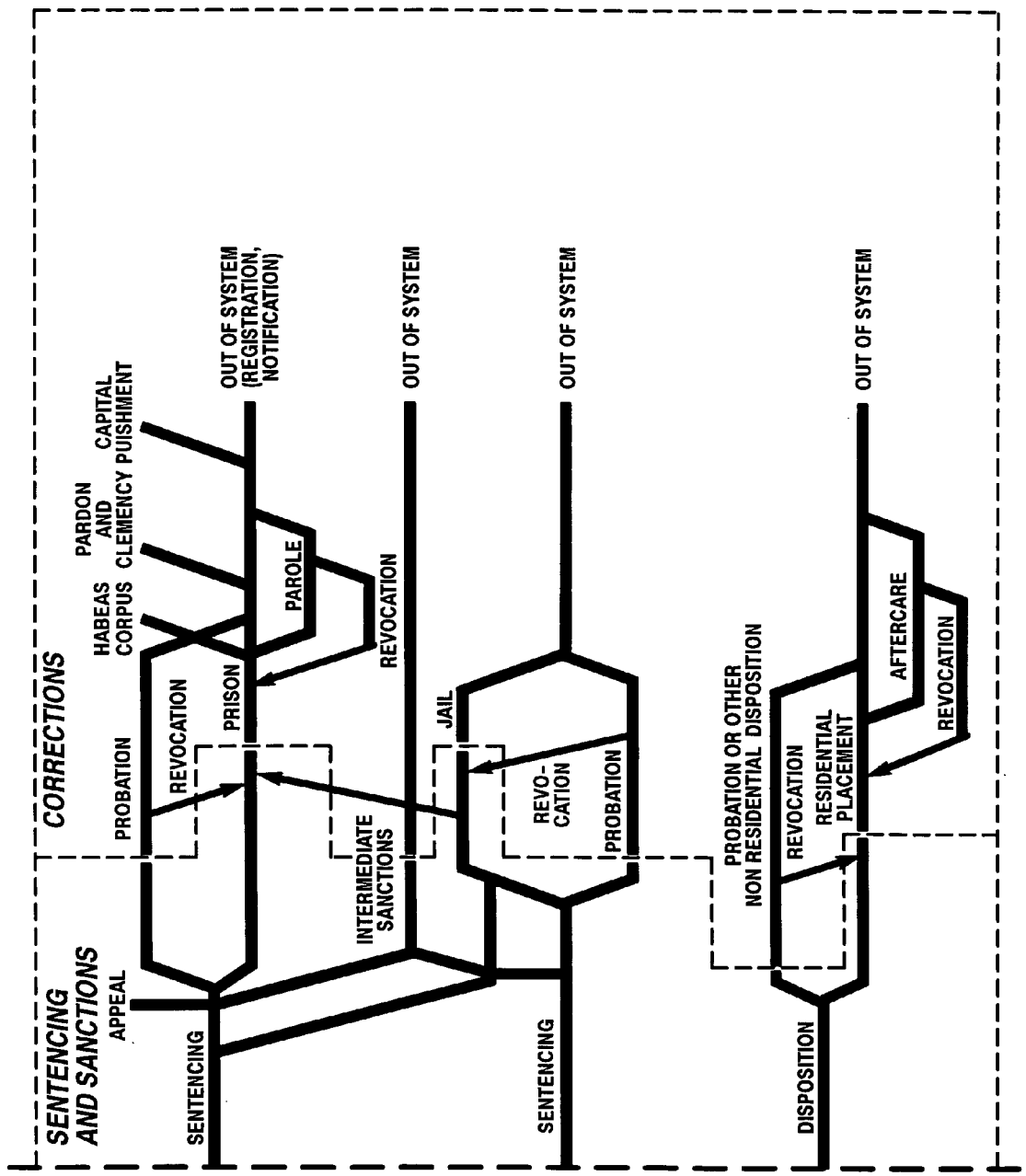

While the present invention is specifically designed to accommodate the civil justice system and intelligence gathering applications, a preferred embodiment of the invention is an IJIS solution framework for the criminal justice system. In an illustrative embodiment, the IJIS solution framework use case model has only one use case, namely, the criminal justice process. The criminal justice process has numerous processes and actors that participate as victims, witnesses, criminals, and other justice and non-justice governmental agencies that provide information or get information about crimes and all of the individuals, property and events involved. As will be explained in more detail below, a business use case model of the criminal justice system has been designed in accordance with the invention to set forth the intended functions of the IJIS solution framework for the criminal justice system. To understand the business use case models, one must first understand how the criminal justice process works. FIG. 1 illustrates the U.S. Department of Justice System Model from which such a business use case model may be derived in accordance with the invention, while FIG. 2 illustrates a top level activity diagram for the criminal justice process business use case using the DOJ System Model of FIG. 1 as a guide.

Figure 2:
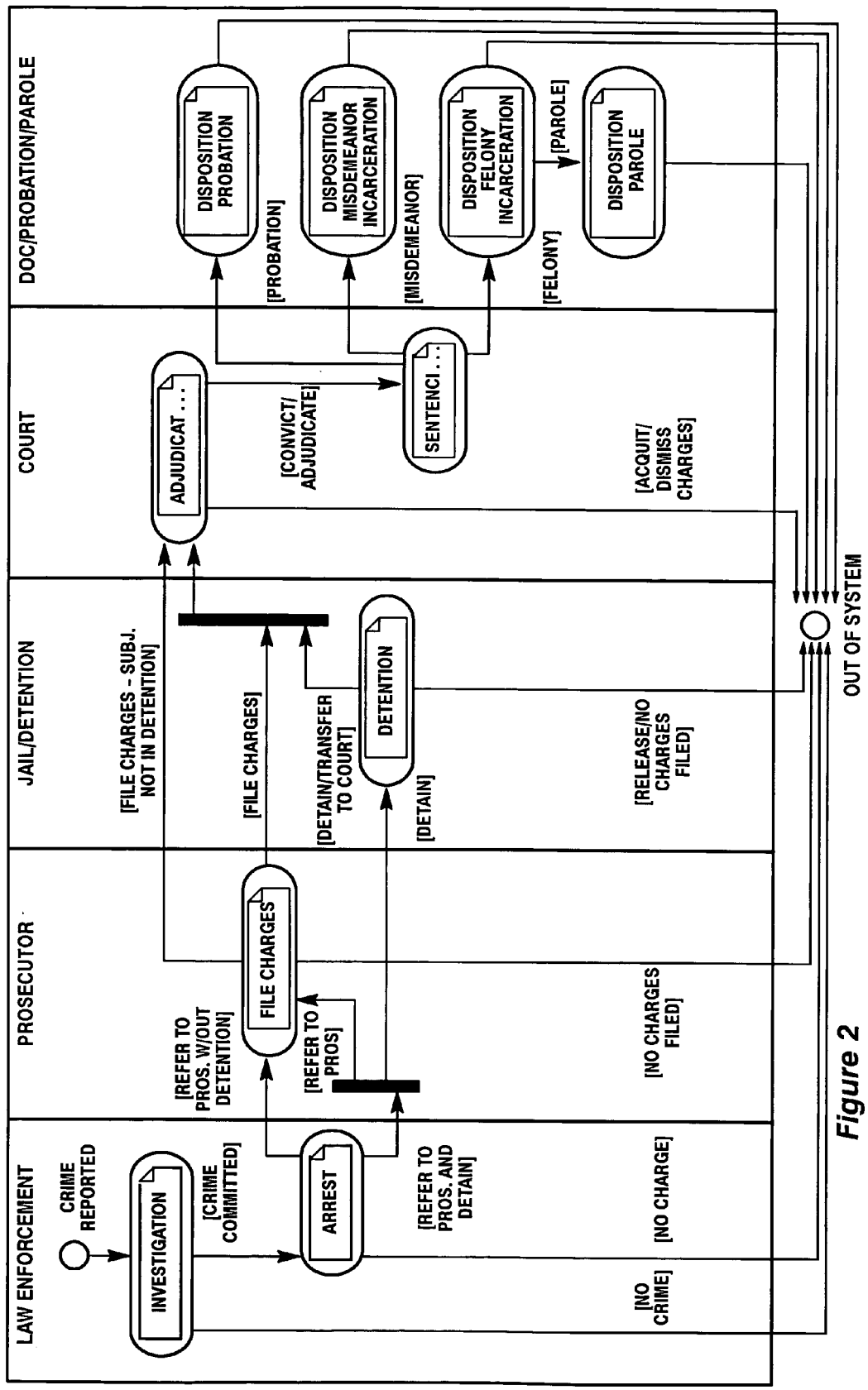
FIG. 2 illustrates a top level activity diagram for the criminal justice process business use case using the DOJ System Model of FIG. 1 as a guide.

As is apparent from a review of FIGS. 1 and 2, the criminal justice system is quite complex and has many actors that use the system at the time a crime is committed and during entry into the criminal justice system, prosecution and pretrial services, adjudication, sentencing and sanctions, and corrections. The IRIS solution framework of the invention is designed to permit the exchange of information among the police officers, courts, government and non-government agencies, and individuals who exchange information at various stages of the criminal justice process. As will be explained in more detail below, the activity diagram of FIG. 2 is broken into numerous detailed activity diagrams in order to implement the IJIS criminal justice process business use case in accordance with the invention. For example, detailed activity diagrams detailing the critical information exchange among the parties to the IJIS system as well as the XML document messages that would be exchanged will be explained below for the following activities: investigation, arrest, booking, filing of charges, detention, adjudication, sentencing, probation, misdemeanor incarceration, felony incarceration, and parole.

IJIS System Overview

The Integrated Justice Information Sharing (IJIS) system of the invention is intended to provide information sharing amongst the users of the criminal justice system whereby the shared information is accurate, timely and complete, and maintained in a highly secure environment. The IJIS system is designed to be reusable from one customer to the next. The IJIS system must integrate multiple diverse justice systems using Enterprise Application Integration (EAI) technology to share mission-critical data, documents, images, and transactions at key decision points. The information is accessible though a web-based console that provides a common user interface while providing guaranteed message delivery, message transformation to translate messages from one justice agency format to another justice agency's format, and business process workflow management. A listing of IJIS system features is set forth above.

To provide these capabilities, the IJIS system should enable secure electronic exchange of information without compromising individual justice agency authority, independence, budgets, organization, and technology infrastructures. Moreover, to enhance portability of the IJIS system is also designed to include a portable, platform independent enterprise architecture and technical platform.

Figure 3:
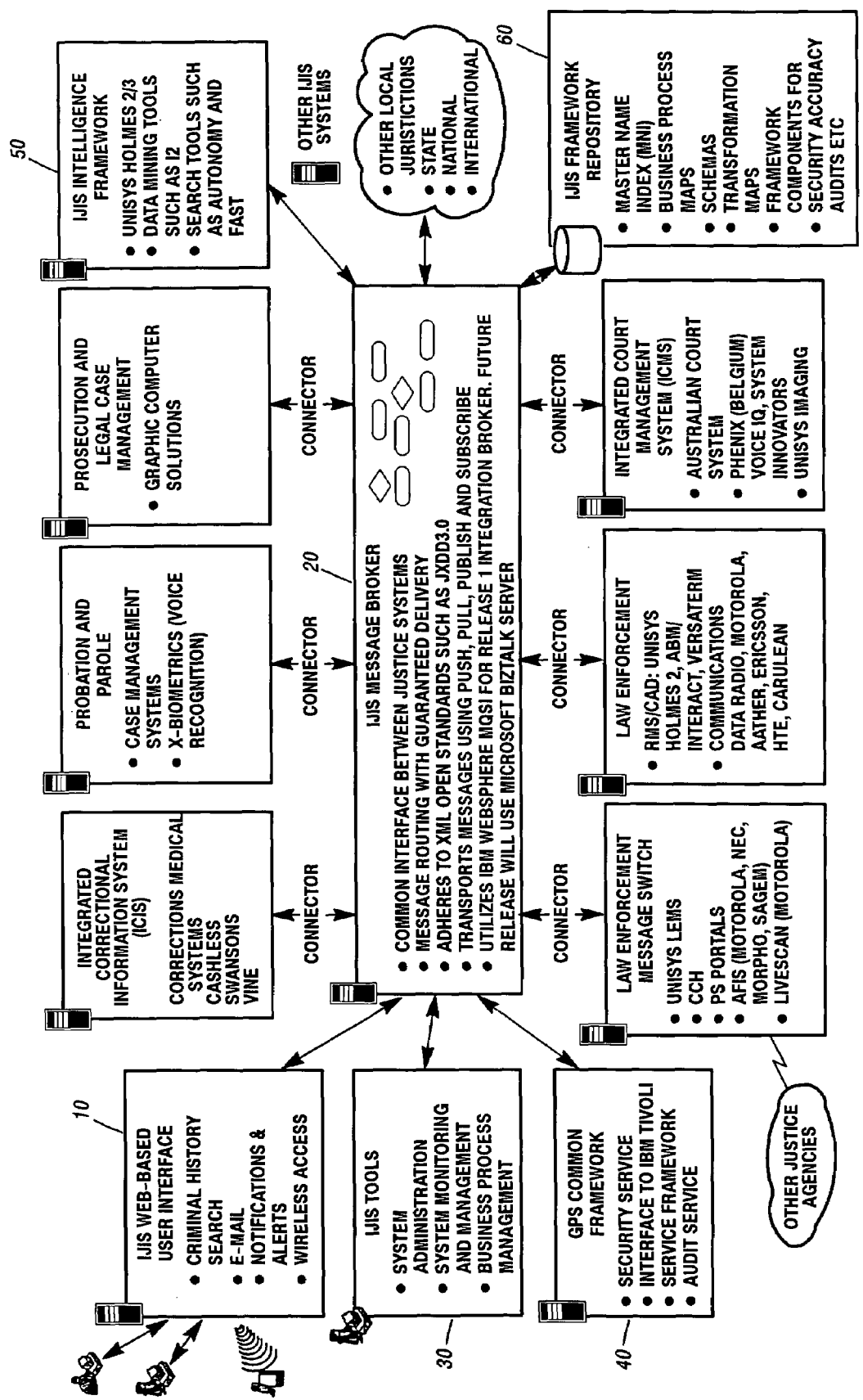
FIG. 3 illustrates a high-level view of the IJIS system architecture in accordance with the invention.

As illustrated in FIG. 3, the main components of the invention include a web-based user interface 10, an IJIS message broker 20, an integration broker toolset 30, and a Global Public Sector (GPS) Common Framework 40. Other IJIS system components such as an Intelligence Framework 50 and IJIS Framework Repository 60 may also be provided, but such systems are not described herein. The remainder of the systems illustrated in FIG. 3 may be existing legacy systems or new systems designed to work with the IJIS system of the invention. These systems are not part of the invention and thus will not be described further herein.

The web-based user interface 10 provides access to the wide variety of information sources that are connected to the IJIS solution framework of the invention. The web-based user interface 10 provides access to users connected to the justice intranet, as well as wireless connectivity for handheld devices such as PDAs and smart phones. The web-based user interface 10 does not replace or impact legacy client access. Instead, it provides a new user interface for performing queries and managing justice information. Thus, the user views the IJIS solution framework of the invention as a virtual system where information is accessed from diverse sources without having to specify the information source.

The IJIS message broker 20 is the information hub that provides a common interface for connecting justice agency systems. The IJIS message broker 20 runs in a secure environment enforced by strong authentication, 128-bit encryption, and digitally-signed certificates. The IJIS message broker 20 also provides guaranteed message delivery. All infrastructure of IJIS message broker 20 is XML-based with the ability to transform messages from one XML format to another. Business process management is also provided by the IJIS message broker 20. Using business process schedules built using tools like IBM WebSphere Business Integration Workbench; the IJIS message broker 20 runs business process workflows capable of retrieving and sending messages to message queues such as IBM MQ, managing a transaction state such that either all actions within a transaction are performed or none of the actions are performed, executing business rules and making decisions based on rule scripts defined in business process schedules, interfacing with IJIS framework security, notification-alert, and accuracy audit components, transforming messages from one XML format to another XML format, and interfacing with legacy applications and data sources using integration broker connectors.

The Integration Broker Toolset 30 provides tools for system administration, monitoring, and management; defining message format and message transformations; designing business process workflows; and building custom application connectors. All integration broker metadata models, business process schedules, XML schemas and transformation maps are stored in an integration broker repository.

The Global Public Sector (GPS) Common Framework 40 is a set of components that provide a security service, service framework, and audit service. The Security Framework Service supports authorization and authentication functionality in applications for various industries and also supports management and operational functionality. The Security Framework Service promotes platform (e.g. J2EE™, .NET™ independence of the framework service and leverages the native security capabilities (e.g. JAAS, .NE™ Security) of the respective platforms as much as possible to satisfy application security requirements. The Security Framework Service provides an API that enables the calling program (client) to perform both administrative and operational security related functions. The administrative part of the API allows creating a custom administrative user interface client. The Security Framework Service also uses COTS product(s) to provide authentication for multiple application from the same or/and different vendors and single sign-on functionality. In a particular implementation, the IJIS system of the invention uses IBM Tivoli as the COTS security toolset that the Security Framework Service is built upon.

Figure 4:
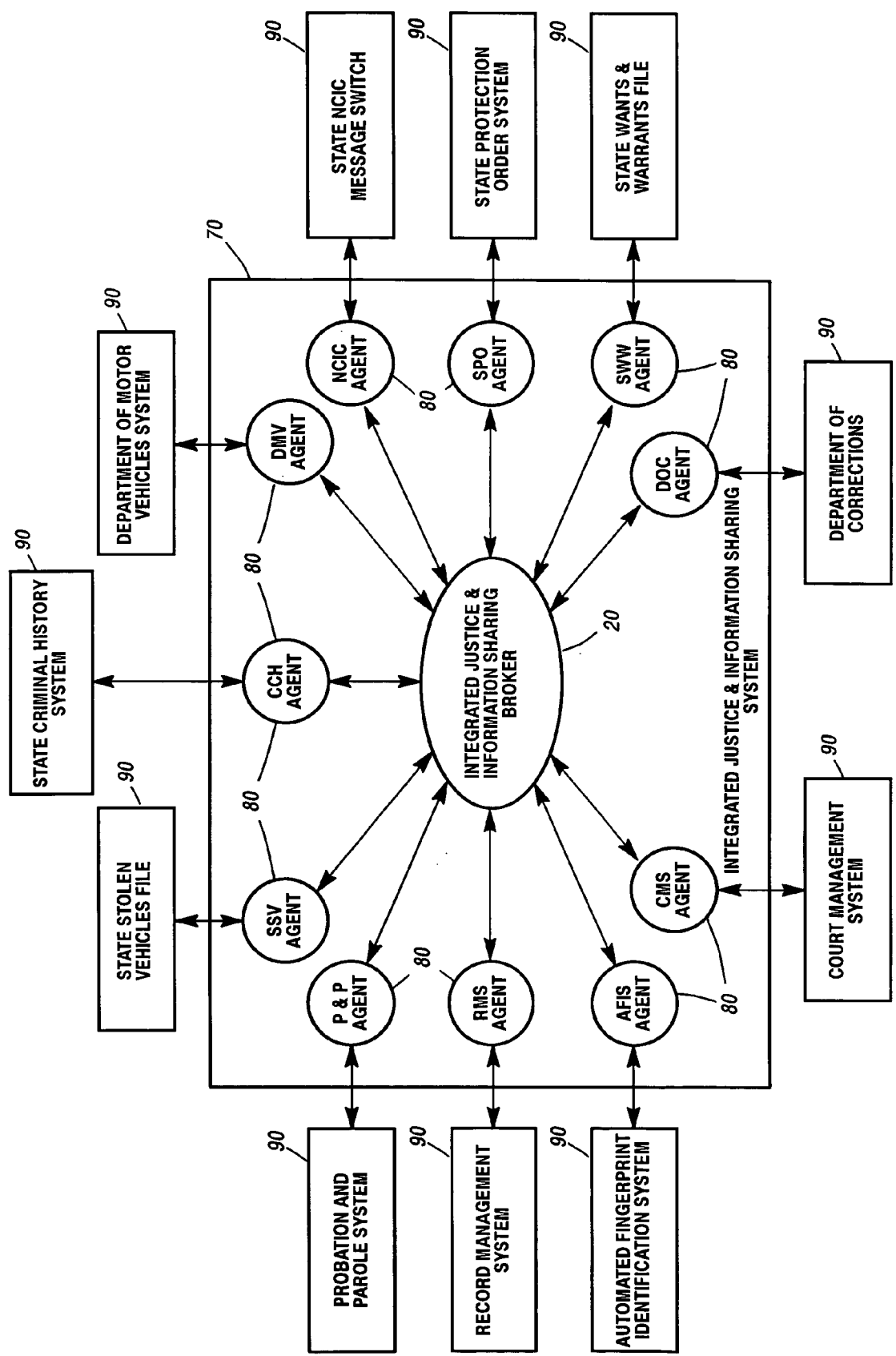
FIG. 4 illustrates the hub-and-spoke architecture of the IJIS system of the invention whereby the IJIS message broker is the hub and the respective adapters/agents are the spokes that provide interfaces to the respective agency systems.

In accordance with the invention, it is desired that the IJIS system 70 be implemented in a hub-and-spoke architecture where the IJIS message broker 20 acts as a central integration broker which serves as a conduit for information that is shared among various justice agencies. As shown in FIG. 4, the IJIS message broker 20 is the hub of IJIS system 70 while the respective adapters/agents 80 are the spokes that provide interfaces to the respective agency systems 90. As will be explained in more detail below, the respective adapters/agents 80 serve to convert messages from the respective agency systems 90 into XML messages that are processed by the IJIS message broker 20 and provided to other adapters/agents 80 for conversion into the formats of the receiving agency systems 90, retrieve and send information to the agency systems 90 depending on query, push or pull requests from the IJIS message broker 20, and listens for events happening in associated agency systems 90. IJIS message broker 20 further enables system functions such as authorization and authentication security functions, provides a web based user interface that provides the ability to perform queries to the respective components of the IJIS system 70, enables agency administrators to subscribe to events happening in the justice domain, provides means to setup notification delivery preferences for notification, receives all event information published by the respective agency systems 90, stores push information rules and workflow definitions to push information to agency systems 90, audits all information exchanges that go through IJIS message broker 20, and provides other central administrative functions. The IJIS message broker 20 and adapters/agents 80 communicate with each other through web services using SOAP messages that are transported, for example, on message queues such as IBM MQ Series. Those skilled in the art will appreciate that adapters/agents 80 are not necessary if the IJIS message broker 20 can understand the messages (e.g., SOAP messages) and requests delivered to it from particular agency systems 90. The IJIS message broker 20 may also communicate with individual users via Internet browsers as well as other external software applications that are web-services clients (and understand SOAP protocol).

As illustrated in FIG. 4, there may be various types of adapters/agents 80 such as State NCIC Agent, State CCH Agent, Wants and Warrants Agent, Probation and Parole Agent, etc. As the names of these agents suggest, they correspond to each of justice agency systems 90. The underlying agency system 90 could be of various platform types such as COM/DCOM, J2EE™, Client Server system including a relational database management system (RDBMS), etc. Adapters/agents 80 include adapters that perform this interaction and may by varied depending on the platform type of the agency system 90. These adapters could be custom developed or COTS packages could be used. The adapters/agents 80 are also responsible for transforming the information format of the agency system 90.

Unisys Business Blueprints™ Process

In accordance with the IJIS solution framework of the invention, a software blueprint is created according to the Unisys Business Blueprints™ process and the Rational Unified Process™ (RUP). The blueprint process builds upon the concept of business use cases as defined in U.S. patent application Ser. No. 09/834,357, assigned to the present assignee and the contents of which are hereby incorporated by reference in its entirety. That patent application discloses a methodology for developing software based on a business process by decomposing the business process level by level until the process has been decomposed into the low-level constructs needed by programmers to implement the software. When designing the software, the software developers use software development tools to create a visual model of the artifacts of software systems that have been specified in the Unified Modeling Language (UML). In order to use such a visual modeling tool to assist in designing the software, a set of "use cases" are developed. As used herein, a "use case" is a specific instance of the use by an actor of the software under development. Within UML, a "use case" is formally defined as a collection of classes, interfaces, and other elements that work together to provide some behavior that is greater than the behavior represented by the sum of the parts and that yields an observable result to one or more actors. In order to use the software development tools, software developers create a set of use cases that define various instances of the software that has been specified by business planners and the like. Based on the defined use cases, the software developers create the code to implement the various use cases.

U.S. patent application Ser. No. 10/457,250, also assigned to the present assignee and the contents of which are hereby incorporated by reference in its entirety, describes a system and method whereby software blueprints are used to provide a traceable software solution. A blueprint, as defined therein, is a collection of artifacts that enable the automation of one or more business processes. Each artifact documents one or more aspects relating to a business process and/or the design, implementation or deployment of software relating to those business processes. To begin a process of automating a business process, a blueprint that is preconfigured for a particular industry is typically selected from a set of blueprints. The selected blueprint can then be customized for a particular application by changing, adding or deleting artifacts, changing relationships between artifacts, and the like. In addition, artifacts and blueprints may be interchangeable and customizable, thereby enabling the blueprint to be used for a wide variety of business processes.

When using such a blueprinting process to design software, the artifacts that relate to business processes that are being automated are used as a guide for a programmer to create a business software solution. The business software solution is then implemented using a hardware infrastructure using any type of hardware that is appropriate to the automated business process. Preferably, the artifacts reference each other in order to provide traceability for design decisions. For example, a use case may be created to model a certain process and an artifact relating to that use case and an artifact relating to the business process that the use case is designed to model may reference each other. Then, if the business process changes, the artifacts will indicate that the use case may need to be changed as well, thereby propagating the change to the business process throughout the business software solution.

As described in U.S. patent application Ser. No. 10/457, 250, a software blueprint includes cross-referenced artifacts that together define a business software solution. Several different types of artifacts may be associated with a blueprint, such as a "business use case model" defining the business vision and operations model of the business software solution, a "business process model" including higher-level abstractions that describe an organization, its processes, components, applications and infrastructure, a "functional/application model" describing key business functions implemented as a set of architectural models in UML representing core business services, and an "infrastructure model" setting forth key hardware and software functional services that are provided to all applications in the organization. The particular artifacts used in blueprinting a particular business software solution may vary from solution to solution.

Blueprint for Integrated Justice Information Sharing System

It is desired to implement an Integrated Justice Information Sharing (IJIS) system using the blueprinting process described above and in the afore-mentioned patent applications in order to develop an IJIS solution framework that addresses the shortcomings of the afore-mentioned prior art systems. In particular, by using the software blueprinting process to develop the IJIS system 70, the resulting system is fully documented with UML so that it is traceable to facilitate changes and may be readily designed to have the desired design implementation (e.g., hub-and-spoke) while also being platform independent, thereby facilitating reproducibility from one customer to the next without sharing customer proprietary information. The IJIS system 70 of the invention has been designed using this blueprinting process, and the artifacts defining the IJIS system 70 will be described in detail below. Those skilled in the art will appreciate that these artifacts collectively provide a blueprint for implementing the IJIS system 70 of the invention.

Figures 45, 45A:
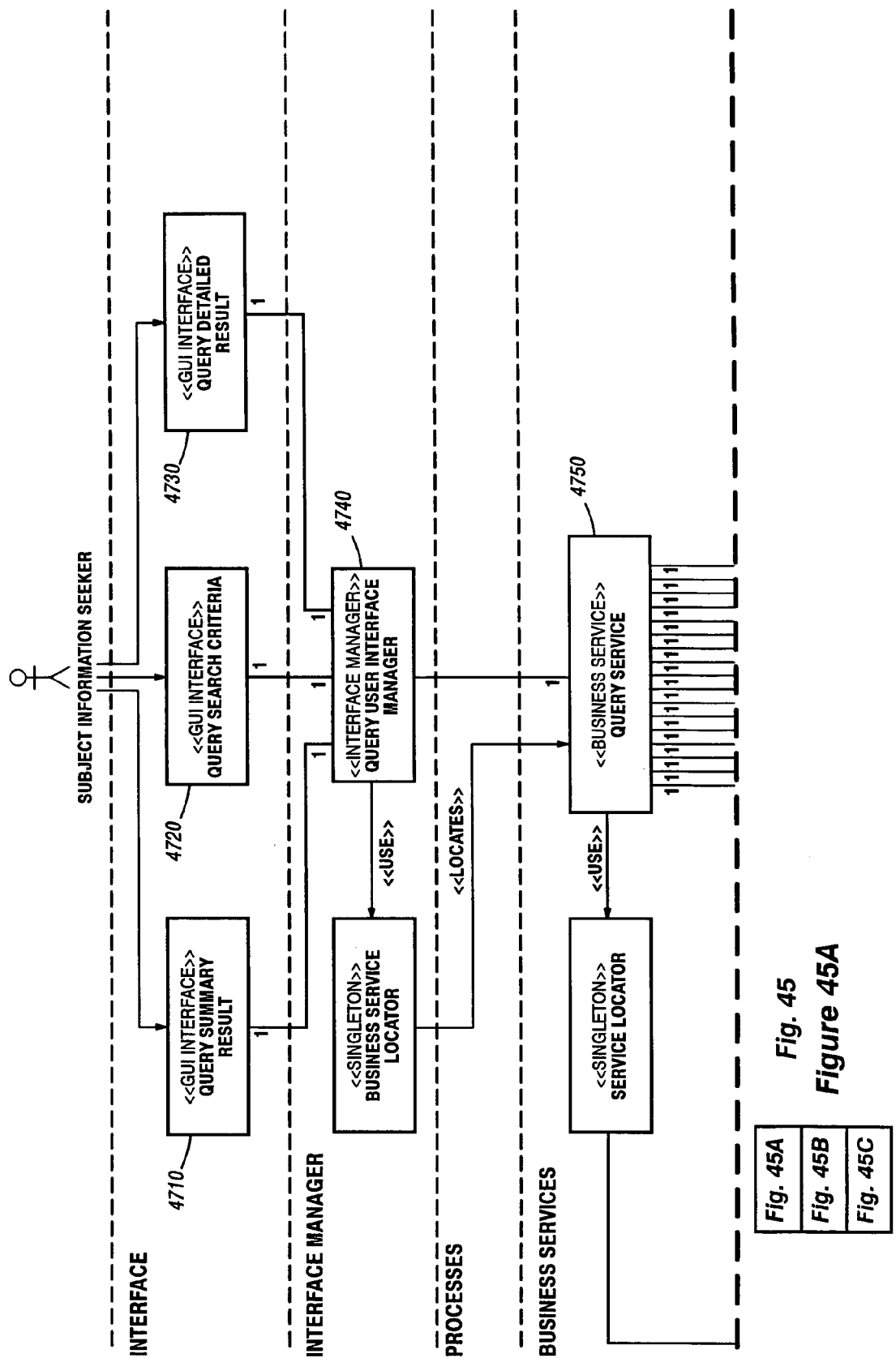
FIG. 45 illustrates the IJIS message broker-view of elements of the platform independent model for the Query functionality.
Figures 45, 45B:
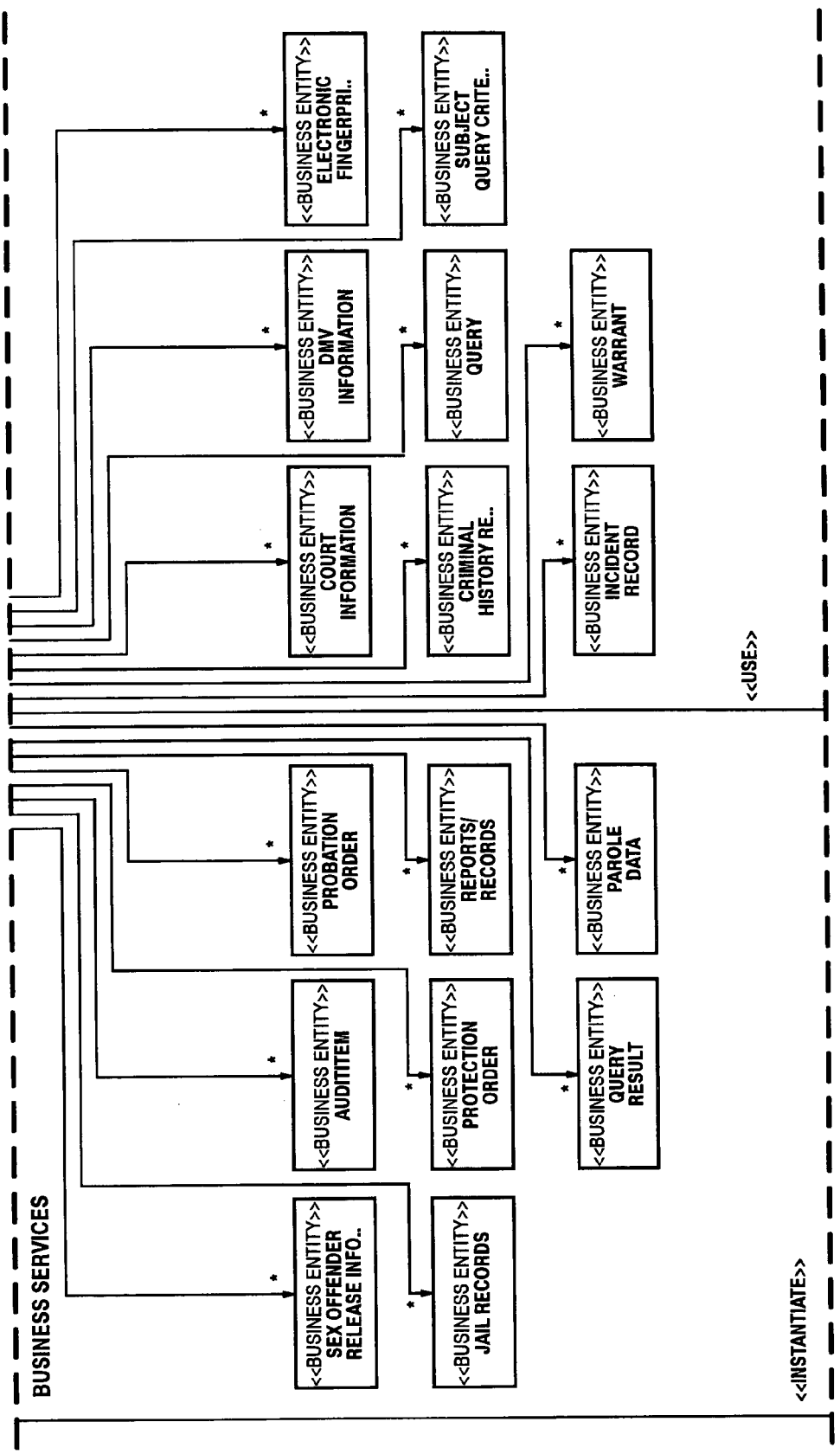
Figures 45, 45C:
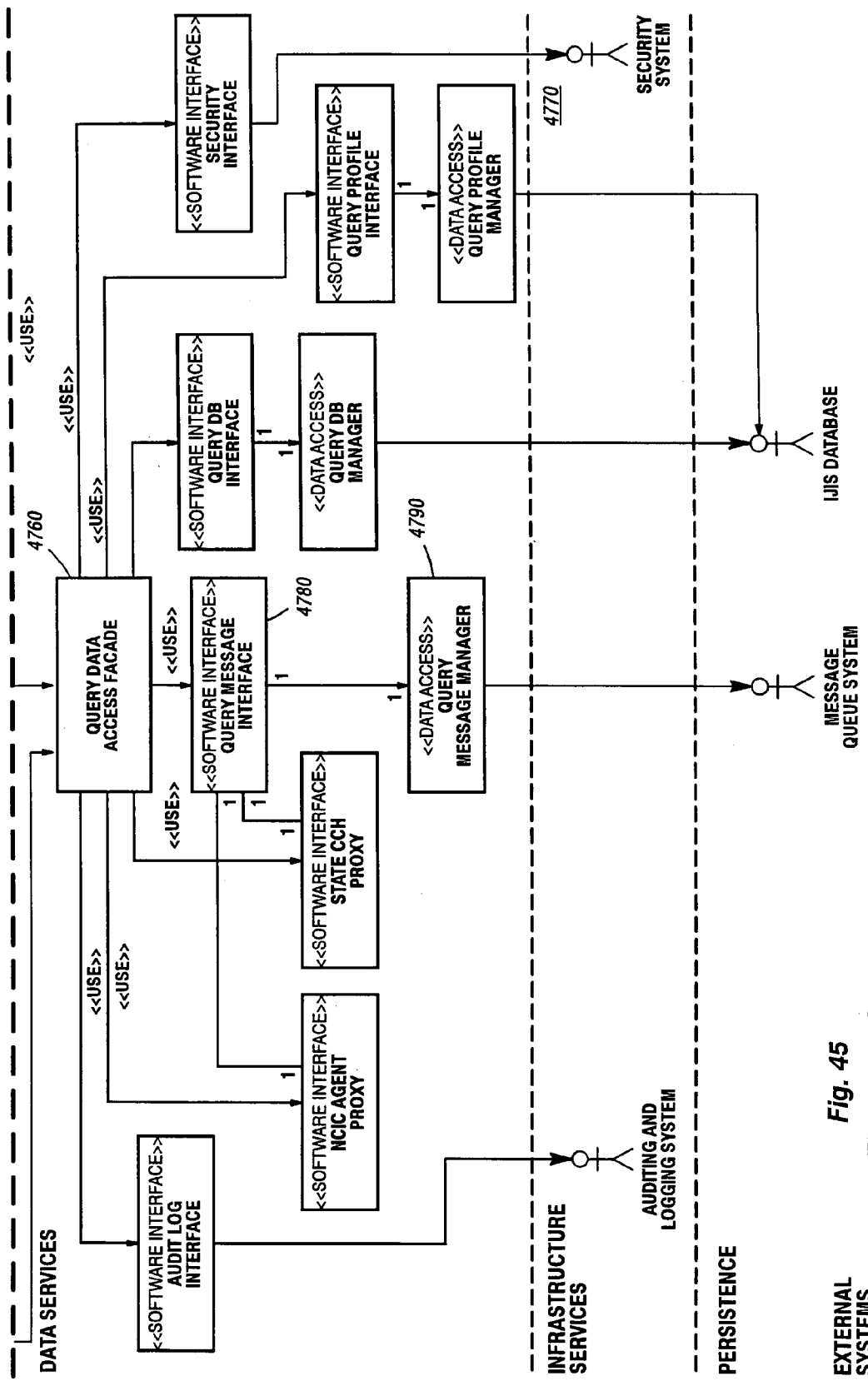
Figure 46:
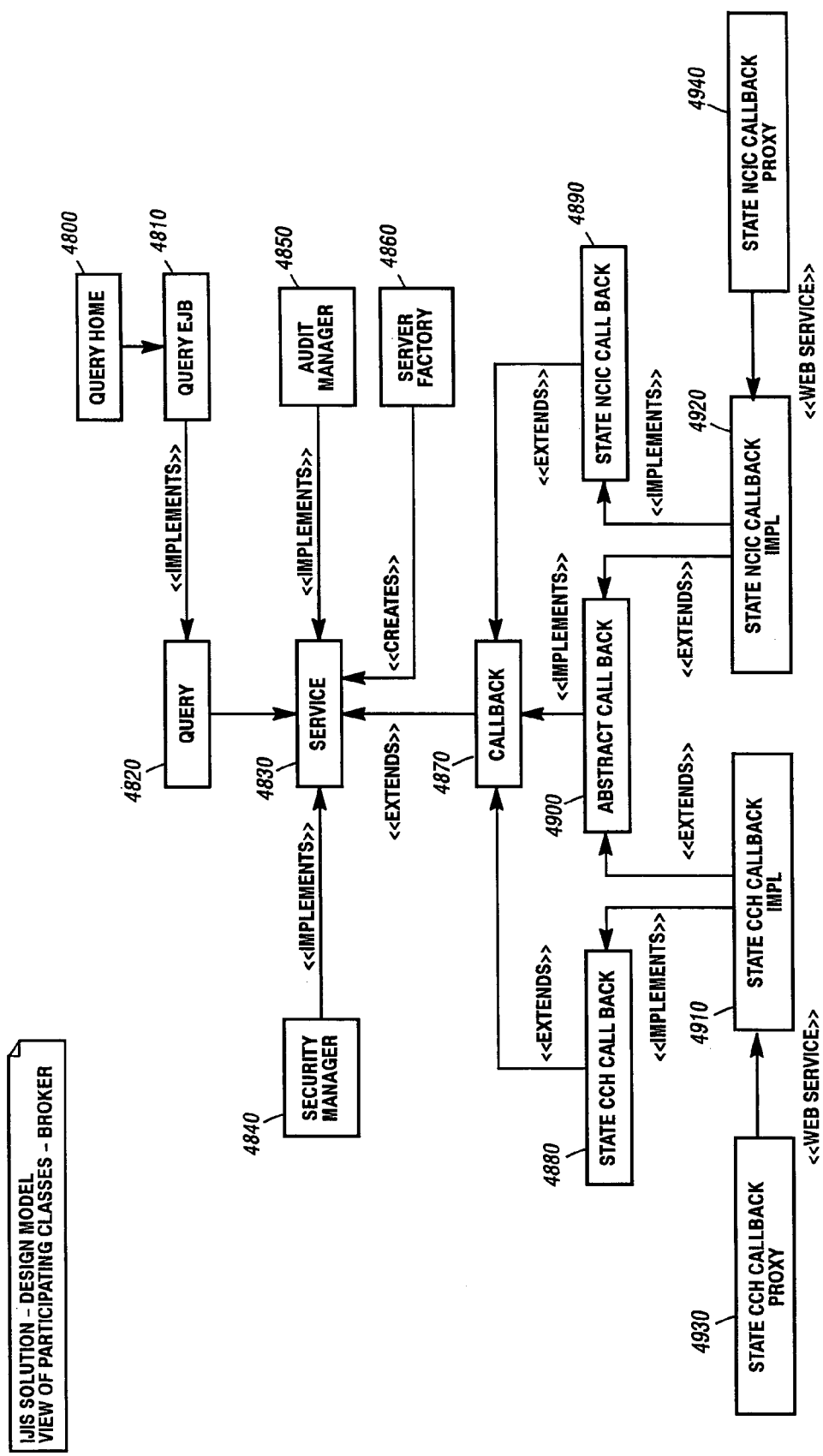
FIG. 46 illustrates a platform specific model (PSM) illustrating a view of specific classes for the query functionality of the IJIS message broker implemented on the J2EE™ platform.
Figure 47:
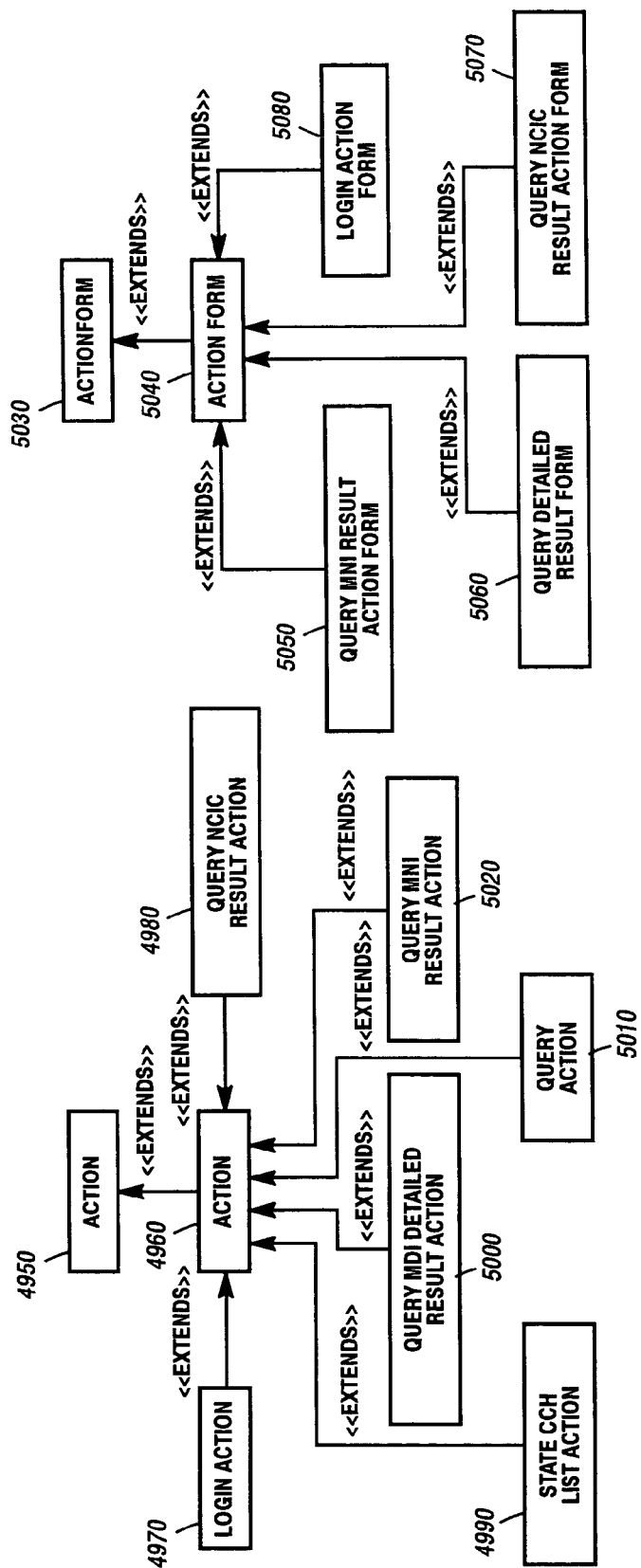
FIG. 47 illustrates the PSM interface for the STRUTS Action class of Java™
Figure 48:
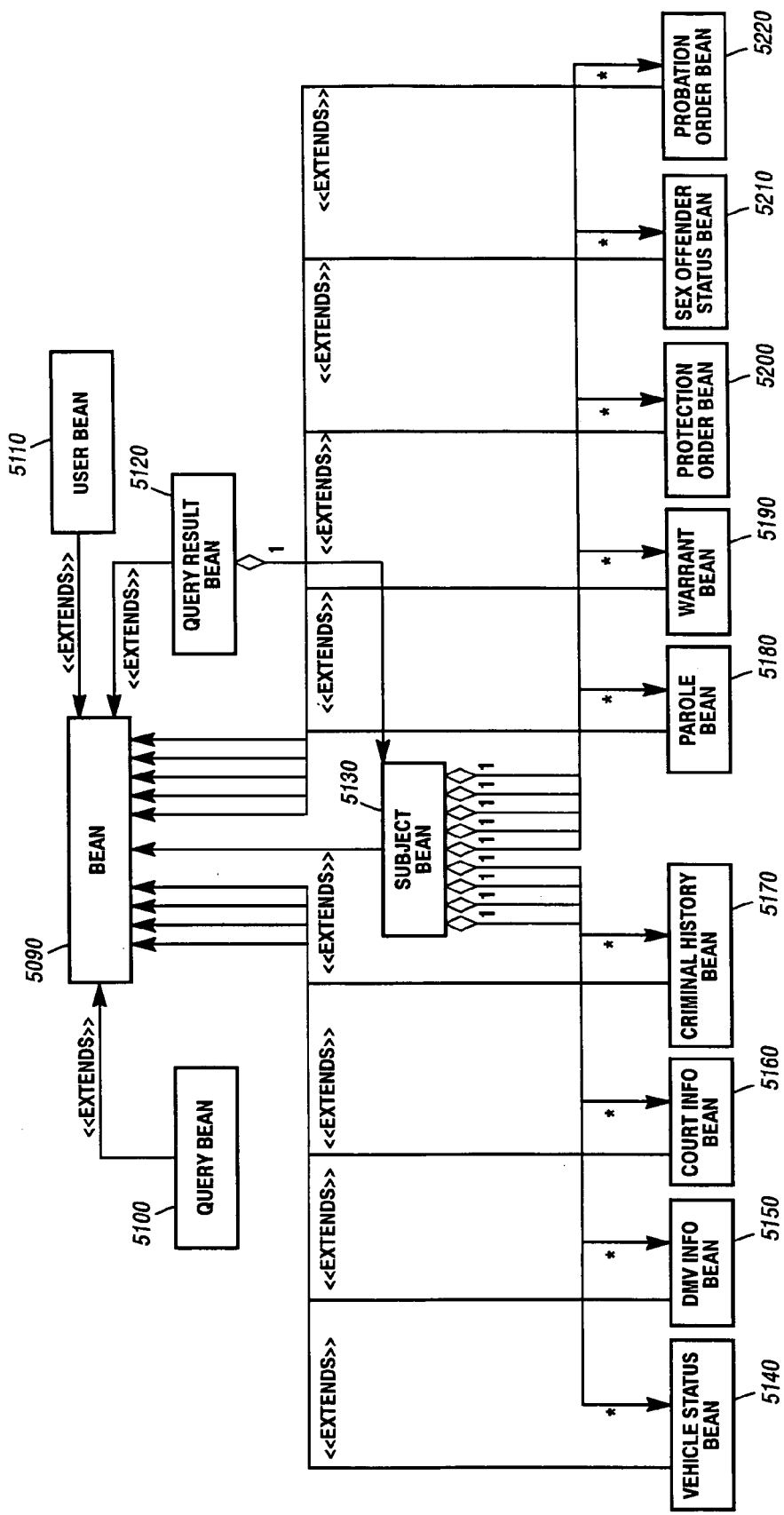
FIG. 48 illustrates generic behavior of a Value Object in a Java™ bean provided to query bean, user bean, query result bean, and subject bean in a PSM.

The artifacts used to describe the IJIS system 70 of the invention include the software infrastructure model (FIG. 5), hardware infrastructure model (FIGS. 6–17), Business Use Case Model (FIGS. 18–28), Business Object Model (FIGS. 29–35), Use Case Model (FIGS. 36–39), Analysis Model (FIGS. 40–42), Platform Independent Model (FIGS. 43–45), and Platform Specific Model (FIGS. 46–48). As noted above, these artifacts together provide a blueprint for an IJIS solution framework that is designed to be platform independent, have traceability for system changes, and be well-documented so that the IJIS system 70 is portable and easily reproduced to meet the requirements of other purchasers of the IJIS system 70 of the invention.

As will be apparent from the following detailed description, the tools for developing the IJIS solution framework of the invention include three major components: the IJIS Technology Blueprint, the IJIS EAI Foundation, and the IJIS Reference Solution. These components provide the necessary documentation for the IJIS solution framework of the invention to be made portable and platform independent.

In accordance with a preferred embodiment of the invention, the IJIS Technology Blueprint so created includes the following components:

IJIS architecture whitepaper and its accompanying PowerPoint presentation;
Business use case and object models;
Business glossary;
Risk management plan;
Use case specifications and Use Case Models in UML;
User Interface Storyboard;
Requirements management plan and software requirements specification;
Analysis, design, data and deployment models in UML;
Implementation model;
Test plan, Test Cases and guidelines;
Deployment plan;
Iteration and software development plan; and
Configuration management plan;

The IJIS EAI foundation, on the other hand, is based on the IJIS technology blueprint and includes:

All of the software development assets in the IJIS blueprint;
Standards-based XML schemas that define common message formats;
Standards-based message transformation maps;
Business process schedules;
Platform independent models (PIM) in UML that can be used to generate platform specific models (PSM) using model-driven architecture (MDA) for building both J2EE™ or Microsoft .NET™ solution components;
Enterprise architectural patterns and components that address common areas of functionality such as security, scalability, failover, subscription notifications, accuracy audits, and common business processes; and
Policies and guidelines for managing security; system administration, monitoring, and logging; and configuration management.

The IJIS Reference Solution is based on the IJIS framework and includes:

A secure, customizable Web-based user interface that enables demonstrations from anywhere in the world;
Executable justice business scenarios that demonstrate IJIS framework functionality and demonstrate standards-based XML messaging, transformation, and business processing;
Integration of existing systems; and
Security administration, management, and monitoring.

The models and the significant artifacts for the blueprint of the IJIS system 70 of the invention will be set forth below.

Software Infrastructure Model

The Architecture selected for the IJIS Reference Solution is based on IBM WebSphere, WebSphere MQSI, J2EE™ open source class libraries and toolsets, and Oracle Database. Comparable Microsoft .NET™ business-to-business software tools and platforms may also be used by those skilled in the art.

In a particular embodiment, the inventors have standardized on IBM's Rational Enterprise Suite as a key component of its solution development tool set. The inventors have also added to the Rational Unified Process™ to provide users of the IJIS system 70 of the invention with predictive cost estimation, business architecture modeling, and traceability between business models and technical implementation.

Unisys Business Blueprints™ also supports IBM's WebSphere portfolio as an implementation platform for IJIS system users who want to deploy applications in the J2EE™ environment. IJIS system users may take advantage of WebSphere's applications server to integrate business processes across their enterprise for high transaction volume environments.

Figure 5:
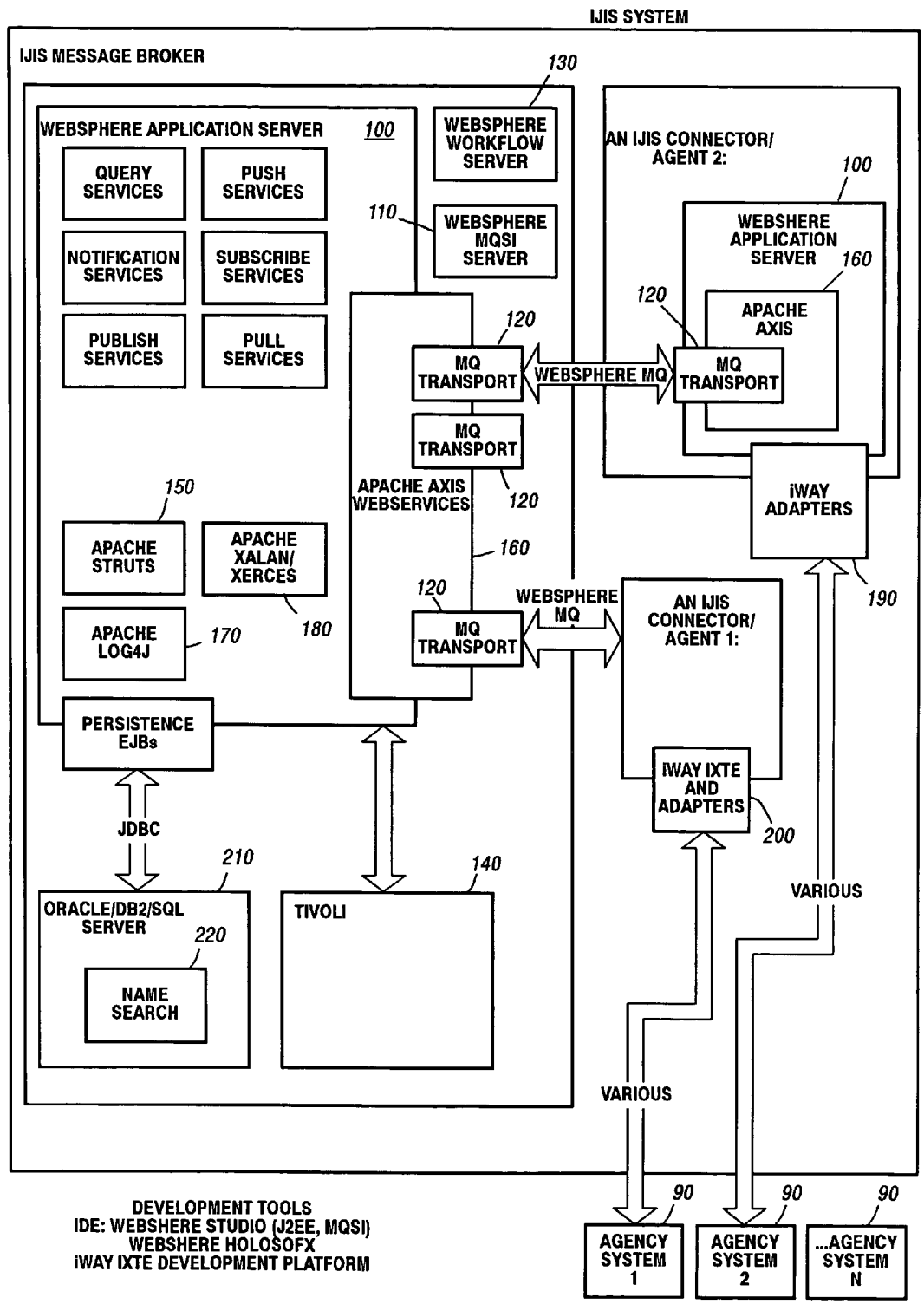
FIG. 5 illustrates the software components and tools used to build the IJIS Reference Solution in accordance with an embodiment of the invention.

FIG. 5 shows the COTS software components and tools used to build the IJIS Reference Solution in accordance with an embodiment of the invention. For example, the following list details COTS components and tools currently available that may be used to build an embodiment of the IJIS Reference Solution illustrated in FIG. 5:

IBM WebSphere Application Server (100) including a J2EE™ Application Server that provides query, push, notification, subscribe, publish and pull services;
IBM WebSphere MQ: Message Queuing Server (110);
IBM WebSphere MQ Integrator: Message Transformation Services (120);
IBM WebSphere Business Integration Workbench: Workflow and Rules Engine (130);
IBM Tivoli: Security server for authentication and authorization (140);
IBM WebSphere Application Developer Studio: Integrated development environment (not shown);
Apache Struts: Open source MVC2 implementation (150);
Apache Axis: Open source JAX-RPC compliant web service engine (160);
Apache Lo4J: Open source logging toolkit (170);
Apache Xalan: Open source XML toolkit and Apache Xerces: Open source XPath toolkit (180);
iWay Intelligent Adapters: Adapters for connecting to external systems (190);
iWay iXTE: Transformation Engine (200);
Oracle: RDBMS engine (210) for storing Master Name Index and IJIS internal information;
Name-Search: Name search for fuzzy searches and percentage based results (220);

While FIG. 5 provides a platform specific to J2EE™ applications, those skilled in the art will understand what comparable components to use for .NET™ and other B2B application platforms. Any such configuration may run on Windows 2000, Linux, or other known operating systems that support such software components.

Hardware Infrastructure Model

FIGS. 6–17 illustrate a sample hardware infrastructure of the IJIS system 70 of the invention.

Figure 6:
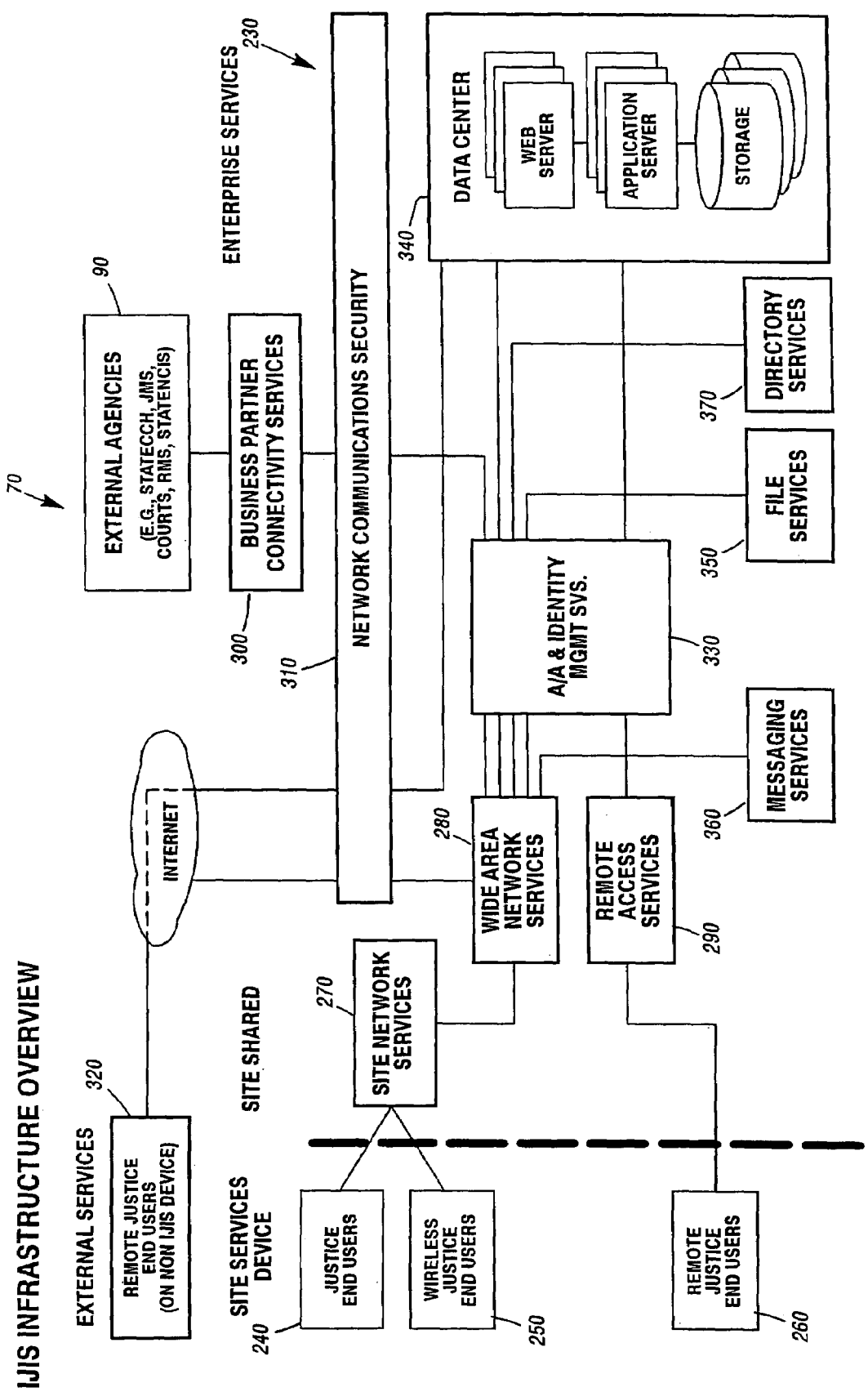
FIG. 6 illustrates an overview of the IJIS system hardware infrastructure.

FIG. 6 illustrates an overview of the IJIS system hardware infrastructure. As illustrated, the IJIS system hardware infrastructure includes an enterprise services platform 230 and connectivity devices for communicating with justice end users 240, wireless justice end users 250, and remote justice end users 260. Site Network Services 270 (described in more detail with respect to FIGS. 7 and 8) provide high-speed connectivity between the justice end users 240, the wireless justice end users 250 and Wide Area Network Services 280 (FIG. 9). Similarly, Remote Access Services 290 (FIG. 10) provide connectivity to remote justice end users 260. On the other hand, enterprise services platform 230 also provides connectivity to external agencies 90 via adapters/agents 80 that are included in the Business Partner Connectivity Services 300 (FIG. 11). Network Communications Security and Controls 310 (FIG. 12) includes firewalls, proxy servers, packet filters, VPN servers and other devices for allowing secure communications with the external agencies 90 while also allowing web access by remote justice end users 320 who are not using an IJIS system device with appropriate adapters/agents 80.

Authentication/Authorization and Identity Management Services System 330 (FIG. 13) provides authentication and authorization services to applications and devices. All data communications paths connect to Data Center Network Services 340 (FIG. 14) to access stored data and files within the IJIS system 70. File Services 350 (FIG. 15) provide internal and external end users with access to shared files, while Messaging Services 360 (FIG. 16) provide user-user or application-user store-and-forward messaging services as well as the ability to share scheduled events and meetings as specially formatted messages. Directory Services 370 (FIG. 17) provide a means of associating attributes with users or other defined resources and searching that information.

Each of these services and systems will now be described in more detail with respect to FIGS. 7–17.

Figure 7:
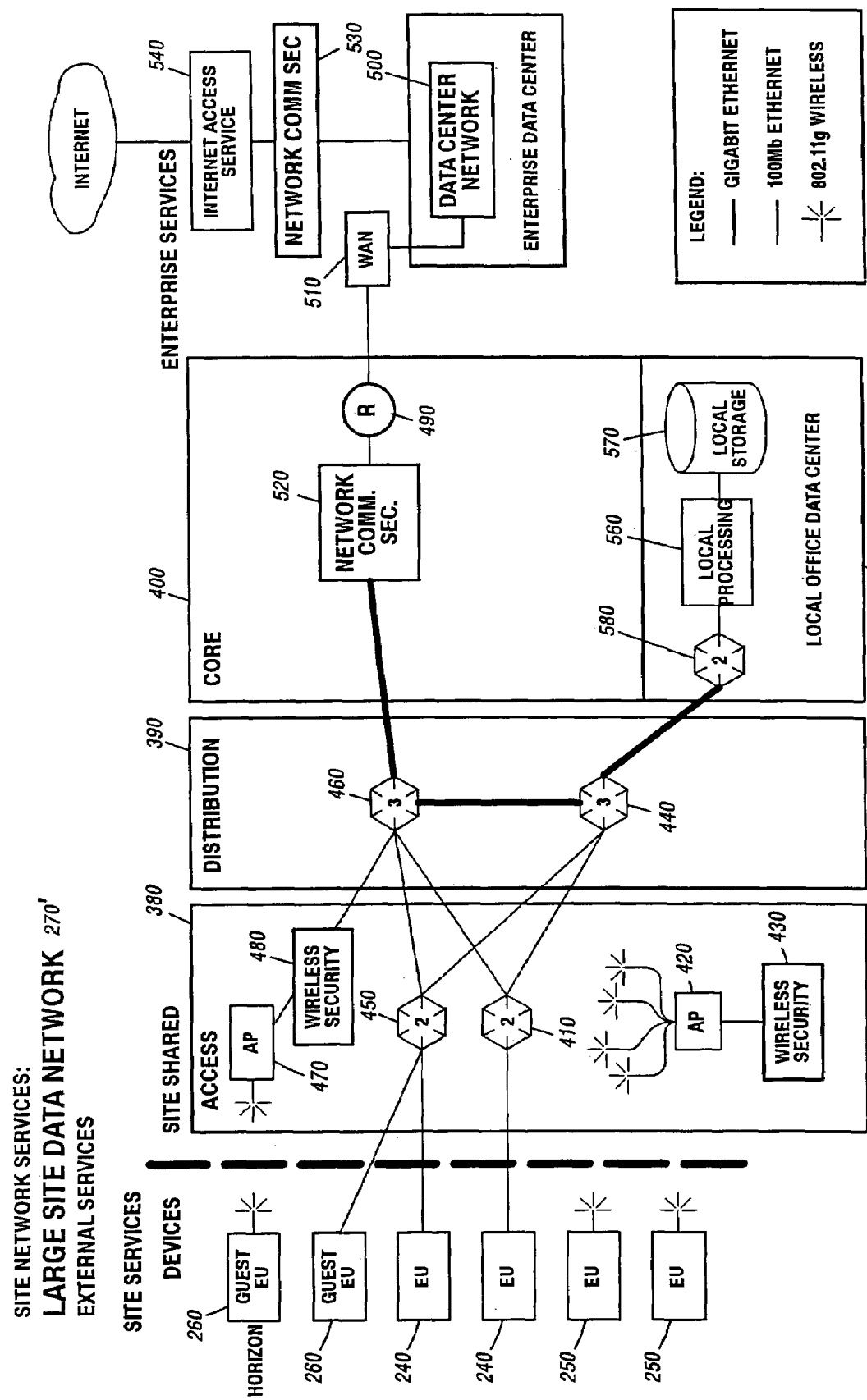
FIG. 7 illustrates Site Network Services for large site data networks that do not have co-located data centers.
Figure 8:
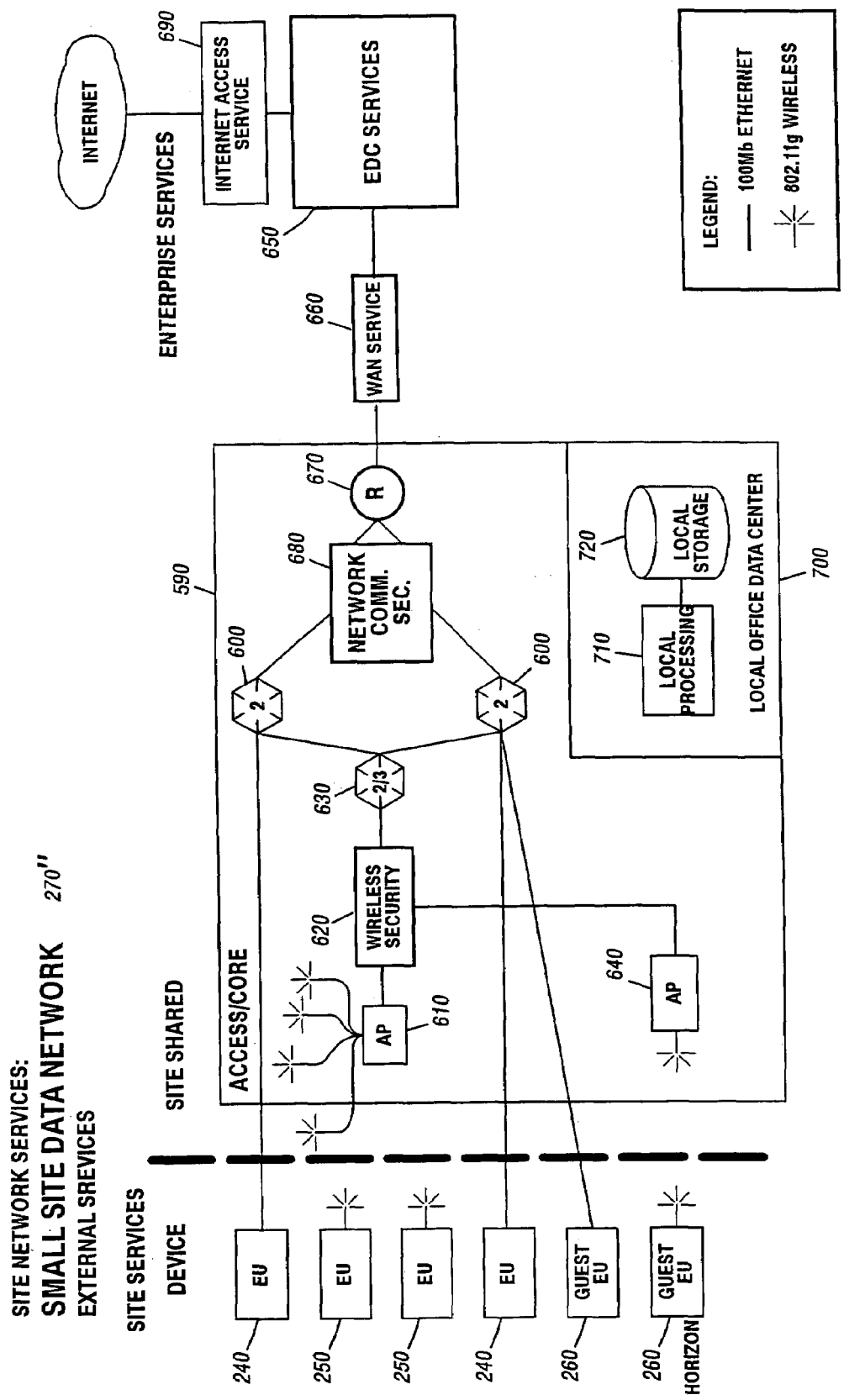
FIG. 8 illustrates Site Network Services for small site data networks.
Figure 9:
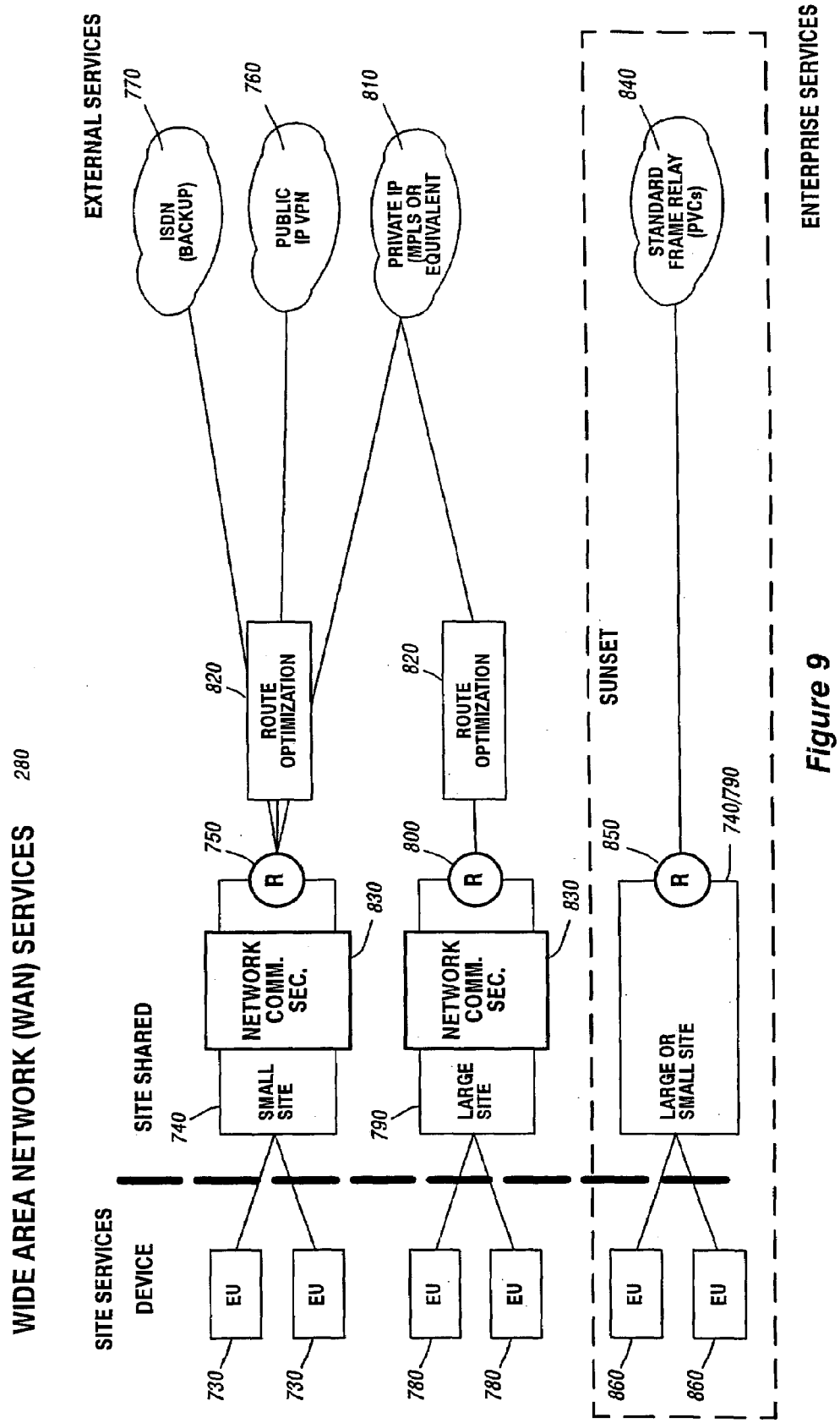
FIG. 9 illustrates an embodiment of wide area network (WAN) services that provide high-speed connectivity to geographically distributed enterprise locations.

Site Network Services 270 may be configured to provide an internetworking environment for devices and end users at large sites that do not have co-located data centers (FIG. 7) or at small sites (FIG. 8). As illustrated in FIG. 7, large site networking environment 270' is split into access layer 380, distribution layer 390 and core layer 400. The access layer 380 provides connectivity to end users 240 and wireless end users 250 as well as guest end users 260 (who may also be connected wirelessly). In an exemplary embodiment, 10/100 Mbps wired links to Layer 2 device 410 in the access layer 380 are provided to end user devices 240, while 802.11 g is provided for wireless network connections to wireless end users 250. When connecting via a wireless link, end user access is directed to one of several antennae which are connected to a wireless access point 420. This access point 420 will connect through Wireless Security 430 to Layer 3 devices 440 at the distribution layer 390. On the other hand, in an exemplary embodiment, 10/100 Mbps guest end user 260 may be given access via wired links from Layer 2 device 450, while guest wireless network access is optional. As illustrated, guest end users 260 will gain access for wired links to access Layer 2 devices 450 and for wireless links to distribution Layer 3 devices 460 via access point 470 and Wireless Security 480. As illustrated, the access Layer 2 devices 410 and 450 are redundantly connected via Gigabit Ethernet connections to the distribution Layer 3 devices 440 and 460.

Enterprise Data Center (EDC) connectivity is provided via a router 490 at the core 400 that connects site end user devices to EDC services 500 and the public Internet via the corporate WAN 510. Network communications security elements 520 and 530 are place to ensure the integrity of these connections. Internet access is preferably consolidated to a single internet access service 540. A mini-data center 550 at the local office provides local office processing (560) and storage (570) via a Layer 2 device 580 at the core 400.

As illustrated in FIG. 8, a small site networking environment 270" consists of one access/distribution layer 590. 10/100 Mbps wired links to Layer 2 devices 600 in the access/distribution layer 590 are provided to end user devices 240, while 802.11 g is provided for wireless network connections. When connecting via a wireless link, wireless end user 250 access is directed to one of several antennae which are connected to a wireless access point 610. This access point 610 connects through Wireless Security 620 to Layer 2/3 devices 630 that have 10/100 Mbps connections to the access/distribution Layer 2 devices 600. 10/100 Mbps guest end user 260 access via wired links is provided, and guest wireless network access via access point 640 may also be provided. Access Layer 2 devices 600 are redundantly connected via Gigabit Ethernet to Distribution Layer 3 devices (not shown).

Connectivity to data center 650 is provided over the corporate WAN 660 via a router 670 at the access/core layer 590. Network communications security 680 ensures the integrity of these connections. Internet access is preferably consolidated to a single internet access service 690. A mini-data center 700 at the local office provides local office processing (710) and storage (720) via a Layer 2 device 600 at the access/core 590.

FIG. 9 illustrates an embodiment of wide area network (WAN) services 280 that provide high-speed connectivity to geographically distributed enterprise locations. WAN connectivity is provided to regional offices in a number of different ways depending on site size and other criteria. End users 730 at small sites 740 are routed by router 750 over the Internet using a Public IP VPN 760 and may utilize an ISDN connection 770 as backup. On the other hand, end users 780 at large sites 790 are routed by router 800 over a Private IP Network 810 (may be MPLS or some equivalent). As illustrated in FIG. 9, route optimization (820) is used for WAN connections from both large and small sites to ensure speed and quality of connections. Network Communications Security 830 ensures the integrity of these connections. WAN services are provided via the private IP VPN 810 whenever possible.

Standard Frame Relay 840 (via Private Virtual Circuits) may be used for both large and small sites and is routed via router 850 from the end users 860 as illustrated. Standard remote office access speed is DSL or T-1, depending on availability.

Figure 10:
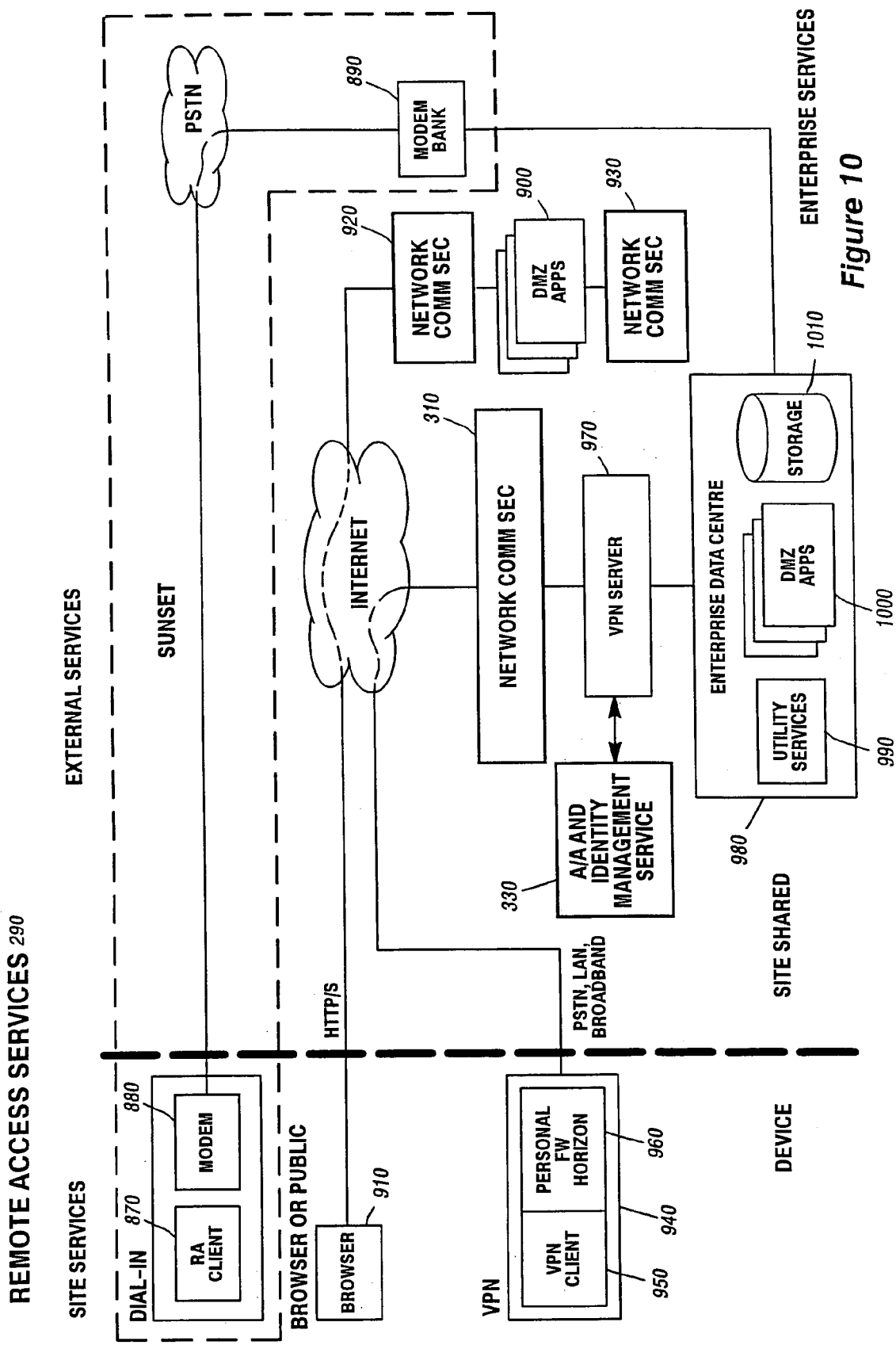
FIG. 10 illustrates an embodiment of remote access services in accordance with the invention.
Figure 11:
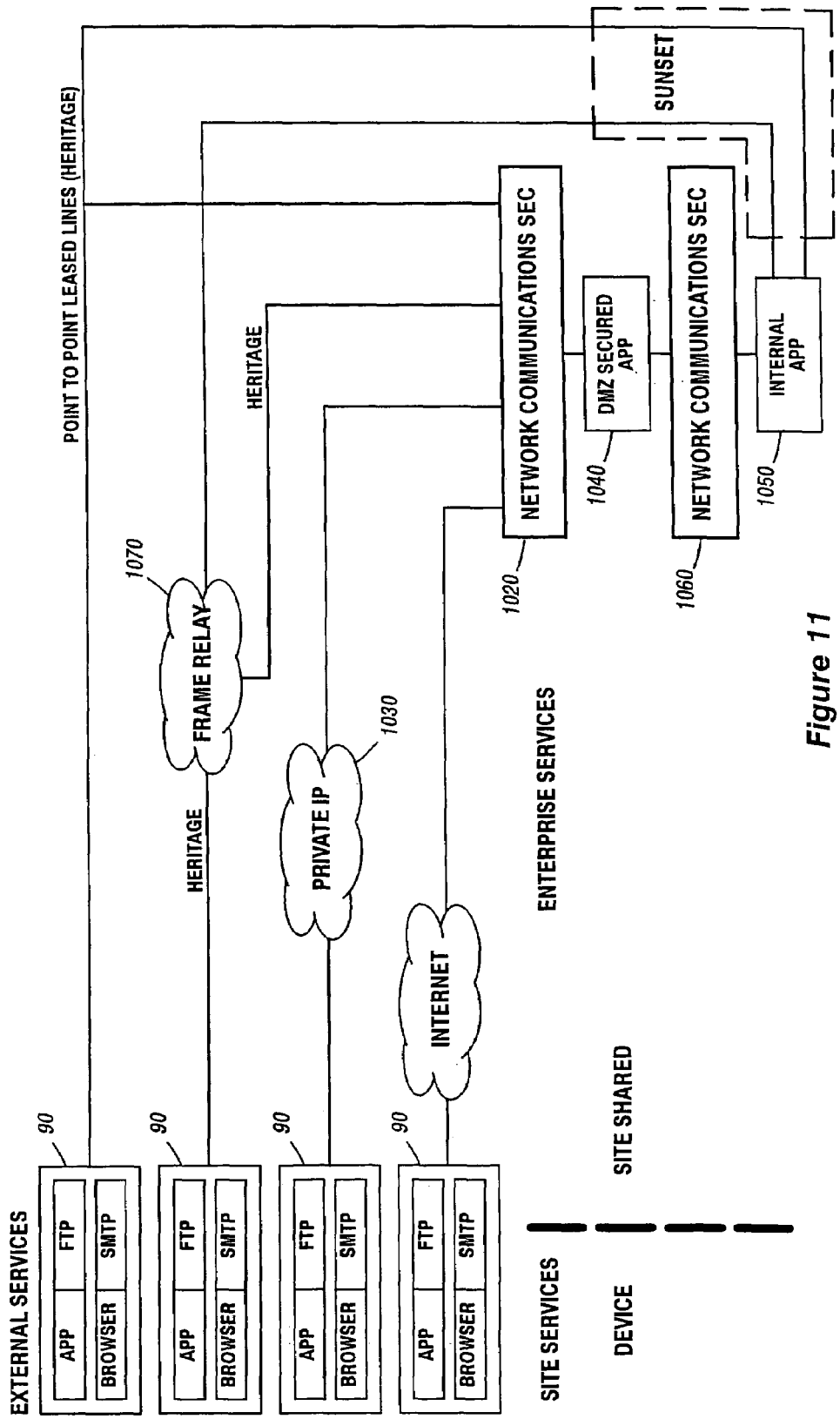
FIG. 11 illustrates an embodiment of the business partner connectivity services that supports interaction between the IJIS system of the invention and the key external agencies.

FIG. 10 illustrates an embodiment of remote access services 290. All dial-in remote access may be used. As illustrated, remote users wishing to utilize dial-in remote access need a local modem 870 and a remote access client 880. The remote users 870 are connected via this modem 880 over the PSTN to a modem bank 890 managed internally. Switching services connect the dial-in request to the internal networks and to the requested application or service.

Browser-based and/or public users may instead access DMZ-secured applications via the public Internet using their browsers 910. Communications with browser/public users are secured via HTTPS and network communications security devices 920 and 930. These connections to the Internet can be dial-up, LAN or a broadband connection. Internet VPN and internal VPN Server management, on the other hand, is the primary direction for remote access. Typically, end user devices 940 will have a VPN client 950 and a personal firewall 960 may be installed. These devices connect to a public Internet connection (via selected method, e.g., LAN, broadband, PSTN, etc.). This encrypted connection will then be routed to the VPN server 970 located within the trusted corporate network before being given access to enterprise data services 980 including utility services 990, DMZ applications 1000 and storage 1010.

FIG. 11 illustrates an embodiment of the business partner connectivity services 300 that supports interaction between the IJIS system 70 and the key external agencies 90. External agencies 90 with requirements to access resources within the IJIS system 70 preferably utilize the public Internet as the main solution wherever possible and are routed to the network communications security service 1020 where they are authenticated. However, private IP Services 1030 (where they exist and are economically feasible) may also be considered primary external agency 90 connectivity solutions to DMZ services. Based upon the external agency's authorization level, the external agency 90 is allowed access to selected DMZ-secured applications 1040. As illustrated the DMZ-secured applications 1040 may also access internal applications 1050 via network communications security service 1060. On the other hand, as illustrated, point-to-point leased lines and frame relay access 1070 also may be provided for external agencies 90 on an as-required basis. This, however, is not the preferred method of Internal network access for external agencies 90. When point-to-point and frame relay access is granted for specific partners, they are directed to services contained within the DMZ. All direct access to services and applications within the trusted network will be considered and may be implemented.

Figure 12:
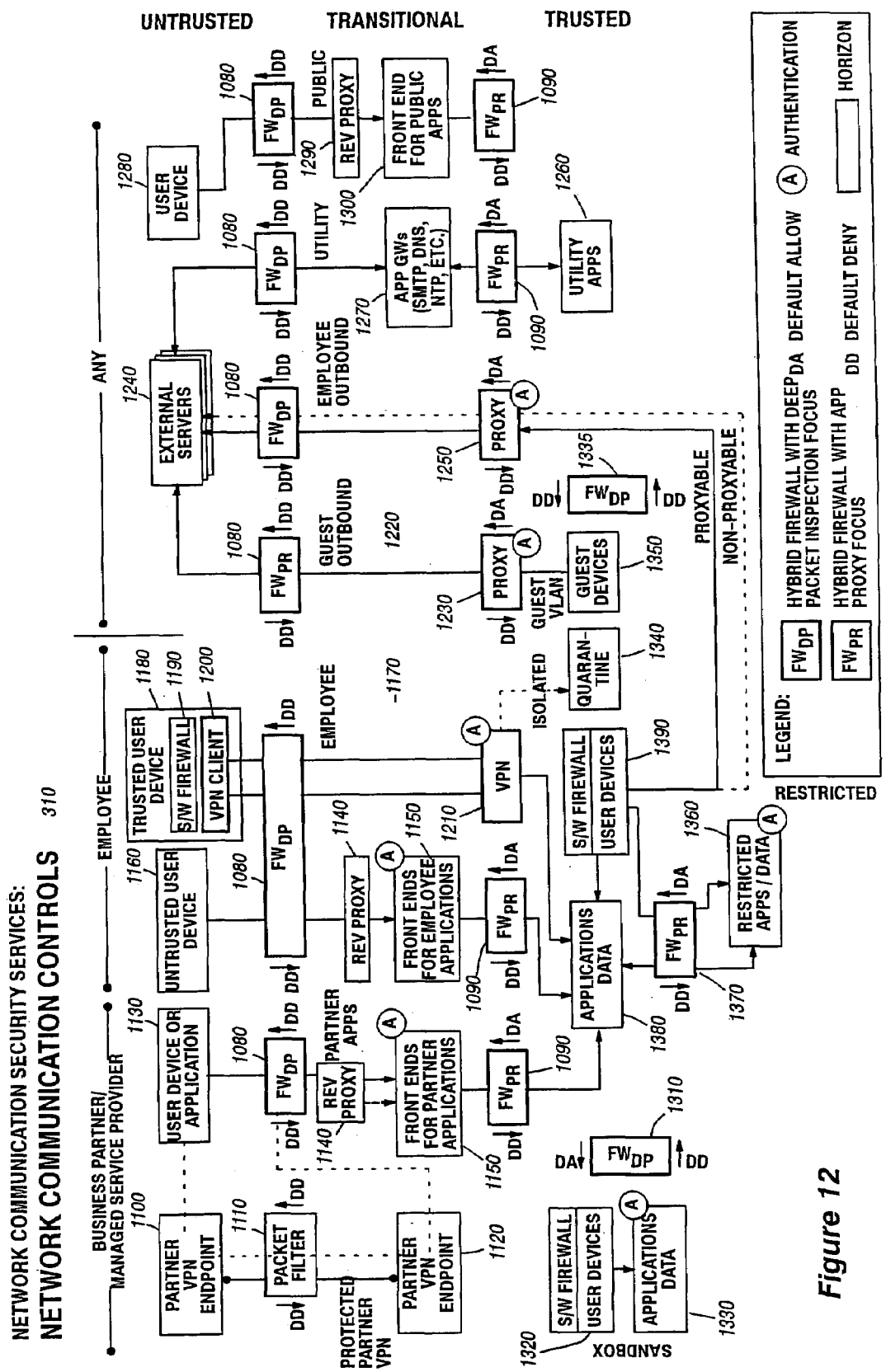
FIG. 12 illustrates an embodiment of network communication security and controls services that provide the means to limit network communications according to the trust zone model whereby firewalls and other communications filters are placed between the endpoints of supported data flows.

FIG. 12 illustrates an embodiment of network communication security and controls services 310 that provide the means to limit network communications according to the trust zone model whereby firewalls and other communications filters are placed between the endpoints of supported data flows. As illustrated, communications traveling from one zone to another must pass through one security control device for each boundary traversed in order to implement the inter-zone controls described in the trust zone model. Control devices include firewalls, proxy servers, packet filters, and VPN servers. The firewalls are "hybrid" devices capable of stateful filtering using deep (OSI layer 4-7) packet inspection and application proxying. Generally, the firewalls 1080 between Untrusted and Transitional are focused on packet filtering, while the firewalls 1090 between Transitional and Trusted primarily serve as application proxies. As illustrated, external (Untrusted) systems do not directly access trusted zone systems. These external (Untrusted) systems interact with application front end servers in the transition zone that provide authentication and act as intermediaries to trusted services and data.

FIG. 12 illustrates that several data flows may be modeled using the illustrated network communication controls.

For example, business partners/managed service providers may have networks extended to internal premises via partner-controlled site-site VPN. In this example, the partner VPN endpoint 1100 is placed behind a packet filter 1110 (potentially implemented on a router) configured to limit communication to only that required for the business partner VPN to function. Business partner traffic originating from the VPN endpoint 1100 is processed as all other business partner traffic with partner VPN endpoint 1120.

Business partner devices or systems 1130 may also access internally-hosted services. In this case, the traffic proceeds through a firewall 1080 configured to perform deep packet inspection and filtering at the Untrusted-Transitional boundary, and then through an internal reverse proxy 1140 that front-ends for internal business partner services (1150). These services are DMZ hosted and require authentication. The DMZ systems may need access to internal systems and data; in those cases, the traffic will flow through a second firewall 1090 at the Transitional—Trusted boundary. This firewall 1090 will use application proxying if possible and deep packet filtering where needed.

Communication from remote employees accessing web-enabled employee services from an untrusted user device such as a browser 1160 proceeds analogously to business partner traffic, except that it is directed through firewall 1080 to employee-facing services in a remote employee DMZ 1170. On the other hand, remote employees accessing trusted infrastructure via VPN from a trusted internal device 1180 with a software firewall 1190 and VPN client 1200 may access the Trusted zone via a VPN tunnel 1210, after passing through a deep packet filtering firewall 1080 at the Untrusted-Transitional boundary. Users will authenticate to the VPN server 1210, which spans the Transitional and Trusted zones. Authenticated VPN tunnels are initially shunted into a quarantine area for configuration validation. Once the system configuration is verified, VPN traffic is treated like all other trusted internal traffic.

In the case of on-site guests accessing the Internet from "isolated" network segments, guest users at internal locations are granted access to the Internet via a dedicated outbound pathway 1220, which proceeds through an HTTP proxy 1230 at the Trusted-Transitional boundary and a deep packet inspection filter 1080 at the Transitional-Untrusted boundary. On the other hand, in the case of internal employees accessing the Internet from trusted networks, the trusted systems access the untrusted systems 1240 via a proxiable protocol and use a corporate proxy server 1250 at the Trusted-Transitional boundary. Non-proxiable traffic is allowed to pass through this layer on a case by case basis as defined by corporate policy. Proxy sessions are configured to require authentication. All outbound traffic will also pass through a deep packet inspection filter 1080 at the Transitional-Untrusted boundary.

In the case of communication between external and internal utility services, utility services 1260 (e.g., DNS, SMTP) within the Trusted Zone communicate with peer services in the Untrusted Zone via intermediate gateways 1270 in the Transitional Zone. A proxying firewall 1090 is placed at the inside boundary, and a deep packet inspection filter 1080 is placed at the outside boundary.

In the case of access to public-facing internal applications from clients on non-internal networks, devices 1280 on the untrusted network access internal public-facing servers through a firewall 1080 configured to perform deep packet inspection and filtering at the Untrusted-Transitional boundary, and then through an internal reverse proxy 1290 that front-ends public services (1300). These services are entirely contained within a DMZ network and do not require user authentication.

In the case of communication between "sandbox" and other trusted networks, a deep packet inspection filter 1310 controls data flows between "sandbox" networks including user devices 1320 and applications data 1330 and other trusted networks. On the other hand, in the case of communication between "isolated" and other trusted networks, A deep packet inspection filter 1335 will control data flows between "isolated" networks 1340 and/or isolated guest devices 1350 and other trusted networks.

Finally, in the case of communication between Trusted Zone users and systems and services 1360 in the Restricted zone, an application proxy firewall 1370 at the Trusted-Restricted boundary controls communication to/from Restricted zone systems 1360 and trusted applications and data 1380 and trusted user devices 1390.

Figure 13:
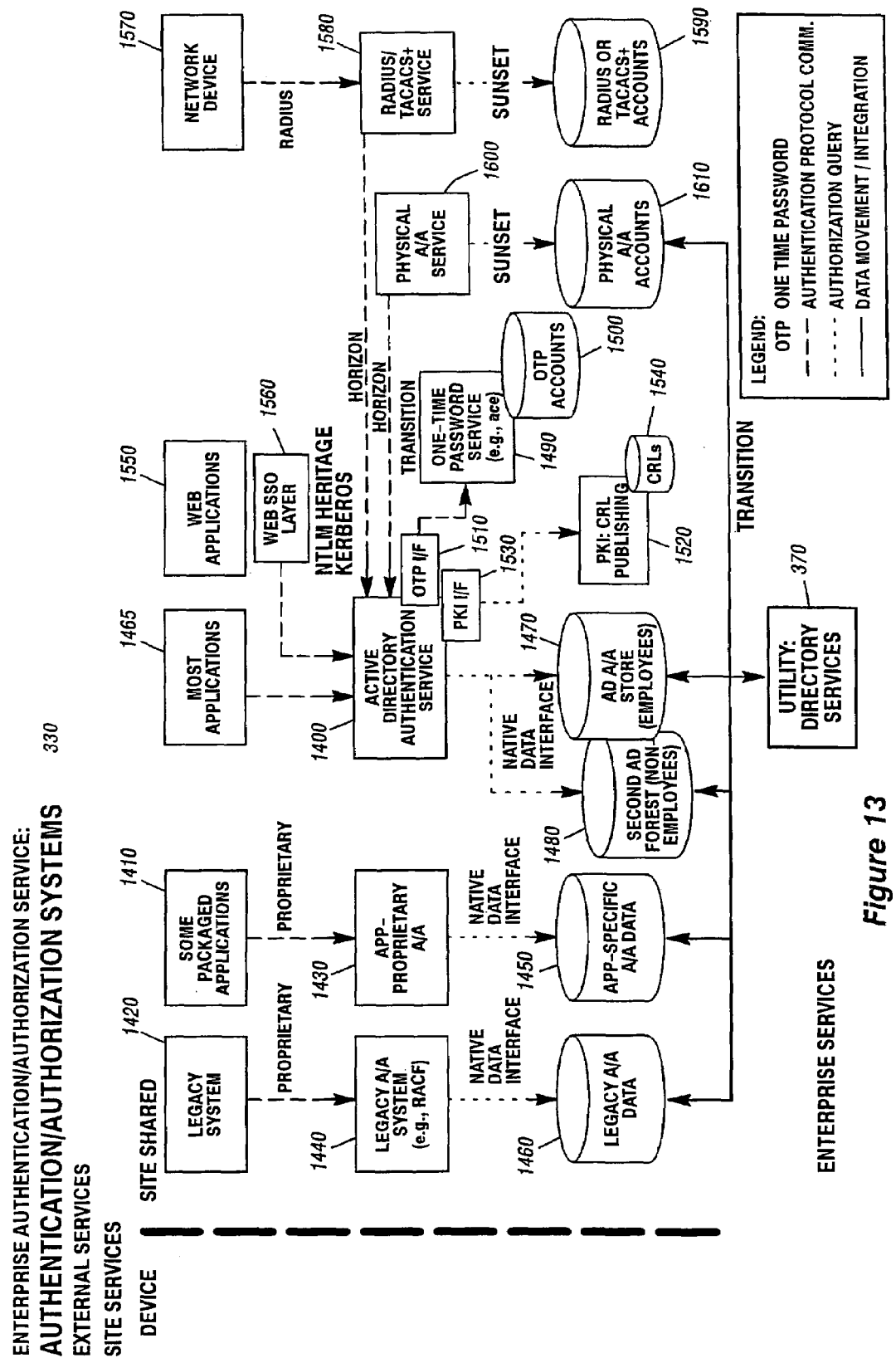
FIG. 13 illustrates the components of the enterprise system that provide authentication and authorization services to applications and devices.

FIG. 13 illustrates and embodiment of the authentication/authorization systems 330 that confirm the validity of credentials and associates those credentials with a set of permissions. The model of FIG. 13 illustrates the components of the enterprise system that provide authentication and authorization services to applications and devices. Applications and devices that request authentication and authorization (A/A) services are at the top of the diagram, A/A engines are in the center, and A/A information repositories are at the bottom. Key components of the A/A system include Microsoft Active Directory (AD) 1400 and a policy-based single sign-on (SSO) utility for web applications (e.g., Netegrity Siteminder or Oblix Netpoint).

Packaged applications 1410 and legacy applications 1420 will continue to use proprietary mechanisms 1430 and 1440 and local repositories 1450 and 1460 for user authentication and authorization. Data integration mechanisms (i.e., meta-directory tools described in Utility: Directory Services below) are used to synchronize siloed user A/A data with the central A/A stores.

The majority of applications 1465 that use the A/A systems 330 use the NT LAN Manager protocol (NTLM) and Kerberos to conduct user authentication and authorization against Active Directory 1400. User account data for these systems is stored in the AD repositories 1470 and 1480 and accessed by the AD authentication process 1400 via AD native protocols. As illustrated, there are multiple instances of the AD repositories 1470 and 1480 to accommodate separation of employee and non-internal user accounts. AD 1400 will be able to interface with the transitional one-time password engine 1490 and accounts 1500 via OTP interface 1510 to authenticate OTP credentials. The AD 1400 is also able to interface with a CRL-publishing mechanism 1520 via PKI interface 1530 to support certificate authentication of CRLs 1540.

Web applications 1550 conduct user A/A against the web SSO engine 1560. The web SSO engine 1560 passes authentication requests to Active Directory 1400 via NTLM or Kerberos.

Network devices 1570 may use RADIUS and TACACS+ protocols to conduct A/A operations against enterprise RADIUS and TACACS+ servers 1580 and accounts 1590 and move toward application-level integration with the central AD system 1400. Physical Access systems 1600 use proprietary user account stores 1610 and move toward application integration with AD 1400. In the meantime, data synchronization between AD accounts and physical access system accounts is used as a transitional approach.

Figure 14:
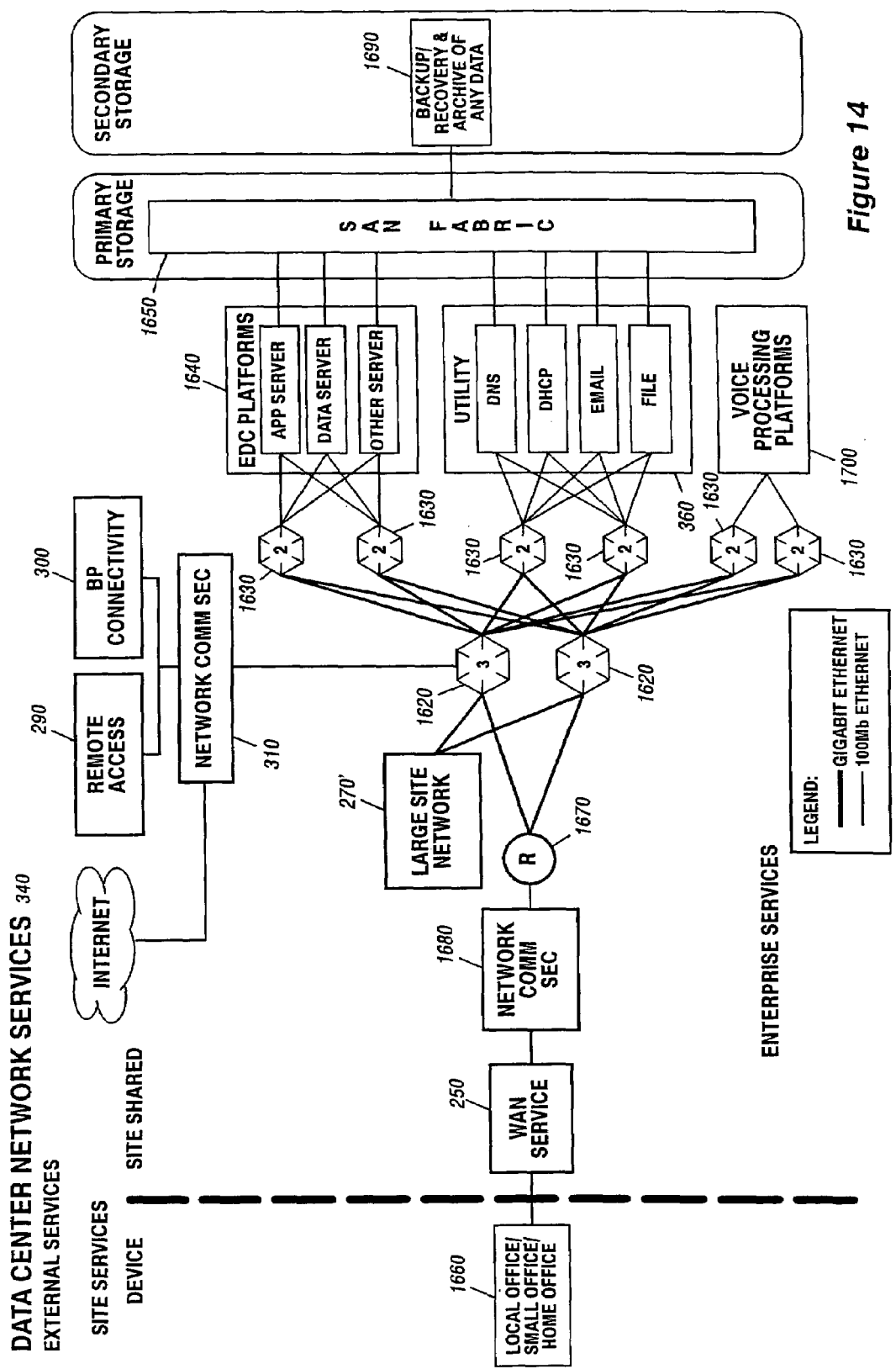
FIG. 14 illustrates the data center network services of the IJIS system shown in FIG. 6 that focus on the networking, storage, and retrieval of stored data and files within the data center.

FIG. 14 illustrates the data center network services 340 of the IJIS system 70 shown in FIG. 6. The data center provides services that focus on the networking, storage, and retrieval of stored data and files within the data center. The data center backbone includes a two tiered hierarchy of Layer 3 devices 1620 and Layer 2 devices 1630. Each of the Layer 3 devices 1620 have fully redundant access to each other, and to each of the Layer 2 switches 1630. The Layer 2 switches 1630, in turn, provide access to the data center servers 1640.

Generally, server storage is shared across the Storage Area Network (SAN) fabric 1650. Collocated large site offices 270' (corporate offices that are physically located in the same location as the data center) connect directly to the backbone, while all other offices 1660 (Local Offices, Home Offices, Small Offices) access data center resources through WAN Services 250 and are routed to the backbone via a WAN edge router 1670. Network communications security 1680 may be put in place for situations where security is required between the Local, Home or Small office and the data center (optional).

Remote access clients and external agencies may access data center resources via their assigned access method (remote access services 290 and business partner connectivity services 300, respectively) and are routed through perimeter security services 310 into the backbone. Access to resources is restricted by their Authorization at the Network Communications Security.

As illustrated in FIG. 14, the primary storage device for all servers 1640 is SAN fabric 1650. Tape is used as secondary storage 1690 for Backup/Recovery & Archive of any data. All platforms will have DAS for Local Boot, Operating System, etc. Also, voice processing platforms 1700 may also be desired as well as utilities 1710 including, for example, DNS, DHCP, email, and file services.

Figure 15:
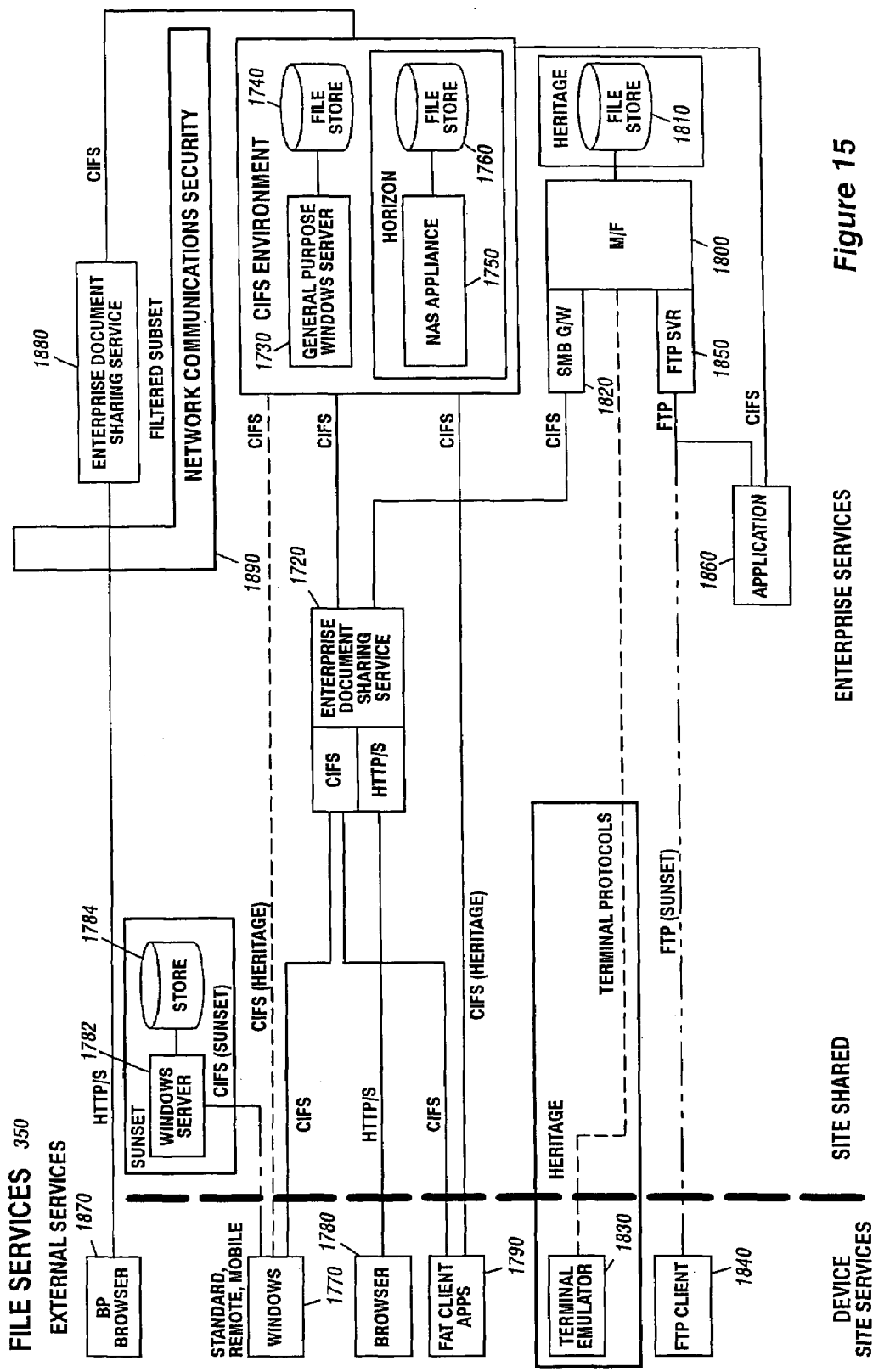
FIG. 15 illustrates an embodiment of file services that provide end users internal and external to the trusted network with access to shared files.

FIG. 15 illustrates an embodiment of file services 350 that provide end users internal and external to the trusted network with access to shared files. Such file services support the movement, storage and delivery of files generated through standard office automation software. Preferable, the file services are designed to remove all local storage, including storage structures at local and small offices. All file services should be in regional and enterprise data centers and will trust that the network is build to handle the requirements for data access. Preferably, access to file services in operating systems other than Windows is designed using network attached storage (NAS) to make those services available to all operating systems.

As illustrated in FIG. 15, internal file services are delivered through a web-enabled enterprise file sharing system 1720 (e.g., Microsoft SharePoint) that centralizes access and distribution of files across the enterprise. The enterprise file sharing system 1720 front-ends all documents and file types. Back-end file storage is centralized as much as possible onto Windows servers 1730 with file store 1740 or Network Attached Storage (NAS) appliances 1740 with files store 1750 in shared data centers. The trigger conditions for movement from local to centralized file storage include performance, data usage requirements, and cost. Windows client 1770 access to file sharing services 1720 using the Common Internet File System (CIFS) protocol and browser 1780 access via HTTP/S are central features. Direct CIFS access from Windows client 1770 to data center file stores 1740 and 1760 is also supported. A site shared Windows server 1782 and associated store 1784 may also be utilized for providing data to the Windows client 1770.

General "fat client" applications 1790 requiring file services also use CIFS to access files through the enterprise file sharing service 1720. Direct CIFS access from fat client applications 1790 to data center file stores 1740 and 1760 may also be supported.

Existing access to mainframe based file services 1800 and file store 1810 is provided through the file sharing service 1720 using an SMB gateway 1820 for communication. Terminal emulation (1830) access to mainframe file services 1800 is also provided through standard terminal protocols where required. FTP client 1840 access to the mainframe based file services 1800 may also be supported through FTP services 1850. As illustrated in FIG. 15, EDC applications 1860 that require file transfer to/from the mainframe file services 1800 also use FTP services 1850. On the other hand, EDC applications 1860 that require shared file services may access EDC windows servers 1730 directly (using CIFS).

Business partners requiring access to specific file services may be given access via their browsers 1870 to a filtered subset of existing files in the enterprise file sharing service 1880 that exists in the business partner DMZ. As illustrated in FIG. 15, the DMZ is isolated from the business partner and the file services by network communications security services 1890.

Figure 16:
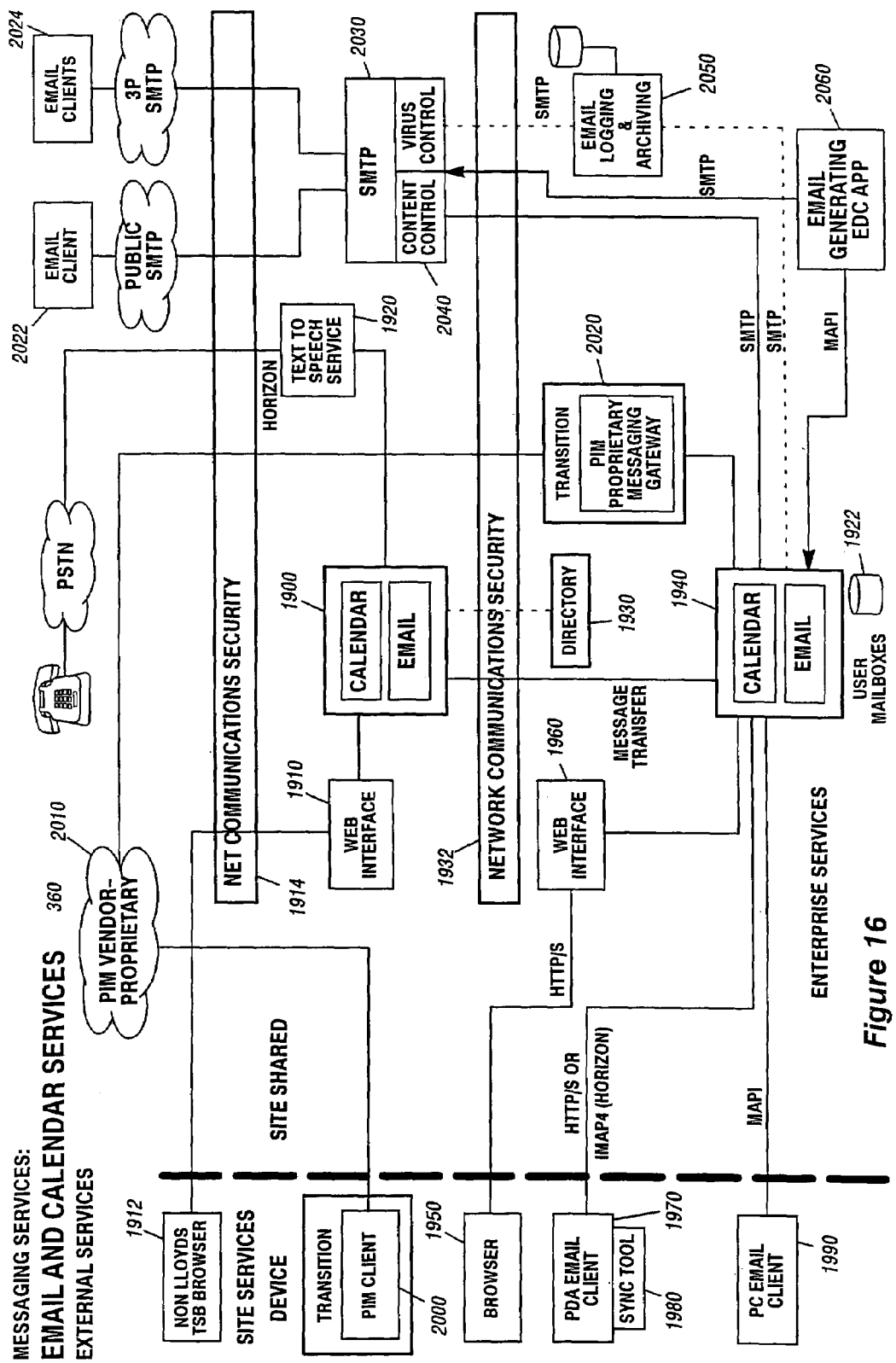
FIG. 16 illustrates messaging services of the IJIS system of FIG. 6, including email and calendaring services that are provided by EDC-based email servers.

FIG. 16 illustrates messaging services 360 of the IJIS system 70 of FIG. 6. Messaging services 360 includes email and calendaring services that are provided by EDC-based email servers. Such messaging services provide user-user or application-user store-and-forward messaging, including the creation, storage, retrieval, and delivery of messages, as well as the ability to share scheduled events and meetings as specially-formatted messages. Preferably, the messaging services 360 are delivered to an end user via a browser or other POP/IMAP-enabled client. Messaging traffic directed to recipients external to the IJIS system 70 are required to pass through perimeter security services.

Figure 26:
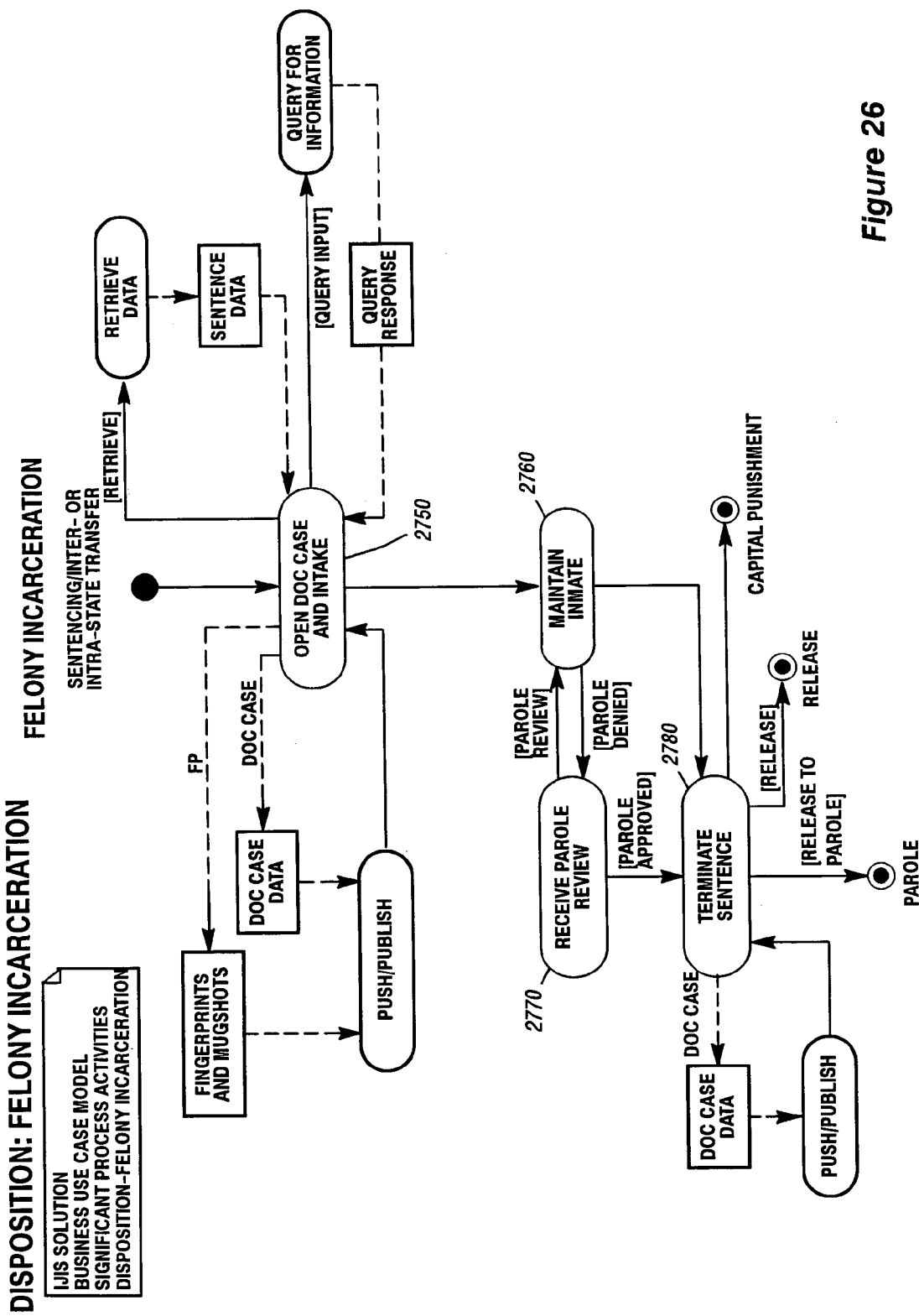
FIG. 26 illustrates the use case activity diagram for Disposition: Felony Incarceration, including administering of court-imposed sanctions.

As illustrated in FIG. 26, a DMZ-hosted front-end email and calendar server 1900 handles external browser-based (e.g., Outlook Web Access) access (1912) to messaging services via web interface 1910 and network communications security service 1912 as well as access to stored messages by the text to speech service 1920 for external calls made over the PSTN. All user email mailboxes 1922 and message storage are housed on internal (non-DMZ) mail servers 1940. Directory data 1930 is replicated from the internal email and calendar server 1940 through network communications security 1932 to its DMZ-hosted counterpart 1900.

Access to email/calendaring is provided through several end-user interfaces. For example, internal users with browsers 1950 may connect to email service via an email/web interface 1960 (e.g., Outlook Web Access) using HTTP or HTTPS protocols. Internal users also may connect directly to the email system with a PDA email client 1970 via HTTP or HTTPS or IMAP or will be able to synchronize with the email system 1940 via a PDA synchronization tool 1980. A policy decision will be in place concerning not allowing synchronization of Lloyds TSB data on a PDA client to a non-Lloyds TSB PC (e.g., home computer). Internal users with PC email clients 1990 also may connect to the email system 1940 via the MAPI protocol. On the other hand, users with PIM clients 2000 may send and receive messages through a PIM vendor-proprietary network and gateway 2010 into a PIM Proprietary Messaging Gateway 2020 and into the enterprise email system 1940 using the vendor's proprietary protocols. In addition, users with terminal services clients may connect to a terminal server that will allow them access to the Email system 1940.

Filtered directory content will be passed to the DMZ-hosted email service 1900 to be accessed by the email front end, but the main directory information 1930 resides internal to Lloyds TSB and may be utilized by the internal email server 1940.

Messages sent from internal users or applications to external parties and from external parties to internal end users (2022, 2024) pass through an SMTP gateway 2030 before being sent to their recipient. Content control software 2040 exists on the SMTP gateway 2030 to apply security policies to inbound/outbound messages. Email content logging and auditing is executed on inbound/outbound email communications at 2050. EDC applications 2060 that generate email messages utilize MAPI to deliver messages into the enterprise email system 1940 or SMTP to deliver messages to external parties via SMTP gateway 2030.

Figure 17:
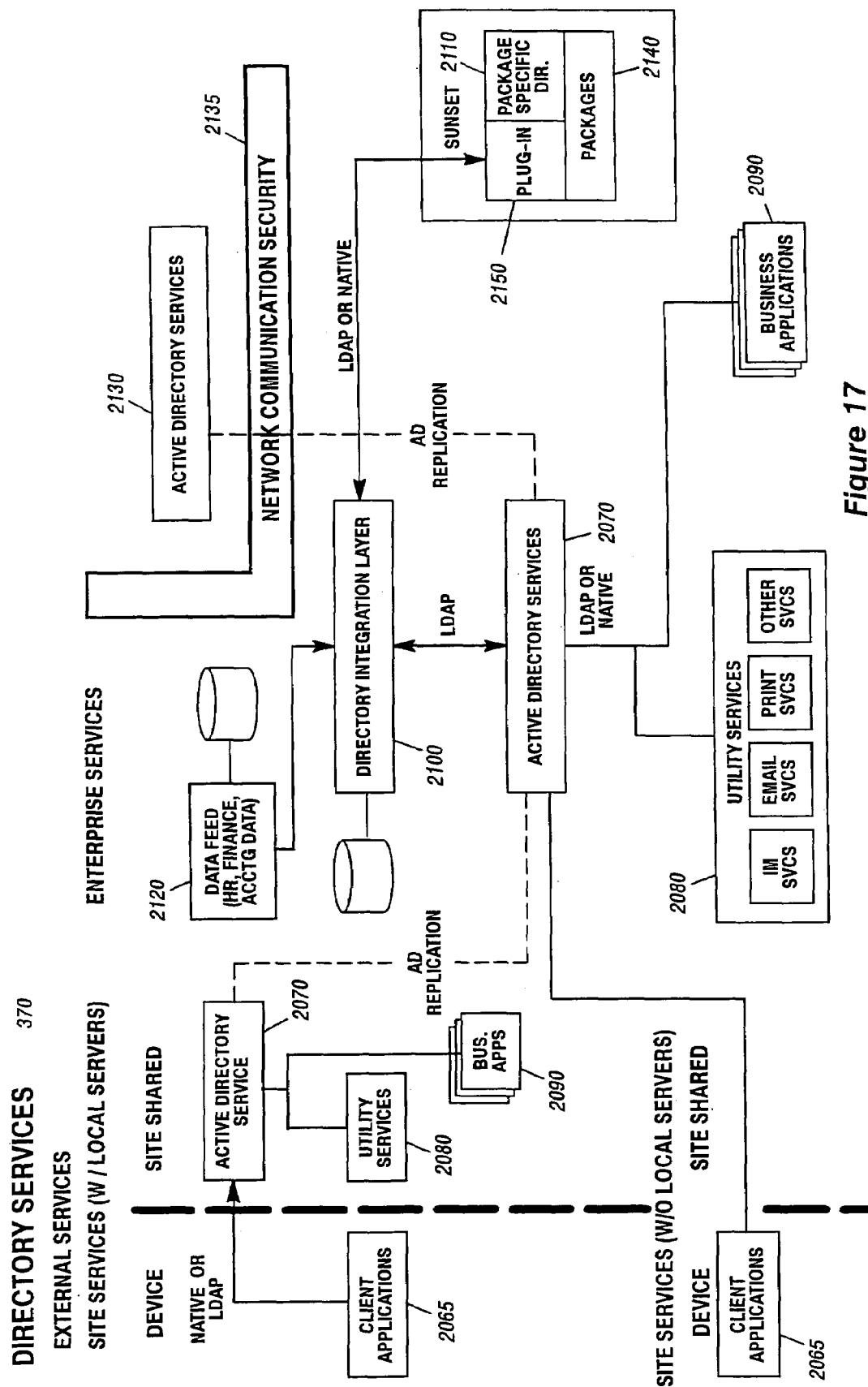
FIG. 17 illustrates an implementation of directory services of the IJIS system of FIG. 6.

FIG. 17 illustrates an implementation of directory services 370 of the IJIS system 70 of FIG. 6. Directory services 370 provide a means of associating attributes with users or other defined resources and searching that information. Directory services 370 preferably includes directories for user authentication, authorization, white pages, and resource allocation. Directory services 370 are preferably delivered across a number of data centers to allow for best access but typically is not delivered at every local office. Active Directory is the leading directory for utility service needs.

Directory services 370 are preferably as centralized as possible, most likely at regional data centers. Local sites requiring directory access (for performance or other reasons) are equipped with a local replica of the directory. Utility services and applications 2065 local to a site that also has a local directory replica will access directory services locally, not centrally.

The main directory for utility services is the Active Directory service 2070, which stores information regarding end users including authorizations, rights, etc. The messaging services, print services, and other utility applications of utility services 2080 communicate with the AD service 2070 via AD-native protocols (for MS applications) or via LDAP. Major business applications 2090 located in large data centers also may access directory services centrally from Active Directory service 2070 using AD-native or LDAP protocols.

A directory integration layer 2100 that includes an enterprise-wide meta-directory is established to link the AD service 2070 with package-specific directories 2110 and with data sources 2120 (e.g., HR data feed). To allow for access from untrusted or external clients, the Active Directory service 2070 is replicated in the DMZ environment (2130) for secure access via network communications security 2135. Other packages 2140 in the environment that have their own specific directory attached to them will communicate via LDAP (through a plug-in 2150 if required) with the directory integration layer 2100. Data feeds and updates from other applications sources 2120 (HR, finance, etc.) are fed into the directory integration layer 2100 before being updated in Active Directory service 2070.

Business Use Case Model

The Business Use Case Model is a model of the business intended functions. It is used as an essential input to identify roles and deliverables in the organization. The nuts and bolts of the IJIS business use case model are the activity diagrams that show how the criminal justice process works. To create the activity diagrams for the IJIS use case model, two primary sources of information were used, the US Department of Justice System Model (http://www.ojp.usdoj.gov/bis/justsys.htm) and the National Consortium for Justice Information and Statistics (http://www.search.org) Justice Information Exchange Model (JIEM). The DOJ System Model is shown in FIG. 1.

The top level activity diagram for the Criminal Justice Process business use case uses the DOJ System Model as a guide for its model as shown in FIG. 2. The users of the system include:

the General Public, which is a generalization of all human actors including the accused, witnesses, and victims;

Federal agencies, is a generalization of all federal agencies such as FBI, DEA, INS, Homeland Security, and the Secret Service;

State/Local Non-Criminal Justice Agencies, which is a generalization of state and local non-justice agencies such as the DMV, HHS and licensing agencies that issue licenses for any purpose where the license would not be issued or will be revoked because of criminal violations;

Commercial Information Providers, which is a provider of commercial information such as http://www.choicepoint.com/;

Community Corrections, which is a community based program that provides preventative services, services to offenders, services to persons charged with a crime or an act of delinquency, services to persons diverted from the criminal or delinquency process, services to persons sentenced to imprisonment, or services to victims of crime or delinquency, and is operated under a community corrections plan for the local or state government; and Diversion Provider, which is an agency that manages a criminal defendant either before adjudication or following adjudication but prior to sentencing, in which the court directs the defendant to participate in a work, educational, or rehabilitation program.

The IJIS Criminal Justice Process business use case model has detailed activity diagrams for each of the following activities:

Investigation
Arrest
Booking
File Charges
Detention
Adjudication
Sentencing
Probation
Misdemeanor Incarceration
Felony Incarceration
Parole In the detailed activity diagrams described below, critical information exchange is depicted with the IJIS system 70—as well as the generalized XML document messages that would be exchanged as shown in FIG. 3. For example, in the Update Incident Data activity, when law enforcement updates the incident with the investigation findings in their case management system, the agency will also publish or push critical data regarding the incident to appropriate agencies. There is only one use case for the Criminal Justice Process. To show the major activities that comprise the Criminal Justice Process the activities are shown as aggregated business use case realizations as shown in FIG. 2. Each activity depicted in this diagram corresponds to a major activity with an associated activity diagram in the business use case model illustrated below.

Criminal Justice Process Workflow

Figure 18:
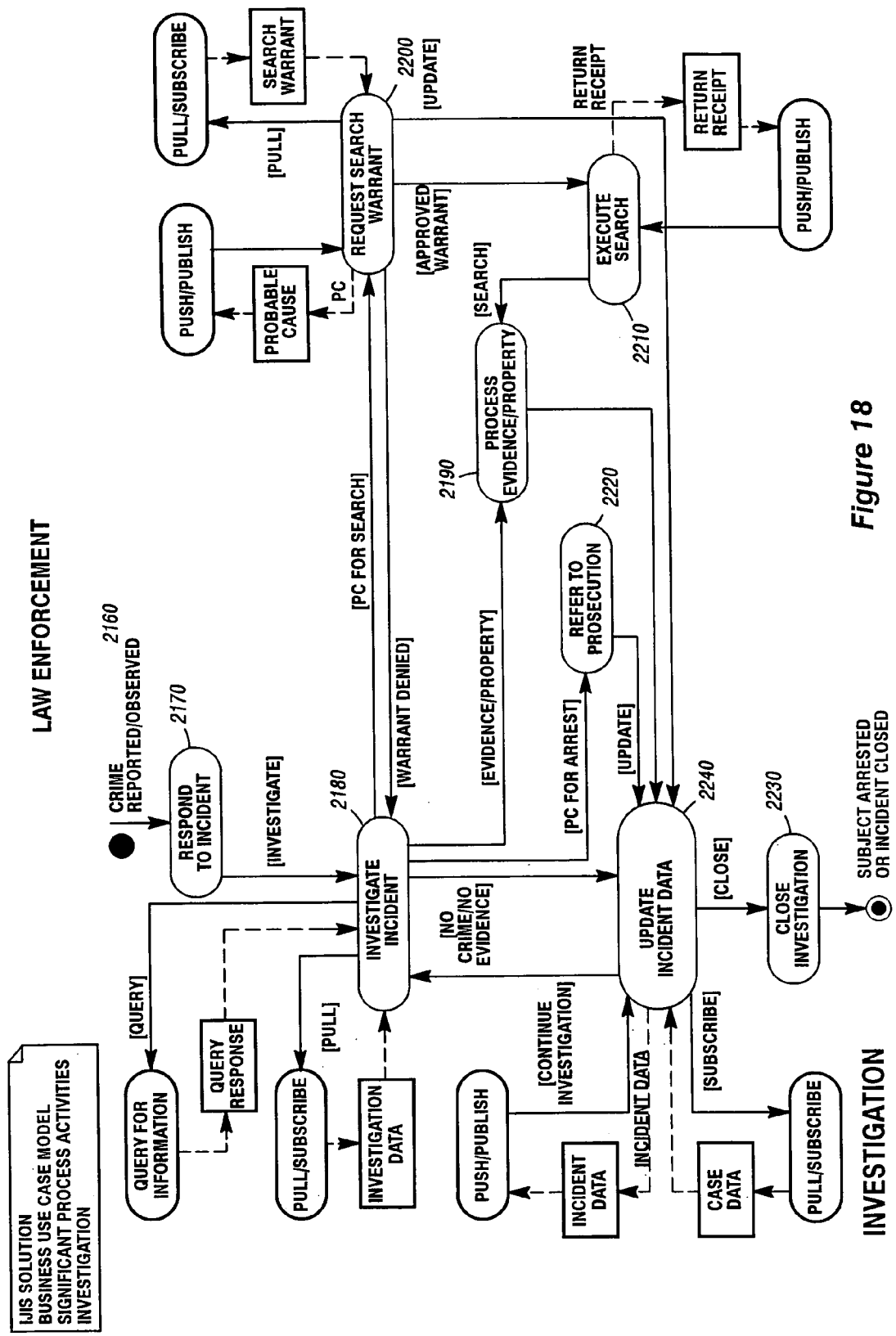
FIG. 18 illustrates the use case activity diagram for Investigation, including emergency response functions and law enforcement functions that capture information about observed and reported crime, support and operational needs of law enforcement officers in the field, the process of investigating crime, and the handling of evidence and property.
Figure 19:
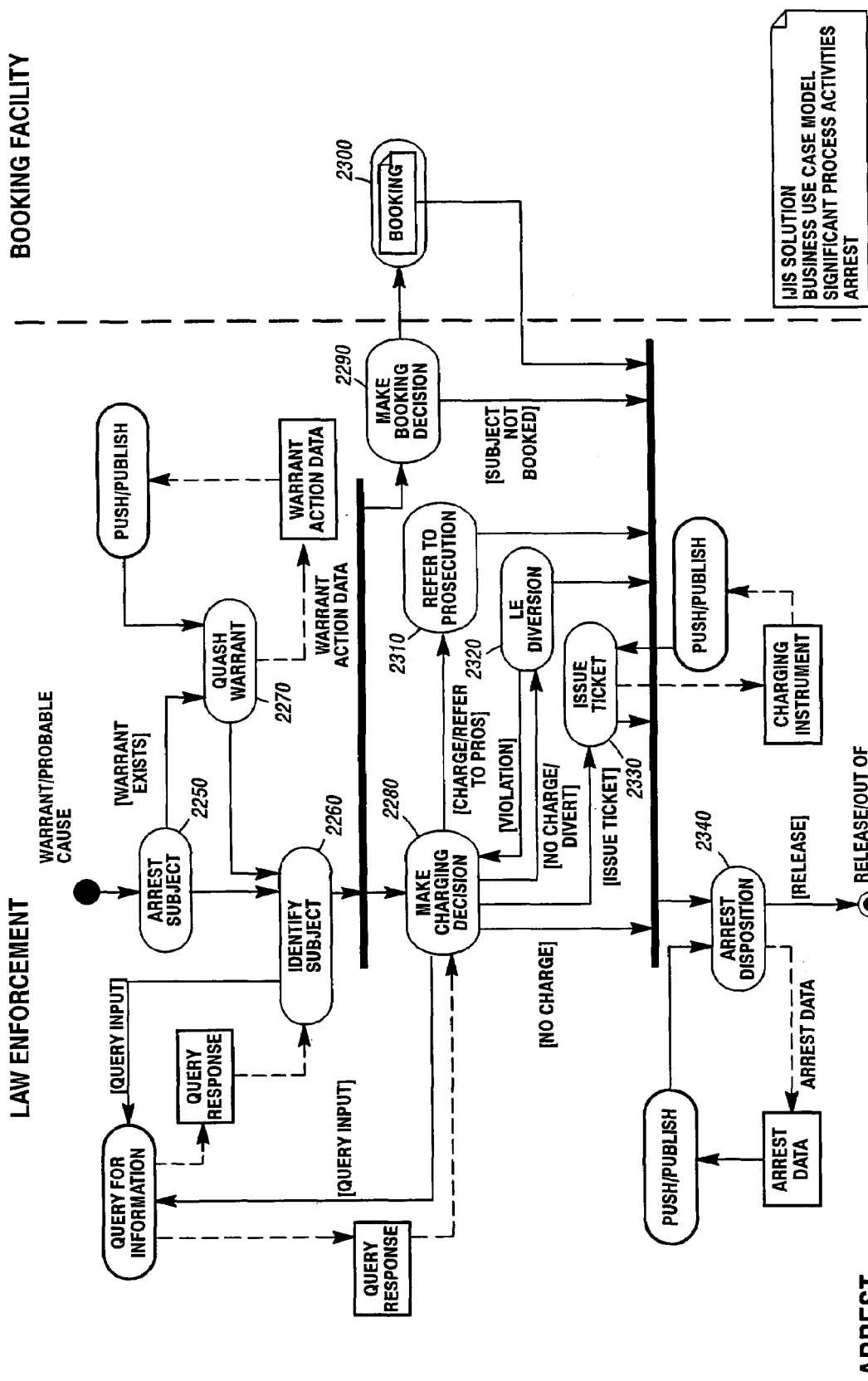
FIG. 19 illustrates the use case activity diagram for Arrest, including the apprehension of subjects.
Figure 20:
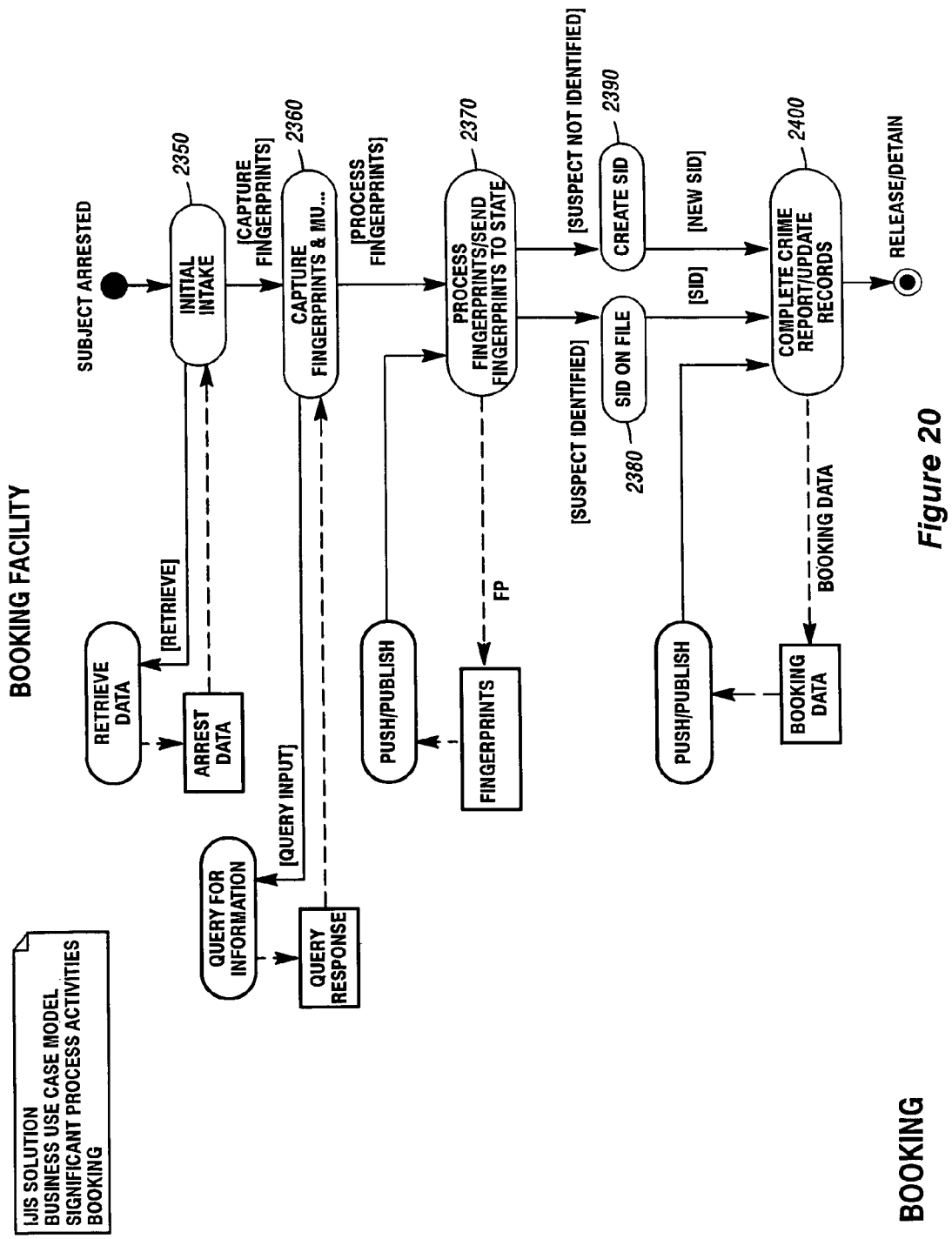
FIG. 20 illustrates the use case activity diagram for Booking, including the booking of subjects and law enforcement charging decisions.
Figure 21:
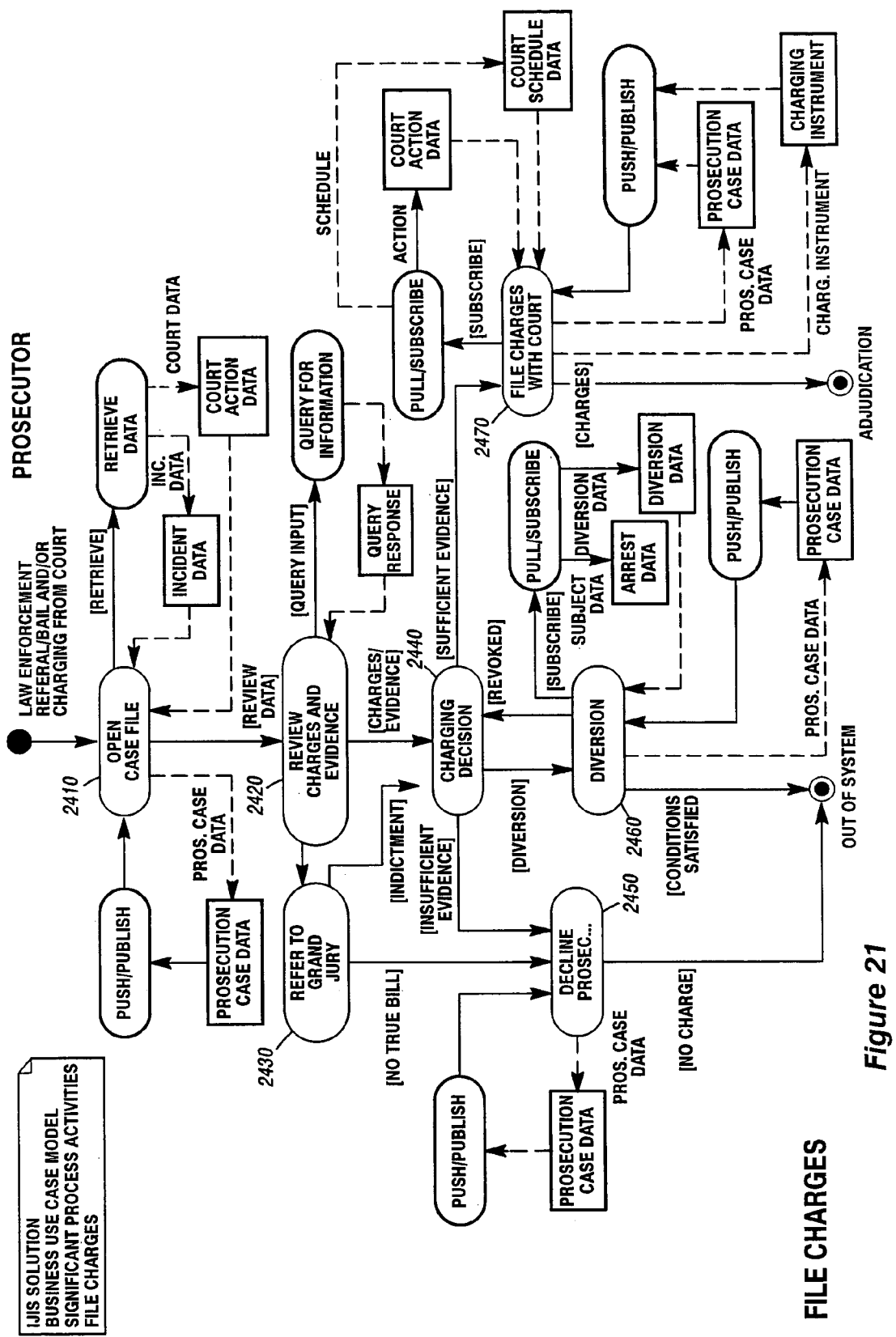
FIG. 21 illustrates the use case activity diagram for File Charges, including prosecution charging decisions.
Figure 22:
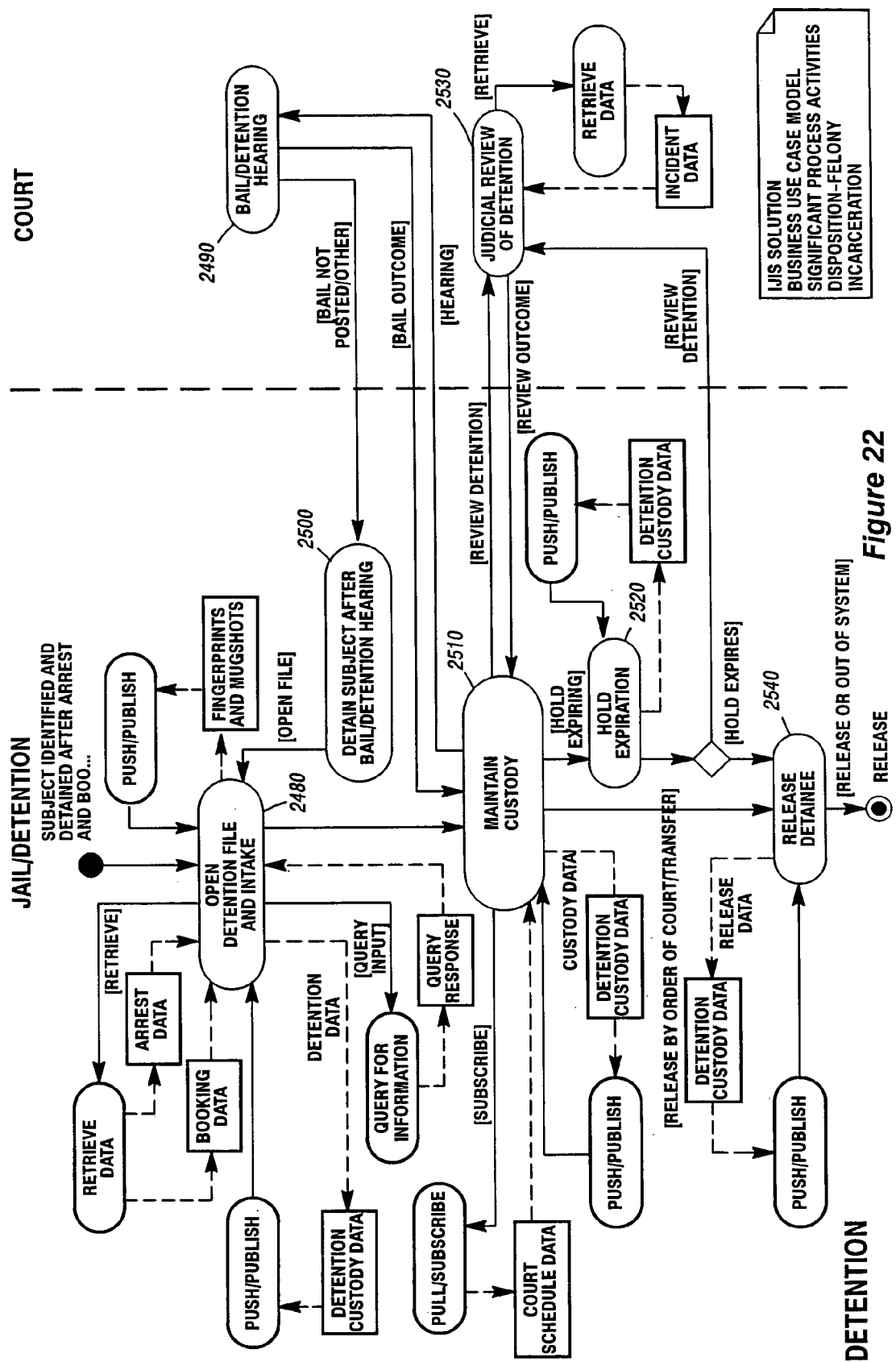
FIG. 22 illustrates the use case activity diagram for Detention, including pre-disposition detention functions such as intake, detention, and transport of subjects to court and other venues.
Figure 23A:
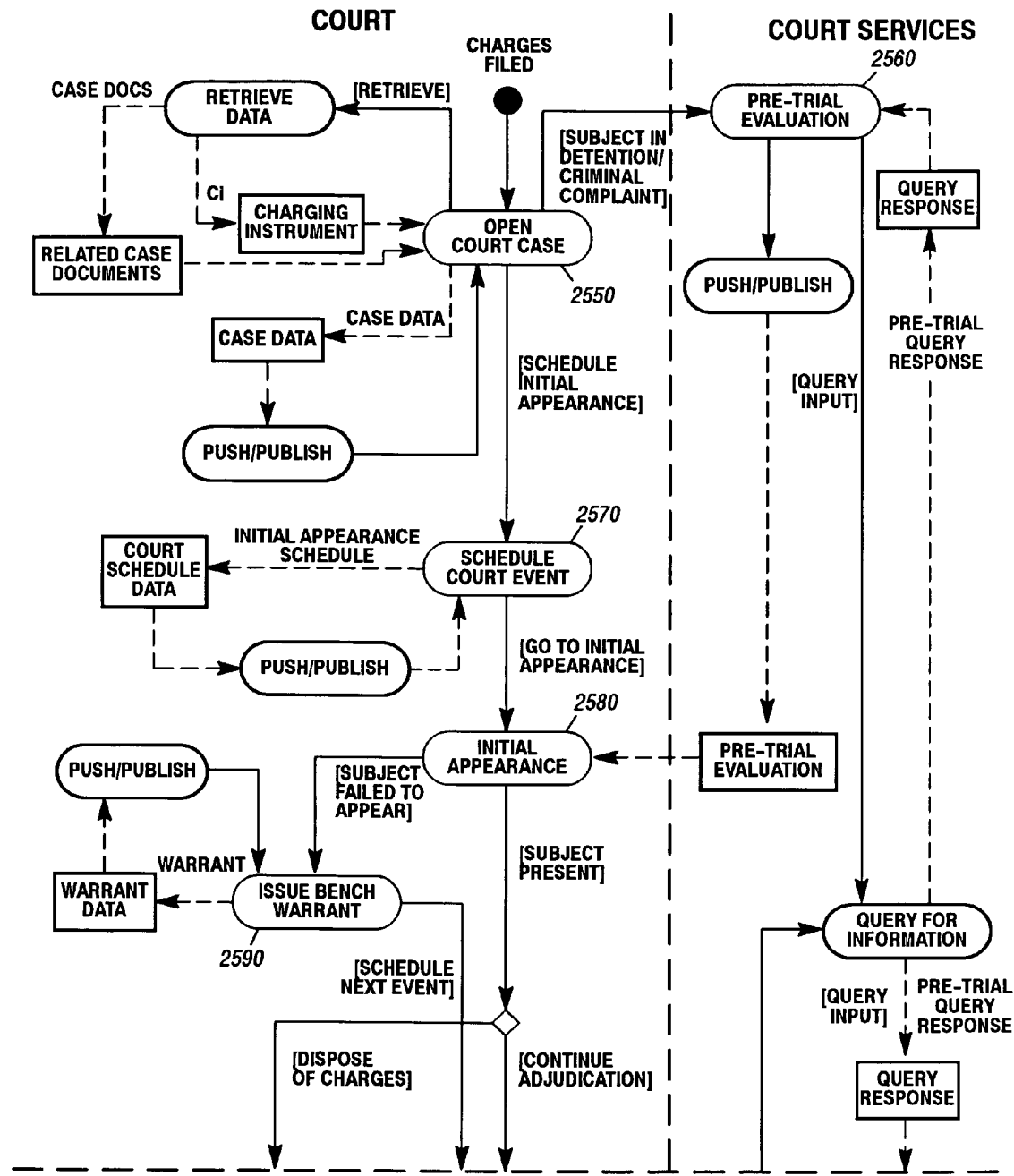
FIG. 23 illustrates the use case activity diagram for Adjudication, including the opening of a court case and all court events up to sentencing.
Figure 23B:
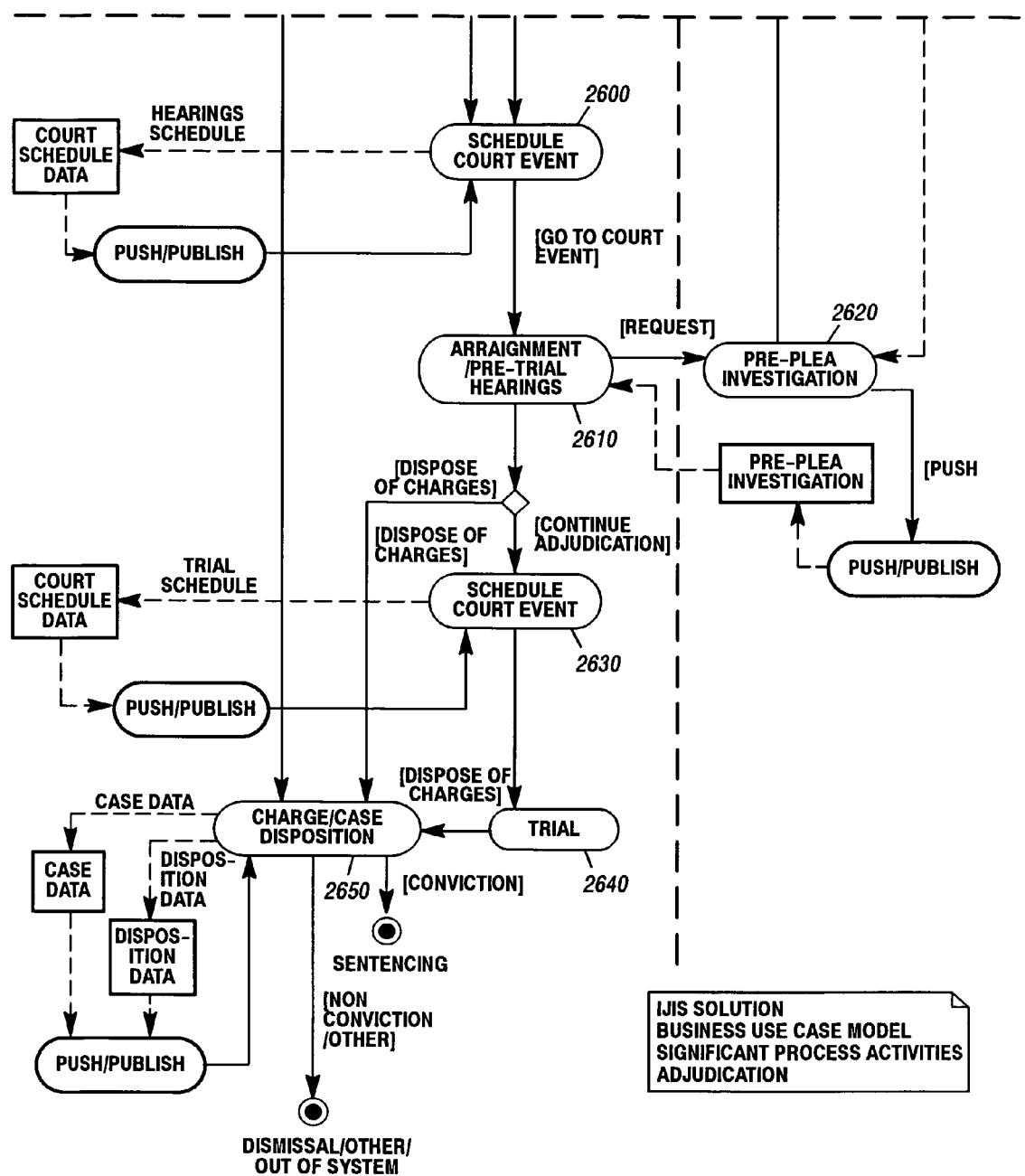

At the most basic level, the criminal justice process consists of apprehending, prosecuting, adjudicating, and supervising offenders. Throughout this process, criminal justice agencies must collaborate and exchange information with each other in order to track and build a complete view and history of incidents, offenders, and cases. The UML activity diagram of FIG. 2 provides a high-level view of the criminal justice process, broken into seven activities or business use cases as defined herein:

Investigation—includes emergency response functions and law enforcement functions that capture information about observed and reported crime, support and operational needs of law enforcement officers in the field, the process of investigating crime, and the handling of evidence and property (FIG. 18);

Arrest—includes the apprehension and booking of subjects, and law enforcement charging decisions (FIGS. 19 and 20);

File charges—includes prosecution charging decisions (FIG. 21);

Detention—includes pre-disposition detention functions such as intake, detention, and transport of subjects to court and other venues (FIG. 22);

Adjudication—includes the opening of a court case and all court events up to sentencing (FIG. 23);

Sentencing—includes sentencing and imposition of sanctions (FIG. 24); and

Disposition—includes administering of court-imposed sanctions: probation, misdemeanor and felony incarceration, and parole (FIGS. 25–28).

Major, critical, points of information exchange exist between each activity and agency. These points of information exchange, the type of information exchanged and the event or process during which it is exchanged, is shown in more detail in the activity diagrams depicted in FIGS. 18–28 for each one of the seven activities depicted in the activity diagram of FIG. 2. Each of these activity diagrams for the respective business use cases will be described below.

Investigation use Case (FIG. 18)

Crime Reported/Observed (2160)

When a crime is reported, a call for service is received through 911, the agency's phone line or by an officer observing a crime in progress. The call is recorded by a dispatcher who then assigns a law enforcement unit, and other units such as EMS, fire, public works, etc., to the event.

Respond to Incident (2170)

The assigned officer(s) will respond to the call and proceed to the location to investigate the event. The officer(s) should have the ability to pull all prior incidents that occurred at the address or location, along with any public service information that is relevant, such as the location of hazardous materials.

Investigate Incident (2180)

To investigate the incident, law enforcement will begin a process of gathering information. This may involve querying varying sources such as criminal history, federal sources of information (NCIC, III), and local sources (other departments' CMS) for related incident information. The query may also include vehicle registration. Based on the information resulting from the queries, law enforcement may pull certain data into their system to update their incident and investigation files.

Process Evidence/Property (2190)

Crime scene evidence or recovered property will be collected and processed (inventoried, cataloged, photographed, etc.).

Request Search Warrant/Execute Search (2200/2210)

If law enforcement determines that a search is needed for further investigation, they will request a search warrant from the court. The search warrant request is submitted electronically to the court with a description of probable cause for the search. Upon return of the approved warrant, law enforcement will execute the search and return, push, the warrant return receipt to the court with a list of recovered evidence or property.

Refer to Prosecution (2220)

Law enforcement may be able to identify the crime suspects but may not be able to make an arrest on the scene. Law enforcement will then refer the case to a prosecutor citing probable cause (PC). The prosecutor may, based on available evidence, make a decision to file charges and an arrest warrant will be issued. Law enforcement will subscribe to receive updates regarding the individual(s) and case(s) under investigation for the purpose of receiving either the notification of an arrest warrant or the outcomes of the prosecutor's charging decision.

Close Investigation (2230)

If law enforcement cannot determine that a crime has been committed or if there's insufficient evidence to make an arrest, law enforcement may close the investigation. Even though law enforcement may close an investigation, an incident may remain open in the event that new evidence becomes available. If it can be determined that no crime has occurred and no new evidence will be forthcoming, the incident will be closed as well.

Update Incident Data (2240)

When law enforcement updates the incident with the investigation findings in their case management system, the agency will also publish or push critical data regarding the incident to appropriate agencies.

Arrest use Case (FIG. 19)

Arrest Subject (2250)

Law Enforcement may arrest a subject based on an outstanding warrant or probable cause.

Identify Subject (2260)

Immediately upon apprehension, the officer needs to identify the subject in order to determine if there are any outstanding warrants or probable cause pickups. To do so, the officer may perform a Universal Query based on available information such as name and date of birth. If the officer is able to identify the subject, the officer will then make a charging decision. If the subject cannot be positively identified, the officer may take the subject to booking to be photographed and fingerprinted. The decision to book the subject will be made based on available evidence, the seriousness of the crime, or other factors. In order to identify a subject, a law enforcement officer may perform a query based on available information such as name, date of birth, driver's license number, etc.

Quash Warrant (2270)

If the arrest is made on the basis of an outstanding warrant the warrant must be quashed and removed from the warrant file. In most jurisdictions, the warrant will be removed from the state's Hot Files. If law enforcement makes an arrest based on a warrant, the warrant must be quashed and removed from the state's warrant file.

Make Charging Decision (2280)

The officer will make a charging decision based on the seriousness of the crime and the query results. The officer may decide to book the subject whether or not a charge is issued. The following are possible outcomes of a law enforcement charging decision: refer to prosecution, diversion, issue a ticket. In order to make a charging decision, the law enforcement officer may query various sources of information. For example, the officer may query a stolen vehicle database to see if the subject is driving a stolen vehicle.

Make Booking Decision (2290)

At any point in the arrest process, the officer may decide to book the subject (2300). For example, if the subject cannot be identified at the crime scene, the officer may decided to take the subject to booking. The officer may also decide to book the subject while making a charging decision.

Refer to Prosecution (2310)

For felony offenses, and certain lower-level offenses, law enforcement will refer the incident to prosecution for a charging decision. The incident may also be referred to the prosecutor if law enforcement was not able to make an arrest but an investigation results in probable cause to file charges.

Law enforcement will subscribe to the individual and case data referred to the prosecutor in order to monitor the charging decision and the issuance of a warrant that may result from that decision.

Law Enforcement (LE) Diversion (2320)

Law enforcement may divert the subject without charging them. The diversion will be tracked and progress reported to the law enforcement agency. If the subject violates the terms of the diversion, the subject may be charged on the original incident through a criminal complaint or delinquency petition. If the subject completes diversion successfully, the incident will be closed and the subject will not be charged.

Issue Ticket (2330)

For certain offenses, such as traffic violations, the officer will issue a ticket and release the subject. The ticket may indicate that the subject must schedule a court appearance. If that is the case, the ticket, i.e. the charging instrument, will be pushed to the court. If law enforcement charges the subject by issuing a ticket, the ticket will be pushed to the court or another agency. (In some jurisdictions, designated agencies, not the court, handle specific citations such as traffic violations.)

Arrest Disposition (2340)

The arrest disposition, i.e. ticket, diversion, release, detention, etc., is recorded in the agency's case management system and the data will be published so that it becomes available to other agencies. These include the prosecutor, the court, a probation officer, and other law enforcement agencies. After law enforcement makes a charging decision, they will update their record and enter an arrest disposition. The arrest data will be published so it can be accessed by other criminal justice agencies. If the subject is booked and/or law enforcement refers the case to prosecution, the arrest data will pushed directly to those agencies.

Booking use Case (FIG. 20)

Booking may occur immediately after arrest or at another point in the criminal justice process. For example, a subject who was released with a ticket may be asked to report to a booking facility at a later time or a subject may be booked in court at the time of initial appearance. Subjects, who have been prosecuted without being booked, may be booked after the adjudication and sentencing processes are completed. Generally, booking is performed at a booking facility but may be done elsewhere; for example, at a hospital or a detox center, if necessary.

Initial Intake (2350)

Before the subject arrives at the booking facility, law enforcement will push the arrest report to the facility. The facility will retrieve the report and use the data to open a new file. When law enforcement decides to take a subject to booking, they will push the arrest report to the booking facility. The facility will retrieve the arrest data and open a file before the subject arrives at the facility.

Capture Fingerprints and Mugshots (2360)

The booking process consists of taking fingerprints and photo images of a subject. Both fingerprints and mugshots should be captured electronically. The booking facility will query for information on the subject they are processing for fingerprints and mugshots to determine if other records exist.

Process Fingerprints/Send Fingerprints to the State (2370–2390)

After the subject is fingerprinted, the fingerprints are submitted to AFIS for scoring and analysis in order to positively identify the subject. If a match is found (2380), AFIS will return the SID number for the subject. If no match is found (2390), AFIS will return and new SID number for the subject. The SID number is then included in the crime report, booking document, and criminal history. The booking facility will push the fingerprints they captured for the subject to the state to be added to the subject's criminal history file. The fingerprints may also be pushed to the state for identification if the booking facility does not have means of evaluating the fingerprints on site.

Complete Crime Report/Update Records (2400)

The completion of the crime report includes listing the offenses the subject committed and the statutes that have been violated. The report and booking records will also be updated with the subject's SID number. The booking report will be published and made available to other agencies. The booking facility will publish the booking report and completed crime report when the booking process is completed. The report may also be pushed to specific agencies. For example, if the subject is to be detained after booking, the booking facility will push the booking data to the detention facility that is to receive the subject. Following booking, the subject may be released or detained. If the subject is to be detained, they will be transferred to a jail or detention facility.

File Charges use Case (FIG. 21)

The prosecutor will receive a referral from law enforcement or a bail or charging decision from the court.

Open Case File (2410)

When law enforcement or the court makes a charging decision, the agency will refer the case and push relevant data to the prosecutor. When the prosecutor retrieves the data, they will open a prosecution case and assign a case number. The prosecutor may receive a referral from law enforcement or a charging decision from the court. Depending on the source of the referral, the prosecutor will retrieve the incident/arrest data or the court's charging decision and open a case file. When the prosecutor opens a case file and assigns a case number, he/she will publish or push that information to other agencies and systems. The prosecutor's case/file number will be added to the associated incident and court case for tracking purposes.

Review Charges and Evidence (2420)

The prosecutor will review the incident report and/or the court's charging decision. He/she may also perform further query on the subject and related incidents. Based on available evidence, the prosecutor will then make a charging decision. In some cases, or in certain jurisdictions, the prosecutor may be required to refer the case to grand jury for indictment. In addition to the incident report or the court's charging decision that the prosecutor retrieves in order to open a case file, the prosecutor may also query varying sources of information before making a charging decision. For example, the prosecutor may query criminal history, the law enforcement records for more detail about the incident, other related incidents, etc.

Refer to Grand Jury (2430)

Some jurisdictions, or cases, require that the prosecutor refer the case to grand jury for indictment before filing charges. The grand jury ruling will be either indictment, in which case the prosecutor will proceed with their process, or no true bill, in which case the prosecutor will decline charges.

Make Charging Decision (2440)

After the prosecutor review available evidence and law enforcement's charges, he/she will make a charging decision. The outcome of the decision can be one of the following: dismiss the charges, divert the subject or file charges with the court.

Decline Prosecution (2450)

If there isn't enough evidence against the subject or the grand jury's ruling is "no true bill", the prosecutor will decline prosecution on some or all the charges. The prosecutor will then update his/her case file and publish the results of his/her charging decision to make it available to other agencies. For example, if law enforcement referred the subject to prosecution, they will receive a notification of the prosecutor's charging decision at this point.

Diversion (2460)

The prosecutor may decide to send the subject to a diversion program without charging them. The prosecutor will monitor the subject's progress in the program and if the subject completes the program successfully, the case will be closed. If the subject fails to complete the diversion program, the prosecutor will go through the process of making a charging decision at that time. The prosecutor will update his/her records and publish the diversion decision and outcomes. When the prosecutor makes the decision to divert the subject, he/she will also subscribe to receive updates from the diversion program and any events relating to the subject such as subsequent arrests. The prosecutor will publish the diversion decision and outcomes when they become available. Also, when the prosecutor sends the subject to a diversion program, he/she will subscribe to receive updates from the diversion program on the subject's progress and to receive notifications on any events related to the subjects, such as arrests and warrants.

File Charges with Court (2470)

If there is sufficient evidence, the prosecutor will file charges with the court. He/she will push the charging instrument (criminal complain) to the court and publish his/her charging decision. If law enforcement referred the subject to prosecution, they will receive a notification that charges have been filed and what the charges were (the prosecutor may file lesser or greater charges then were recommended by law enforcement based on available evidence.) The prosecutor will also subscribe to receive court schedule notifications and decisions regarding the case at this point. The prosecutor will push the charging instrument (criminal complaint) to the court. He/she will also publish his/her charging decision so that subscribing agencies, such as law enforcement can receive a notification of the charging decision outcome. Also, the prosecutor will subscribe to receive court schedule notifications and decisions regarding the case.

Detention use Case (FIG. 22)

A subject may be detained after booking. A booking facility may or may not be associated with a jail/detention facility. If there is no detention facility, the subject will be transported after booking is completed.

Open Detention File and Intake (2480)

The intake process at a jail involves creating or updating records in the jail management system to show that the subject is being added as an inmate. The information necessary for intake includes the arrest report and the booking information. This data will be pushed to the detention facility by law enforcement and the booking facility. The intake process includes inmate evaluation for medical, security, and program classification and the capture of fingerprints and mugshots. The jail may also perform a query for input into the evaluation and to find out if anyone needs to be notified of the subject's status and location. For example, if the subject is on probation, the jail will notify Corrections that their client is in detention.

The information necessary for intake includes the arrest report and the booking information. This data will be pushed to the detention facility by law enforcement and the booking facility. After opening a detention file, the detention facility will publish the file number so it can be added to related incidents and cases for tracking purposes. At intake, the detention facility may query various source for more information on the subject such as prior detention history, criminal history, etc. Fingerprints and mugshots capture during the intake process also will be pushed to CCH for inclusion in the subject's criminal history file.

Bail/Detention Hearing (2490)

A subject is either directed to appear in court for initial appearance/bail hearing or is brought to court if detained. At initial appearance, the court determines the amount of bail. If the subject can post bail and there are no other restrictions, the subject will be released. The subject will be detained after initial appearance if the subject is unable to post bail, cannot comply with the conditions of release, there is hold from another jurisdiction, etc.

Subject Detained after Bail/Detention Hearing (2500)

If the subject is detained for the first time after initial appearance, the jail will perform the intake process. Otherwise, the subject is transported back to jail. If the court issued a no-contact order, the jail will receive this information so they can comply by not allowing visits by anyone specified in the order.

Maintain Custody (2510)

After intake is completed the subject is detained. Jurisdictional rules control the length of time a subject may be held after arrest. These rules state that the court must review the subject's detention before the specified time expires. The detention facility will provide the court with information about the subject and the incident for review. If the subject remains in detention for part or the duration of the adjudication process, the detention facility will be responsible for transporting the subject to and from court. The detention facility will subscribe to receive court schedule data in order to know when to bring the subject to court. If the status of the subject changes while in detention the detention facility will publish that information. For example, the subject may be transported out of the facility for medical treatment or transferred to another facility due to overcrowding.

Hold Expiration (2520)

If the court does not review the subject's detention before the hold expires, the subject must be released. As the expiration time approaches, the detention facility will notify the prosecutor, defense, and possibly the victim that the subject will be release if no action is taken.

Judicial Review of Detention (2530)

The court may decide that there's insufficient reason to continue to hold the subject and the subject is released. Otherwise, the subject remains in jail until initial court appearance. If the hold time expires before the review, the subject is released. The detention facility will subscribe to the court schedule for the subject in order to know when to bring the subject to court for hearings and trial. The detention facility also will publish any change in the subject's status while in custody.

Release Detainee (2540)

The subject may be released from jail for various reasons and under varying circumstances. For example, the subject may be release because no charges were filed by law enforcement, prosecution or the court; the subject may be charged and released under specific conditions to be monitored by Corrections; or the subject may be charged and released unconditionally. The jail will update their case management records and publish or push release information to the appropriate criminal justice agencies and systems.

Adjudication use Case (FIG. 23)

Open Court Case (2550)

The court will open a new case whenever a charging instrument is received. The charging instrument will be pushed to the court by the agency that issued it. The charging instrument may be one of the following:

a Law Enforcement ticket for which a court appearance has been scheduled or for which the defendant schedules an appearance;

A criminal complaint issued by a prosecutor for a felony charge and certain misdemeanor charges. If the subject is to be arrested, a warrant will be issued by the court on the basis of the criminal complaint;

For juveniles, prosecution may issue a delinquency petition or a citation; or

A grand jury indictment may be used as a charging instrument for certain felonies.

The charging instrument will be pushed to the court by the agency that issued it. The court will retrieve the charging instrument and open a court case. The court may also retrieve other related documents and data such as the subject's other cases, subpoenas, crime reports, etc. After opening the case and assigning a docket number, the court will publish or push that information to the appropriate agencies. Agencies to which this information will be pushed directly include law enforcement, the prosecutor, and a detention facility if the subject is detained.

Pre-Trial Evaluation (2560)

Court Services will complete a pre-trial evaluation for subjects who are in detention or for subjects who are not in detention but who have been charged by a criminal complaint. A pre-trial evaluation determines if a subject is eligible for a public defender and makes recommendations on bail amount and conditions of pre-trial release. Court Services will query for any information about the subject and the subjects criminal history for input into the evaluation report. The results of the evaluation are pushed to the court for initial appearance and bail hearings.

Schedule Court Event/Publish Court Schedule Data (2570)

When the charging instrument is received, initial appearance is scheduled and recorded on the court calendar. The court calendar is published so that agencies, such as the prosecutor and law enforcement, involved in the case can receive a notification of when the subject is to appear in court.

Initial Appearance (2580)

There are a number of events that can occur at initial appearance. For example, if the subject has not been booked, the booking may be done at the court to positively identify the individual. The subject may be assigned a defense attorney, diverted, arraigned for non-felony charges or detained. If the subject fails to appear, a bench warrant may be issued. Depending on circumstance, charges may be disposed of at this stage and the case will not continue to trial. The outcomes of initial appearance, including charge dispositions, are recorded in the court case management system and published.

Issue Bench Warrant (2590)

If the subject fails to appear at initial appearance the court will issue a bench warrant for the subject's arrest. The warrant will be published in the state's hot files where it can be accessed by law enforcement.

Schedule Court Event (2600)

If the subject is to be arraigned, the court will schedule an arraignment and recorded it in the court calendar. The court calendar is published so that agencies, such as the prosecutor and law enforcement, involved in the case can receive a notification of when the subject is to appear in court. The court calendar is published so that agencies involved in the case can receive notification of when their representatives and the subject are to appear in court.

Arraignment/Pre-Trial Hearings (2610)

If the subject has not been released, convicted, or arraigned at initial appearance, an arraignment and a number of hearings may occur before trial begins. At arraignment, charges are formally stated and plea is entered. If the subject pleas guilty or charges are dismissed, the case will not continue on to trial. If a subject fails to appear for any scheduled court appearance, a bench warrant will be issued. The outcome of any hearing, including charge dispositions, will be recorded in the court case management system and published.

Pre-Plea Investigation (2620)

A judge may order a pre-plea investigation at any time before trial from court services. The results or pre-plea investigations may be used as part of the bargaining process between defense and prosecution. Court Services will query for any information on the subject and the subjects criminal history for input into the investigation. Once a pre-plea investigation is completed, court services will push the document to the court.

Schedule Court Event (2630)

If the case reaches trial, the court will schedule the trial and recorded it in the court calendar. The court calendar is published so that agencies, such as the prosecutor and law enforcement, involved in the case can receive a notification of when the subject is to appear in court.

Trial (2640)

Before trial begins, a jury will be selected. At the conclusion of the trial, a finding of guilty/not guilty will be recorded for each charge. The charge dispositions will be recorded in the court case management system and published.

Charge/Case Disposition (2650)

At any point in the adjudication process, between initial appearance through trial, charges may be disposed of via dismissal, plea bargain, finding of guilt, etc. Disposition is recorded for each charge in the court case management system and then published or pushed to other criminal justice agencies and systems, including the state's criminal history system. Other critical case information will also be published and pushed to other agencies. If any of the charges result in a conviction, the case will proceed to sentencing Disposition is recorded for each charge in the court case management system and then published or pushed to other criminal justice agencies and systems, including the state's criminal history system. Other critical case information will also be published and pushed to other agencies. If any of the charges result in a conviction, the case will proceed to sentencing.

Figure 24:
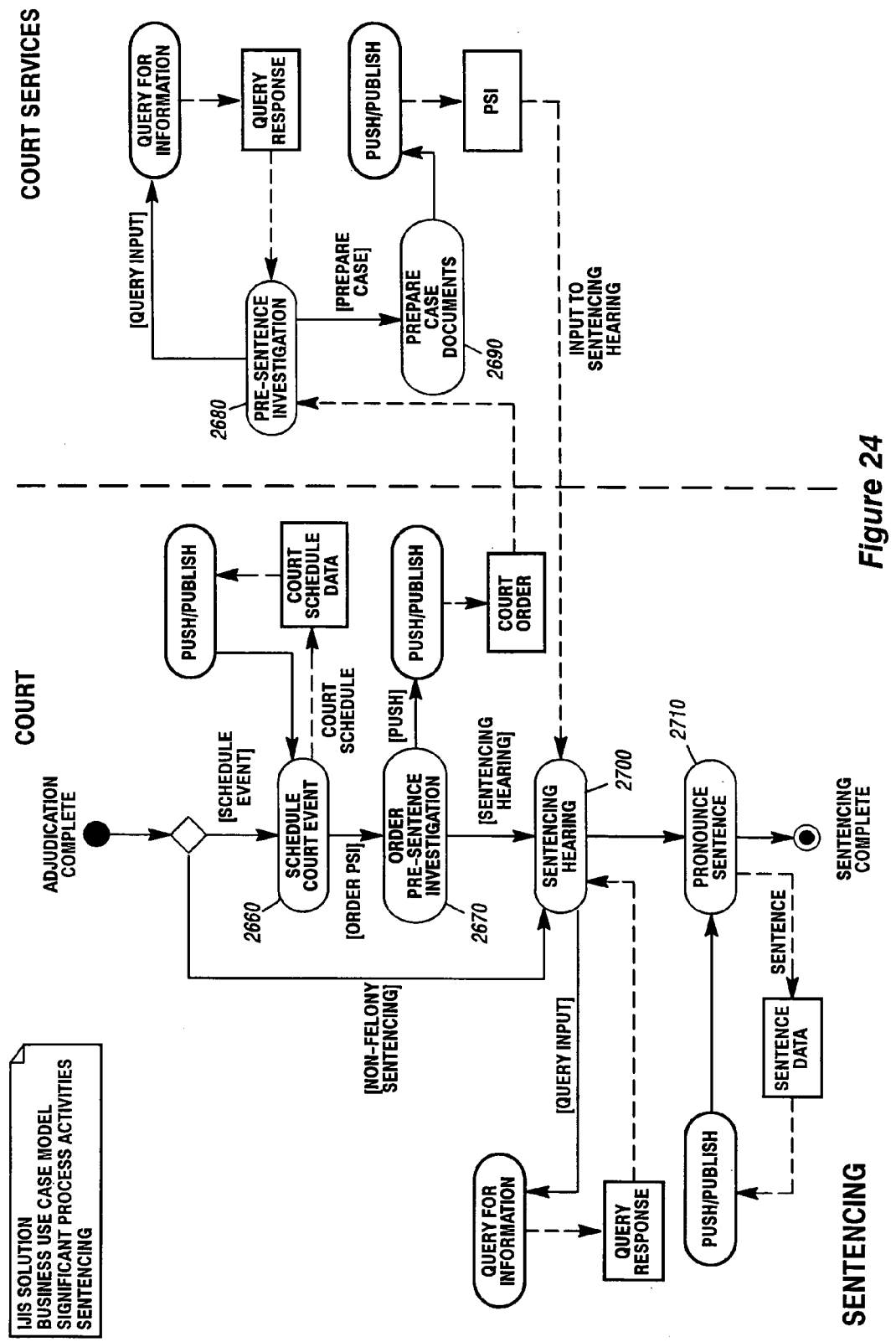
FIG. 24 illustrates the use case activity diagram for Sentencing, including sentencing and imposition of sanctions.

Sentencing use Case (FIG. 24)

When the adjudication process is completed and a verdict of guilty or adjudicated is determined, the court will prepare for sentencing. A sentence may be decided or recommended by the jury, as in capital cases, or imposed by the judge. In felony cases, a sentencing hearing may be scheduled for a later time to allow for a preliminary sentencing investigation to be completed. For non-felony cases, a sentencing decision may take place immediately after adjudication.

Schedule Court Event (2660)

If the court decides to hold a sentencing hearing, the hearing will be scheduled and put on the court calendar. The court calendar will be published so other agencies can receive notification of the hearing. The court will publish the court calendar when scheduling a court event, such as the sentencing hearing. Agencies that subscribe to the court calendar for a specific subject and case will receive a notification of the date, time, and location of the hearing.

Order Pre-Sentence Investigation (2670)

The court may order the preparation of a pre-sentence report to guide the sentencing decision. If the court orders a pre-sentence investigation, the court order will be pushed to the agency that is to prepare the report.

Pre-Sentence Investigation (2680)

Court Services will conduct a pre-sentence investigation if ordered by the court. In preparation for the pre-sentence investigation report, court service will query the subject's criminal history and other sources such as sentencing guidelines.

Prepare Case Documents (2690)

The pre-sentence investigation report almost always includes information about the defendant's past criminal activity as well as criminal history score, victim impact statement, and sentencing recommendations based on the state's sentencing guidelines. Once the pre-sentence investigation is completed, court services will push the investigation report back to the court. The report will serve as input for making a sentencing decision.

Sentencing Hearing (2700)

At a sentencing hearing, the judge or the jury will consider the information included in the pre-sentence investigation report as well as input from prosecution and defense. The judge may make a sentencing decision immediately after adjudication, without ordering a pre-sentence investigation. To make the sentencing decision, the court may query various source such as the subject's criminal history, prior cases, and other court records or order a pre-sentence investigation.

Pronounce Sentence (2710)

Following a sentencing hearing or a sentencing decision, the judge or the jury will pronounce a sentence for the defendant and specify sanctions. The sentence may include (separately or in combination):

The death penalty;
Incarceration in a prison, jail or other facility;
Probation;
A suspended sentence, in whole or in part;
A fine;
Restitution;
Forfeiture of the proceeds;
Confinement in a mental health facility; and/or
Community service.

Once the sentence is pronounce and sanctions are specified, the court will publish this information so it can become available to other agencies. If the subject is to be incarcerated or is sentence to probation, this information may be pushed directly to the agency administering the terms of the sentence.

Disposition use Cases (FIGS. 25–28)

Figure 25:
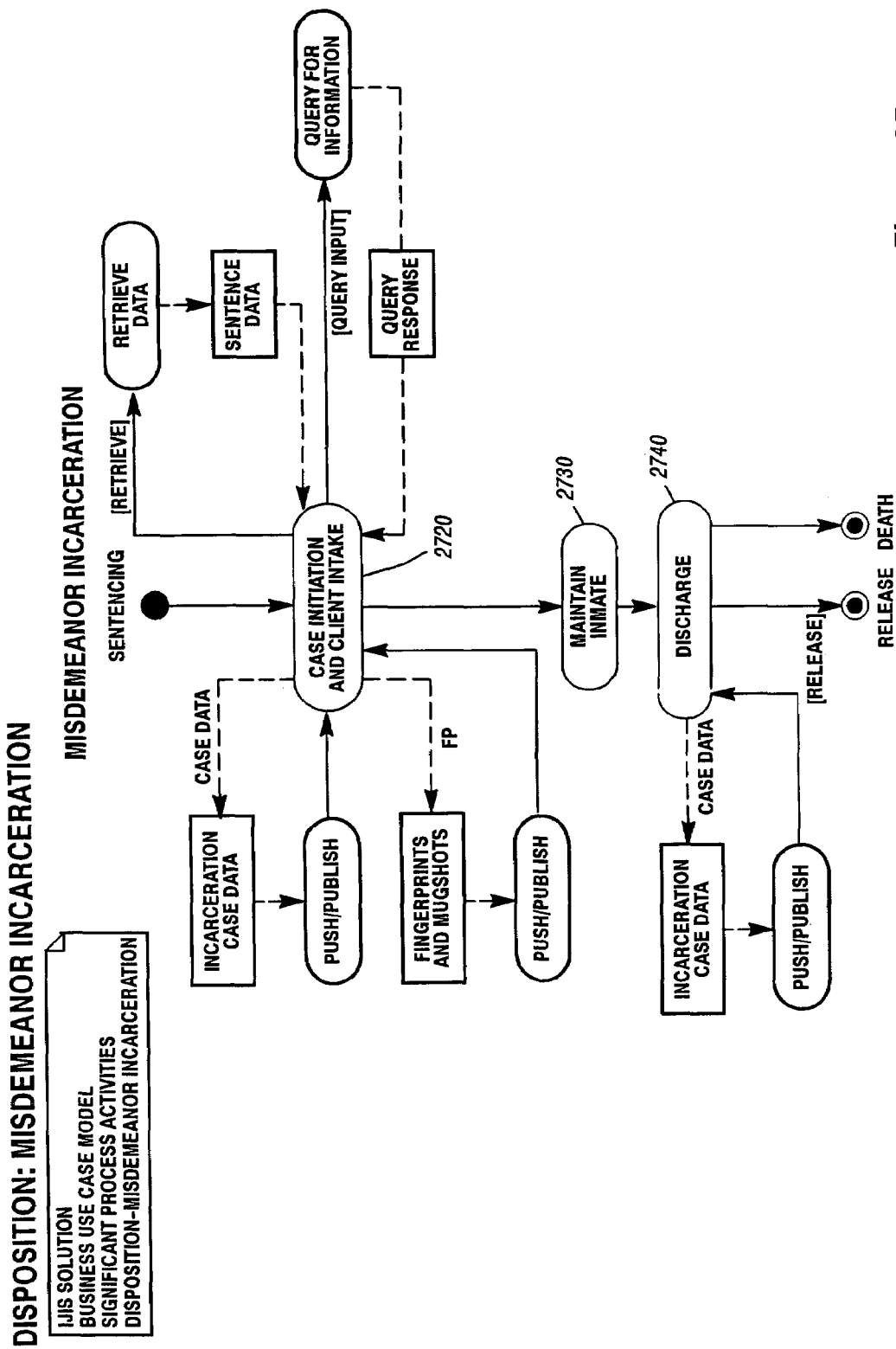
FIG. 25 illustrates the use case activity diagram for Disposition: Misdemeanor Incarceration, including administering of court-imposed sanctions.

Disposition: Misdemeanor Incarceration use Case (FIG. 25)

A subject who receives a sentence of less than one year of incarceration will serve his/her sentence in a local detention facility. Local facilities are, generally, run by the county sheriff.

Case Initiation and Client Intake (2720)

If the court specifies incarceration of less than one year, the sentencing order will be pushed to the detention facility. The facility will retrieve the document and open a new inmate file and add the sentencing data to the file. The facility will then publish the detention case number so it can be added to related incidents and cases for tracking purposes. The detention facility will go through an intake process when they receive the subject. The intake process includes evaluation of the inmate for medical and security classification and for program assignment. The facility may query various sources of information for input into the classification process. These sources include criminal history, other detention cases, etc. The intake process also includes the capture of fingerprints and mugshots. Both fingerprints and mugshots will be compared to existing fingerprints and mugshots on file and will be added to the inmate's criminal history file.

The detention facility will retrieve the sentencing order that the court pushed to the facility. The details of the sentencing order will be added to the inmate's case file. After opening a new case file and assigning a case number, the detention facility will publish the case number so it can be added to related incidents and cases for tracking purposes. The prison will push the inmate's fingerprints and photos to the state. The prison may query various sources of information in order to update records on their inmate. This source may include the state's criminal history, federal sources of information, other agencies records, etc.

Maintain Inmate (2730)

Maintaining the inmate consists of a variety of activities the facility performs to manage the inmate. This may include administering medications, monitoring work release (jails only), administering or monitoring of treatment programs, etc. Generally, most of these activities are tracked internally. Major events, such as a change in status, e.g. escape, of the inmate will be published to other agencies.

Discharge (2740)

The subject will be release from jail at the end of their incarceration term. When the jail releases the subject, they will publish the release information. The inmate may also die of natural or other causes while incarcerated. The facility will publish discharge data when the inmate is discharged.

Disposition: Felony Incarceration use Case (FIG. 26)

A subject who receives a sentence of one year or more of incarceration will serve his or her sentence in a state correctional institution (prison) run by the state's Department of Corrections (DOC). A prison will receive a subject either directly after sentencing or as a result of inter or intra-state transfer.

Open DOC Case and Intake (2750)

If the court specifies incarceration of one year or more, the sentencing order will be pushed to the DOC. The DOC will determine to which one of its prisons the subject will be admitted and push the sentencing order to that facility. The facility will retrieve the document and open a new prison file for incoming inmate and add the sentencing data to the file. The facility will then publish the supervision case number so it can be added to related incidents and cases for tracking purposes. The prison will go through an intake process when they receive the subject. The intake process includes evaluation of the inmate for medical, psychological, security, treatment, and program classification. The prison may query various sources of information for input into the classification process. This may including querying criminal history, detention/incarceration history, etc. The facility will also capture the inmate's fingerprints and mugshots. The fingerprints and mugshots will be pushed to criminal history to update the subject's record.

The prison will retrieve the sentencing order that the DOC pushed to the facility. The details of the sentencing order will be added to the prison's case file for the inmate. After opening a new case file and assigning a case number, the prison will publish the case number so it can be added to related incidents and cases for tracking purposes. The prison also will push the inmate's fingerprints and photos to the state. In addition, the prison may query various sources of information in order to update records on their inmate. This source may include the state's criminal history, federal sources of information, other agencies records, etc.

Maintain Inmate (2760)

The administration of the terms of incarceration consist of a variety of activities the prison performs to manage the inmate. Generally, most of these activities are tracked internally. A few major events, such as a parole board hearing and decision and the release of the inmate will be published to other agencies.

Parole Board Decision (2770)

As the time of the inmates release approaches, the inmate will make a request for a parole board hearing if parole after incarceration was specified by the court. The inmate may also make a request for early release. The parole board will notify the prison of its decision.

Terminate Sentence (2780)

Subjects eligible for parole will be released from the prison after the parole board approves the release and notifies the prison of its decision. Subjects, whose sentence does not specify parole, will be released from the prison at the end of their incarceration term. When the prison releases the subject, they will publish the release information. If the subject is released to parole, the prison will push appropriate case and subject data to the supervising agency.

Figure 27:
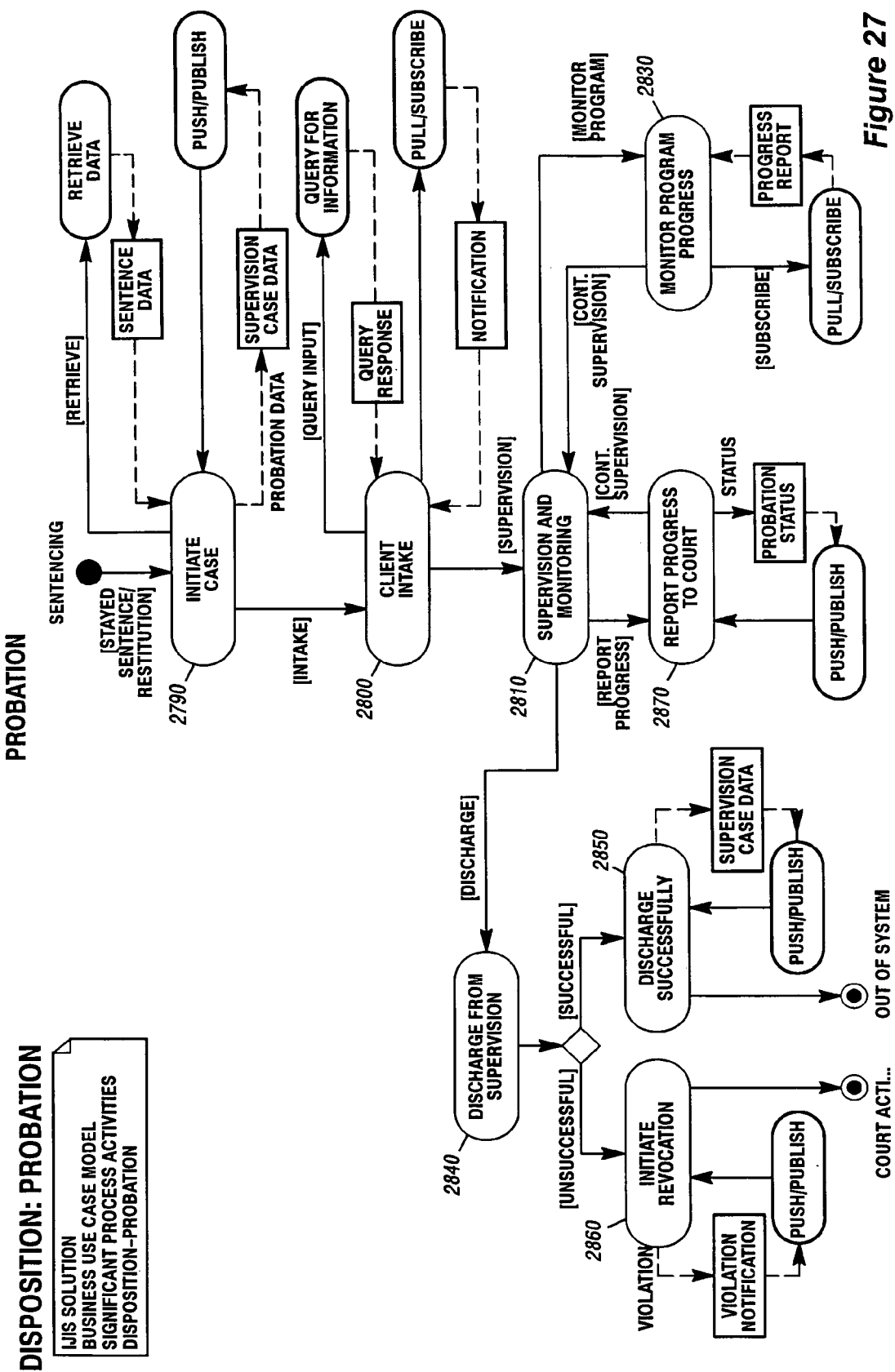
FIG. 27 illustrates the use case activity diagram for Disposition: Probation, including discharge and revocation.

Disposition: Probation use Case (FIG. 27)

Depending on the jurisdiction, supervision is performed either by the state's department of corrections (DOC) or by a local community corrections (CC) agency. For all probation cases, the supervising agency reports their clients' progress to the court. A supervising agency may also receive a client as a result of inter- or intra-state transfer. The supervision process will be the same as for a client sentenced by the local court.

Initiate Case (2790)

If the court specifies probation or restitution the sentencing order will be pushed to the supervising agency which will initiate a new supervision case for their client and add the sentencing data to the file. The supervising agency will then publish the supervision case number so it can be added to related incidents and cases for tracking purposes. The supervising agency will retrieve the sentencing order that the court pushed to the agency. The details of the sentencing order will be added to the supervision agency's case file. After opening a new case file and assigning a case number, the supervising agency will publish the case number so it can be added to related incidents and cases for tracking purposes.

Client Intake (2800)

When a client reports to the agency for supervision, the agency will conduct an intake interview. Intake also includes a classification process during which the supervising agent determines level of supervision, treatment plan, and conditions of supervision. The agency may query various sources such as criminal history and past supervision history as input into the classification process. At intake, based on the level of supervision and conditions imposed on the client, the agent will also subscribe to any events relating to client, such as arrest, in order to receive notification if the client is arrested while under supervision. The supervising agency may query various sources of information in order to update records on their client. This source may include the state's criminal history, federal sources of information, other agencies records, etc. The supervising agency also will subscribe to any events regarding their client, based on the level of supervision and assigned conditions. For example, the agent may subscribe to receive notifications of the client's arrest while on supervision. If the client is arrested the agency will be notified immediately and take appropriate actions, e.g. file a violation report.

Supervision and Monitoring (2810)

The supervising agent will meet with the client at specified intervals, and monitor the client's progress in assigned programs and the client's adherence to the prescribed conditions. The agent will report the client's progress to the court on regular basis.

Report Progress to Court (2820)

The supervising agency will be required to report the client's progress in a probation status report to the court at specified intervals, usually once or twice yearly.

Monitor Program Progress (2830)

The supervising agency may contract with outside agencies for programs the client must complete as part of their sentence. The programs may include AA, counseling, public service, etc. The supervising agency will subscribe to receive progress reports on their client from the agency administering the program.

Discharge from Supervision (2840)

A client may be discharged successfully or unsuccessfully. Successful discharge means that the client has completed all programs and satisfied all supervision conditions successfully. As the end of the probation term approaches, or if the supervising agent determines that the client may be released early, the supervising agency will discharge the client and close the case. The date of discharge will be published to subscribing agencies. Unsuccessful discharge results when the client violates on or more conditions of their sentence. In this case, the supervising agency will initiate a revocation process.

Discharge Successfully (2850)

When the client is discharged successfully, the supervising agency will update their records and publish their case data. A final status report will be pushed to the court and criminal history. The supervising agency will publish release data so it can become available to other agencies. The supervision release data will also be pushed to the state's criminal history in order to update the subject's records.

Initiate Revocation (2860)

If the client violates any conditions of their supervision, the supervising agency will initiate a revocation procedure. The notification of violation will be pushed to the appropriate agencies which may include law enforcement, the department of corrections, CCH, and the court. If the client is to be apprehended, the court will issue a warrant for the arrest. The revocation procedure will initiate a court action such as resentencing. The supervising agency will push a notification of violation to the court and other agencies that include law enforcement, the department of corrections, CCH, etc.

Figure 28:
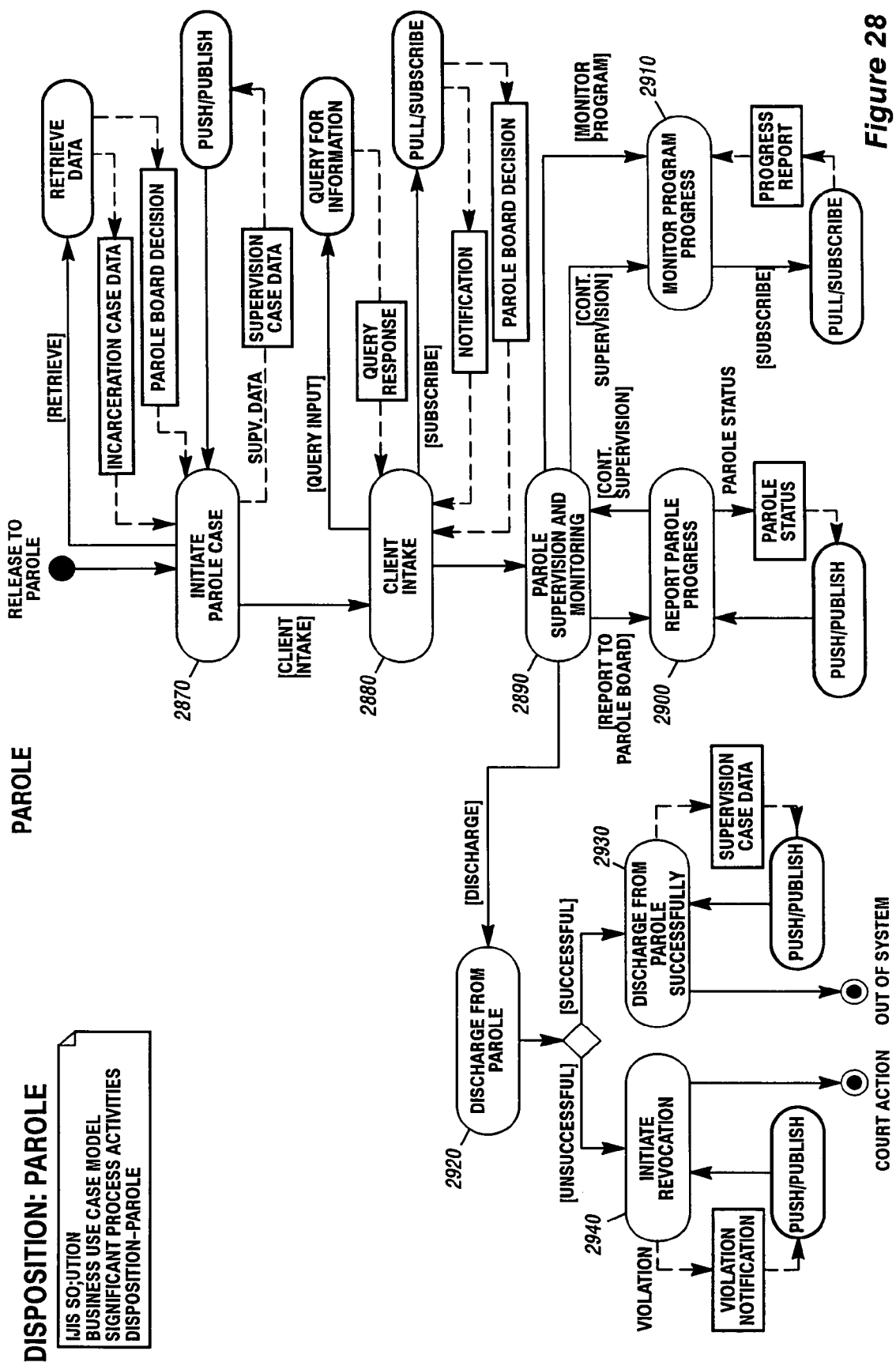
FIG. 28 illustrates the use case activity diagram for Parole, including discharge and revocation.

Parole use Case (FIG. 28)

Depending on the jurisdiction, parole supervision is performed either by the state's department of corrections (DOC) or by a local community corrections (CC) agency. For all parole cases, the supervising agency reports their clients' progress to the parole board.

Initiate Parole Case (2870)

If the court specifies parole after incarceration and the parole board approves the subject's release from prison, the supervising agency will receive the parole board decision and the prison's case file. The supervising agency will initiate a case file and publish the case number so it can be added to related incidents and cases for tracking purposes. The supervising agency will retrieve the prison case file and the parole board decision that have been pushed to the agency. The details of each document will be added to the supervision agency's case file. After opening a new case file and assigning a case number, the supervising agency will publish the case number so it can be added to related incidents and cases for tracking purposes.

Client Intake (2880)

When a client reports to the agency for supervision, the agency will conduct an intake interview. Intake also includes an evaluation process for classification, determination of the level of supervision, treatment plan, and conditions of supervision. The agency may query various sources such as criminal history and past supervision history as input into the classification process. At intake, based on the level of supervision and conditions imposed on the client, the agent will also subscribe to any events relating to client, such as arrest, in order to receive notification if the client is arrested while under supervision.

The supervising agency may query various sources of information in order to update records on their client. This source may include the state's criminal history, federal sources of information, other agencies records, etc. The supervising agency also will subscribe to any events regarding their client, based on the level of supervision and assigned conditions. For example, the agent may subscribe to receive notifications of the client's arrest while on supervision. If the client is arrested the agency will be notified immediately and take appropriate actions, e.g. file a violation report. Also, for parolees, the supervising agency will subscribe to receive the parole board decision regarding the parolee's release from parole.

Parole Supervision and Monitoring (2890)

The supervising agent will meet with the client at specified intervals, and monitor the client's progress in assigned programs and the client's adherence to the prescribed conditions. The agent will report the client's progress to the parole board on regular basis.

Report Parole Progress (2900)

For parolees, the supervising agency will push a report containing the parolee's status, i.e. successful/unsuccessful progress, to the parole board.

Monitor Program Progress (2910)

The supervising agency may contract with outside agencies for programs the client must complete as part of their sentence. The programs may include AA, counseling, public service, etc. The supervising agency will subscribe to receive progress reports on their client from the agency administering the program.

Discharge from Parole (2920)

Only the parole board can make the decision to discharge the subject from parole. If the release is approved, the supervising agency will receive the parole board's decision and discharge the client. If the client violates parole, the supervising agency will initiate revocation.

Discharge from Parole Successfully (2930)

When the client is discharged successfully, the supervising agency will update their records and publish their case data. A final status report will be pushed to the parole board and criminal history. The supervising agency will publish release data so it can become available to other agencies. The supervision release data will also be pushed to the state's criminal history in order to update the subject's records.

Initiate Revocation (2940)

If the client violates any conditions of their supervision, the supervising agency will initiate a revocation procedure. The notification of violation will be pushed to the appropriate agencies which may include law enforcement, the department of corrections, CCH, the court, and, in parole cases, the parole board. If the client is to be apprehended, the court will issue a warrant for the arrest. The revocation procedure will initiate a court action such as re-sentencing.

Business Object Model

Figures 29, 29A:
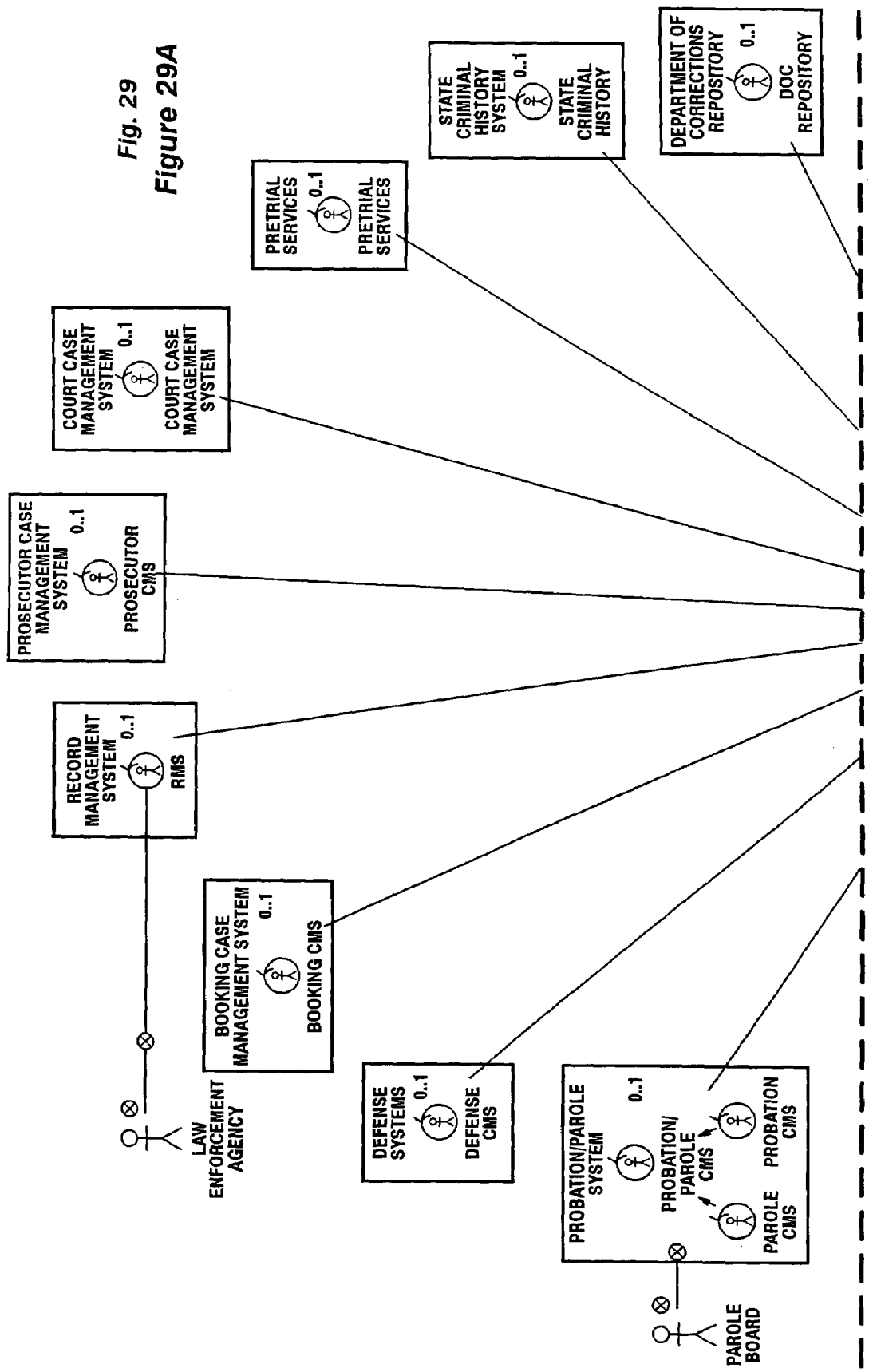
FIG. 29 illustrates a business object model of the arrest, adjudication and disposition entities and their interaction with the IJIS system.
Figures 29, 29B:
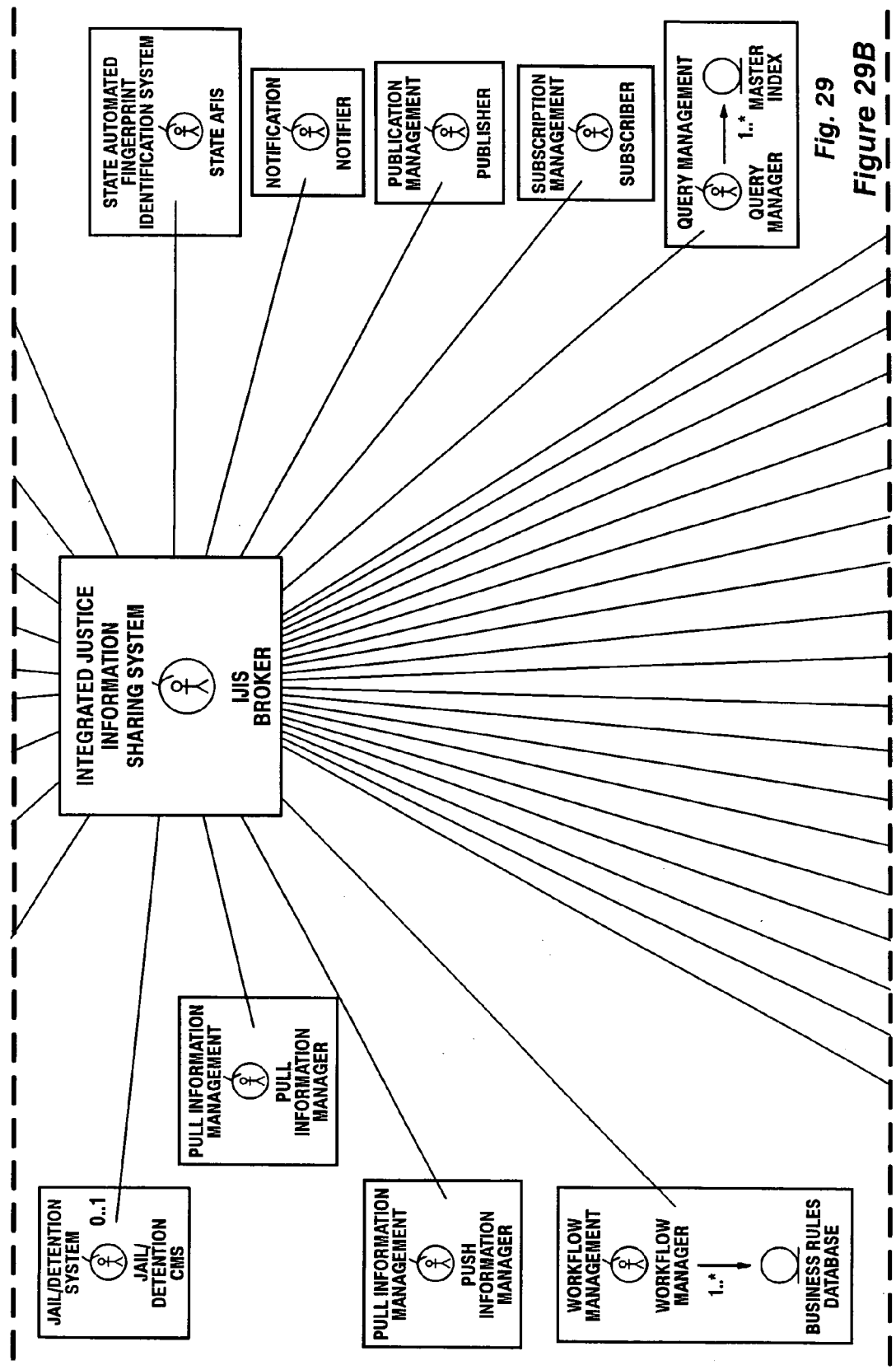
Figures 29, 29C:
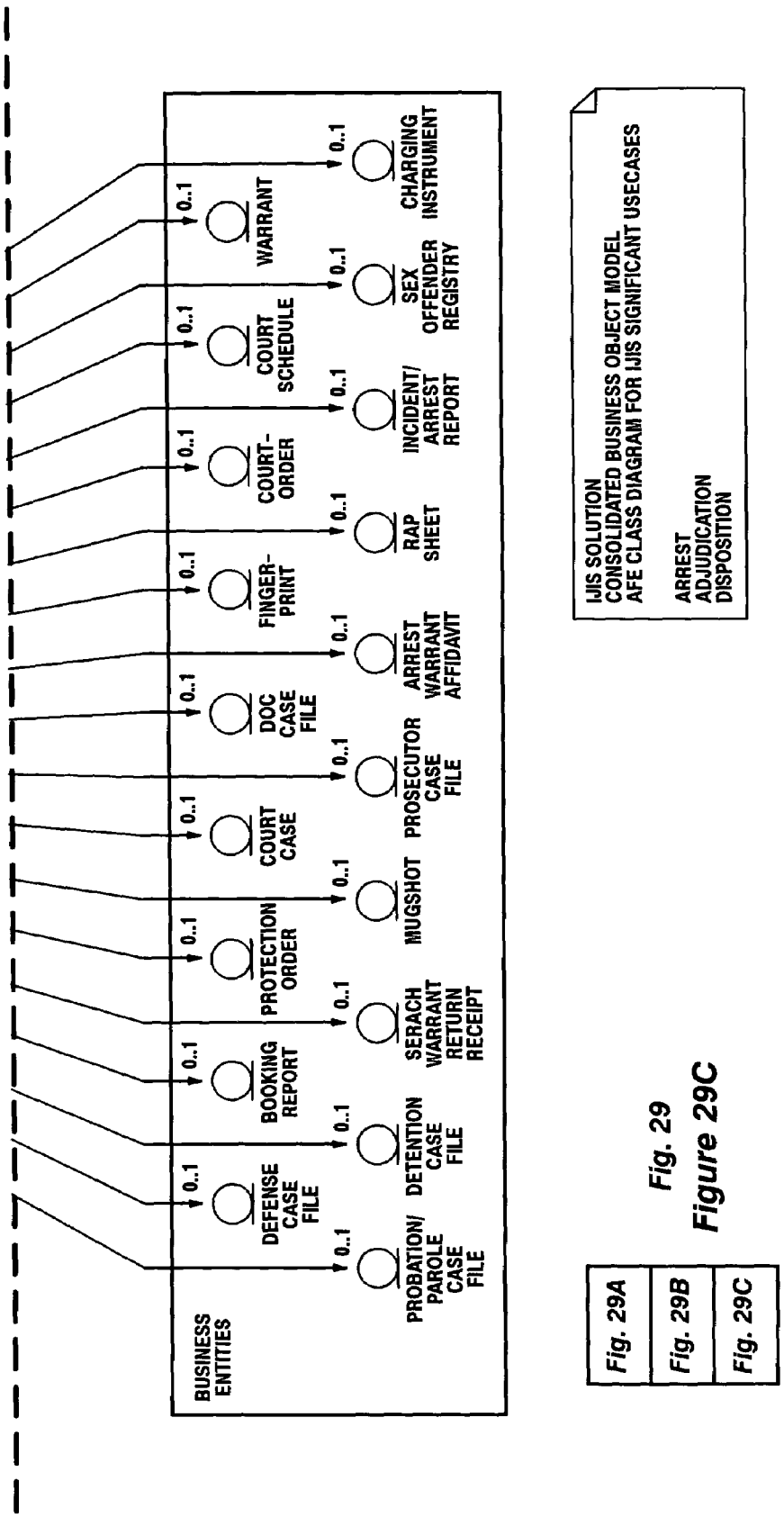

The business object model identifies the parties and entities that are to interact with the IJIS system 70 and the locations for the data to be communicated by the IJIS system 70. In the case of application of the IJIS system 70 to the criminal justice system, the business object model describes the components of the criminal justice system and how they interact on an entity-entity and entity-person basis within the justice system. For example, FIG. 29 illustrates a business object model of the arrest, adjudication and disposition entities and their interaction with the IJIS system 70. In particular, FIG. 29 illustrates the interaction of the IJIS message broker 20 with the respective case management systems including jail/detention system 2950, probation/parole system 2960 for parole system 2962 and probation system 2964, defense system 2970, booking system 2980, prosecutor system 2990, court system 3000, records management system 3010, pre-trial services system 3020, state criminal history system 3030, DOC repository 3040, Automated Fingerprint Identification System (AFIS) 3050, business rules database 3060, and business entities 3070, as well as the pull (3080), push (3090), notification (3100), publish (3110), subscription (3120) and query (3130) management systems used by the IJIS system 70 to manipulate the data to/from these data sources.

Figure 30:
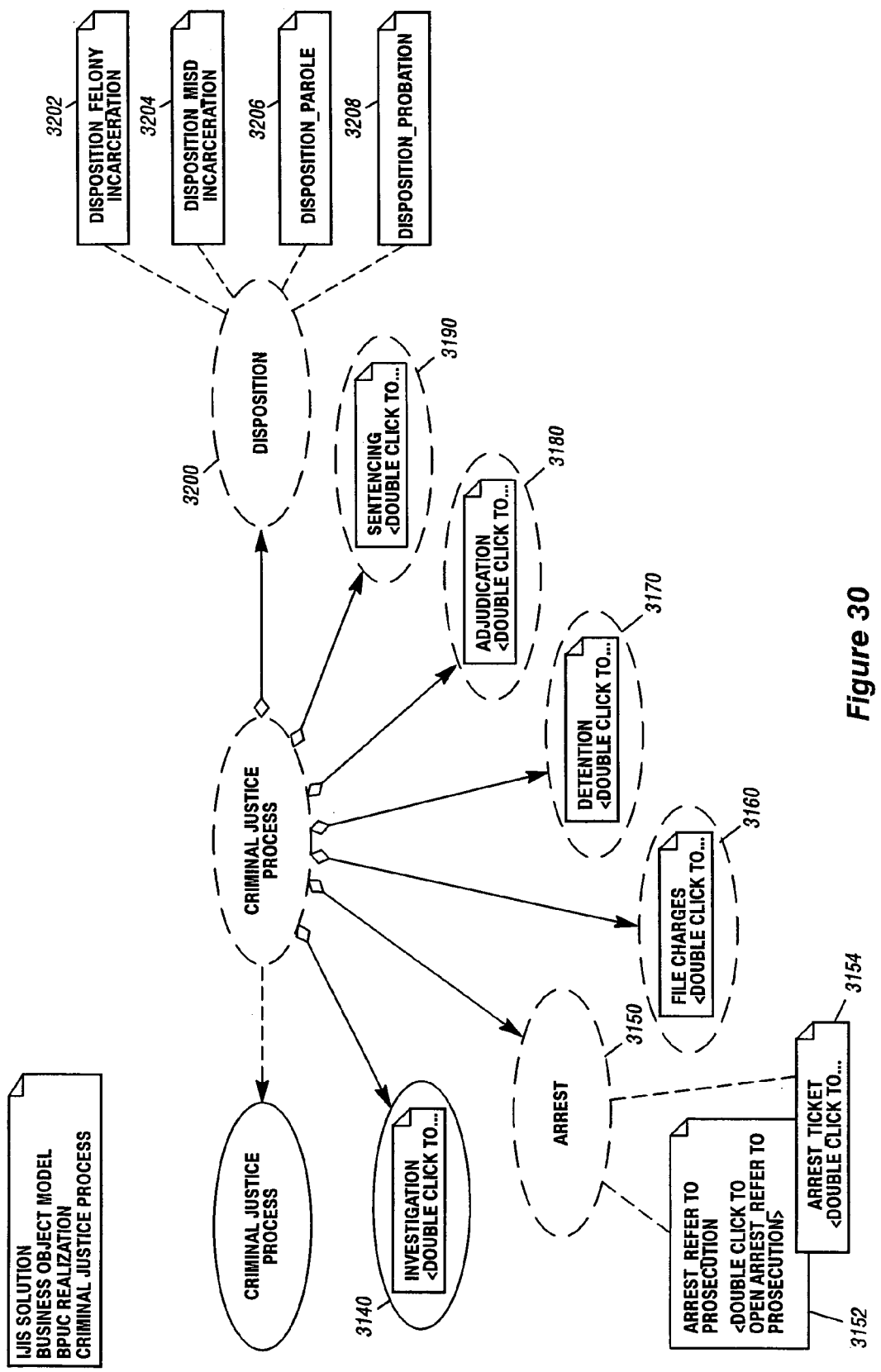
FIG. 30 illustrates the business object model of the criminal justice process as described with respect to the business use cases.

On the other hand, FIG. 30 illustrates the business object model of the criminal justice process as described above with respect to the business use cases. FIG. 30 enumerates the functions of investigation (3140), arrest (3150) including refer to prosecution (3152) and ticket (3154), file charges (3160), detention (3170), adjudication (3180), sentencing (3190) and disposition (3200) including felony incarceration (3202), misdemeanor incarceration (3204), parole (3206) and probation (3208).

Figure 31A:
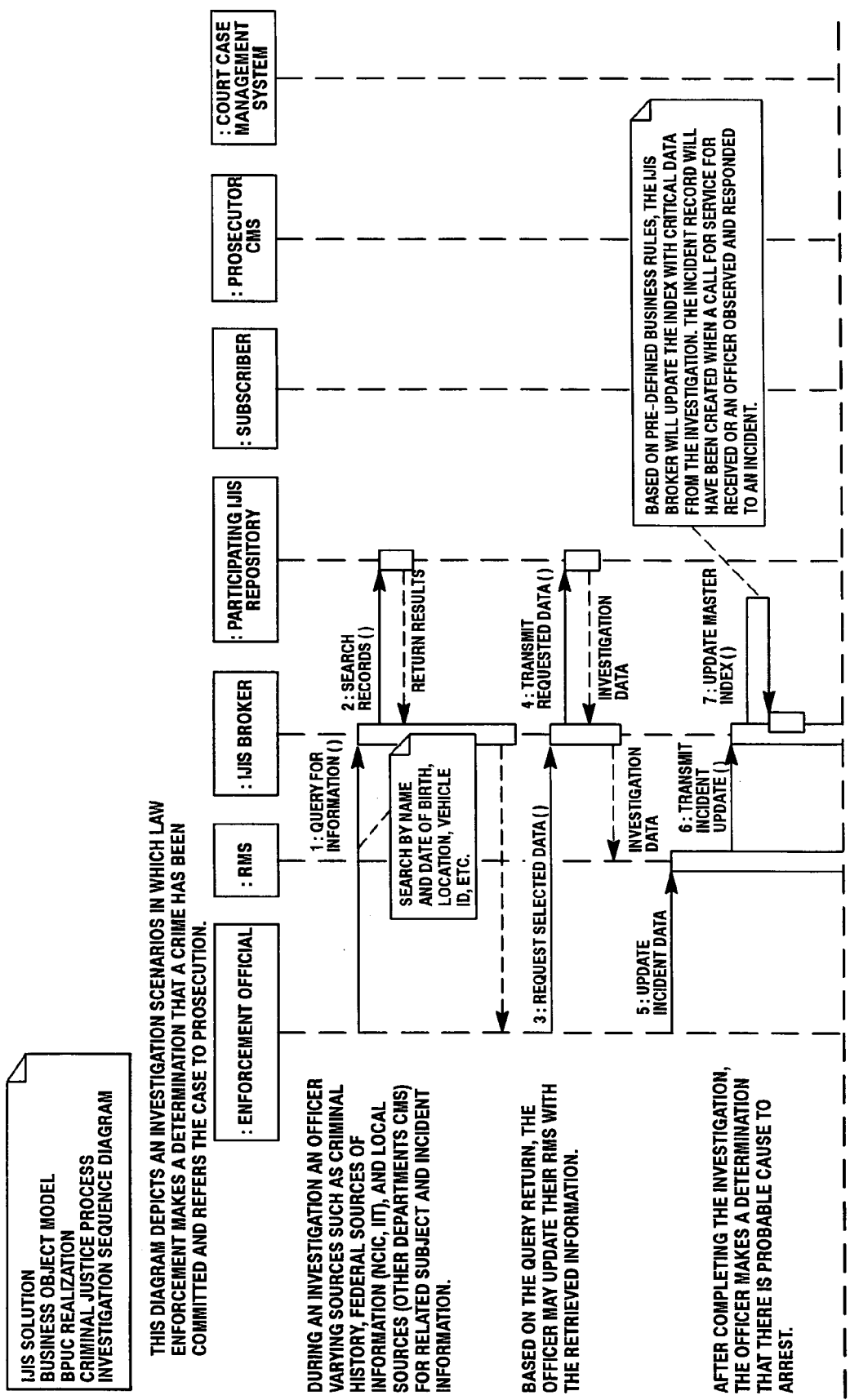
FIG. 31 illustrates a UML sequence diagram setting forth the flows of data amongst the entities involved in the Investigation business use case.
Figure 31B:
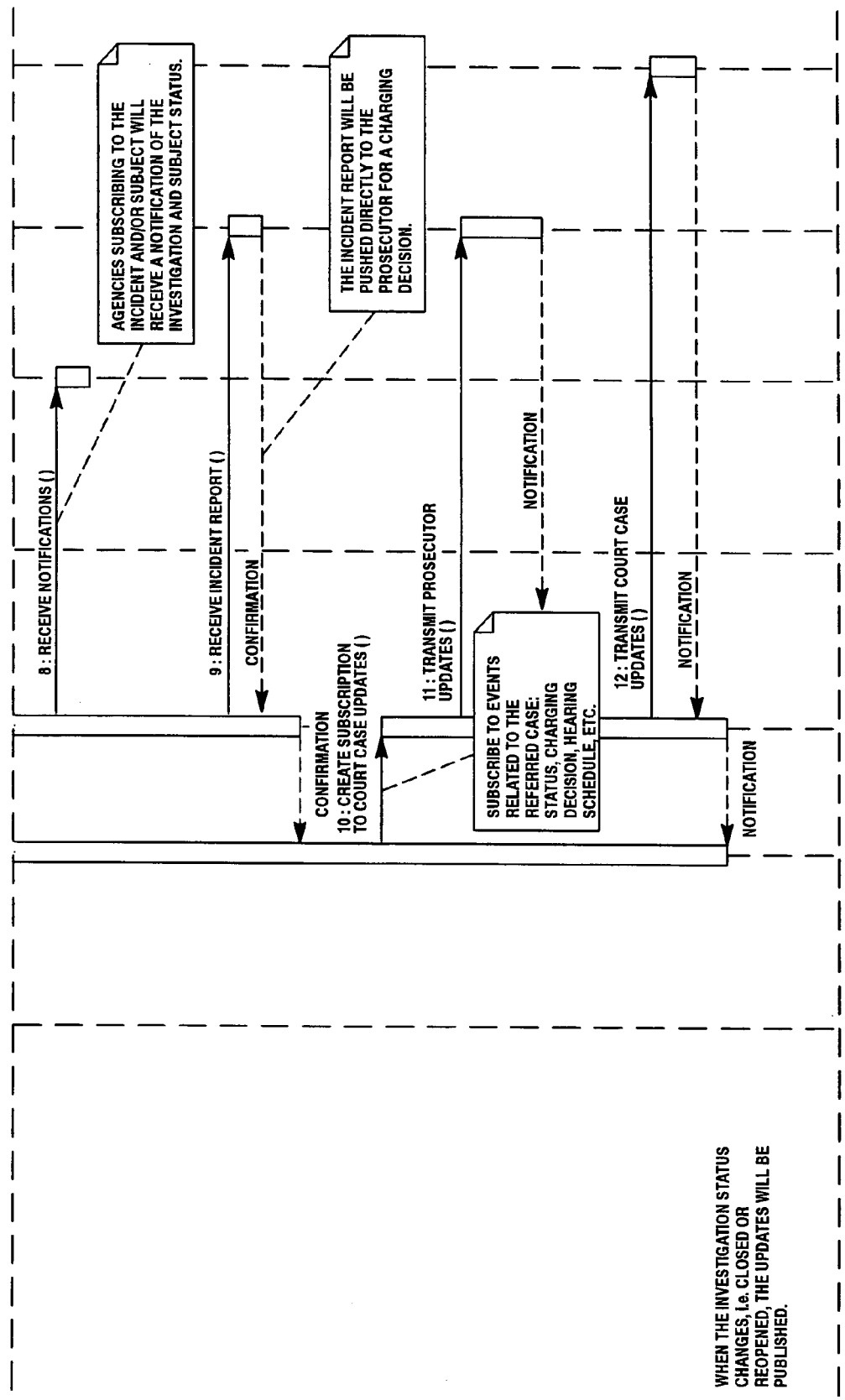

FIG. 31 illustrates a UML sequence diagram setting forth the flows of data amongst the entities involved in the Investigation business use case. As illustrated, these entities may be individuals or data locations. Similar UML sequence diagrams are created for each of the business use cases set forth above. In particular, UML sequence diagrams are created for each of the business use cases (arrest, booking, file charges, detention, adjudication, sentencing, disposition: misdemeanor incarceration, disposition: felony incarceration, disposition: probation, and disposition: parole) illustrated in FIGS. 18–28 and 30.

Figure 32:
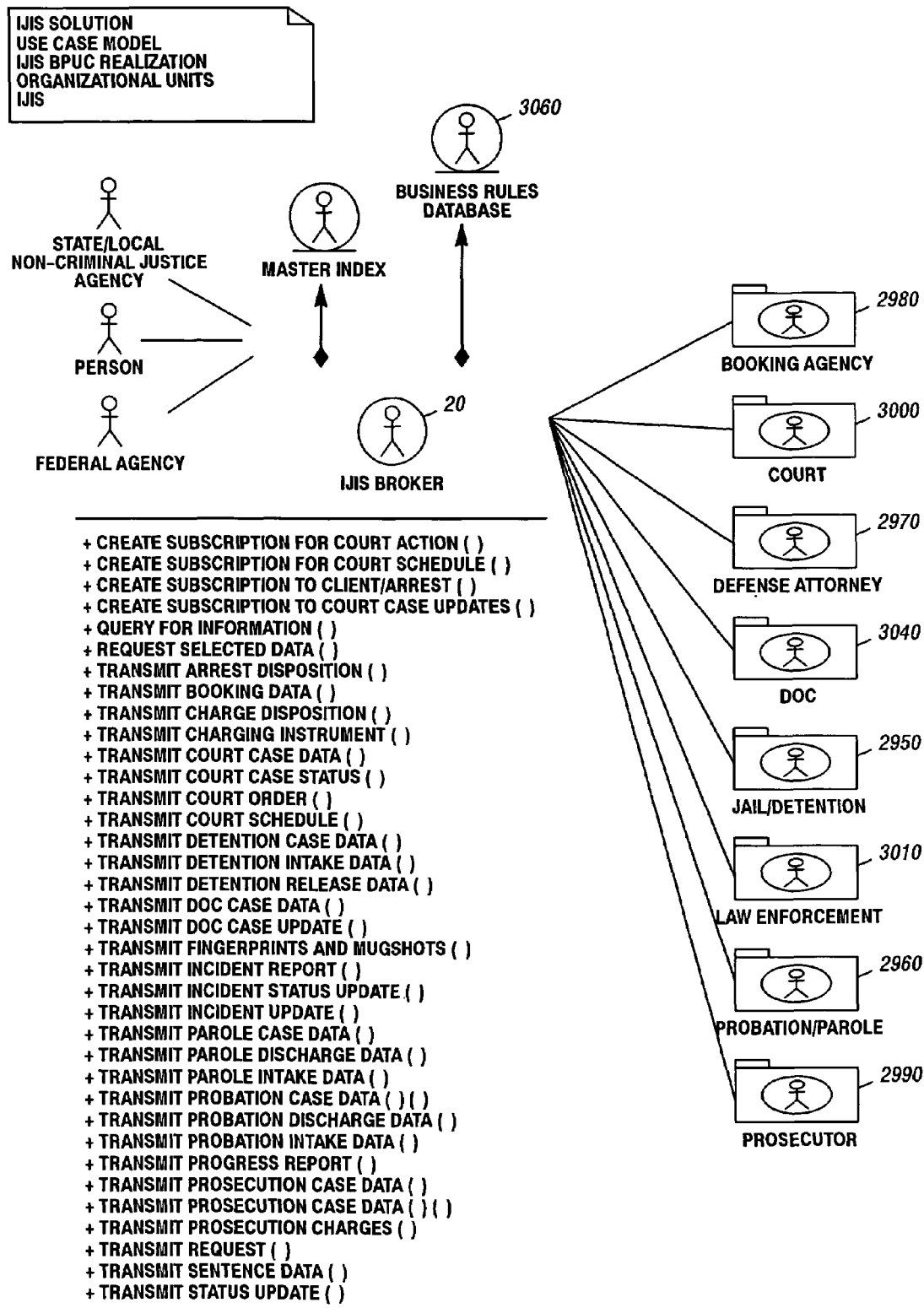
FIG. 32 illustrates business use case realization models created for the organizational units that interact with the IJIS system, including individuals and federal agencies.
Figure 33:
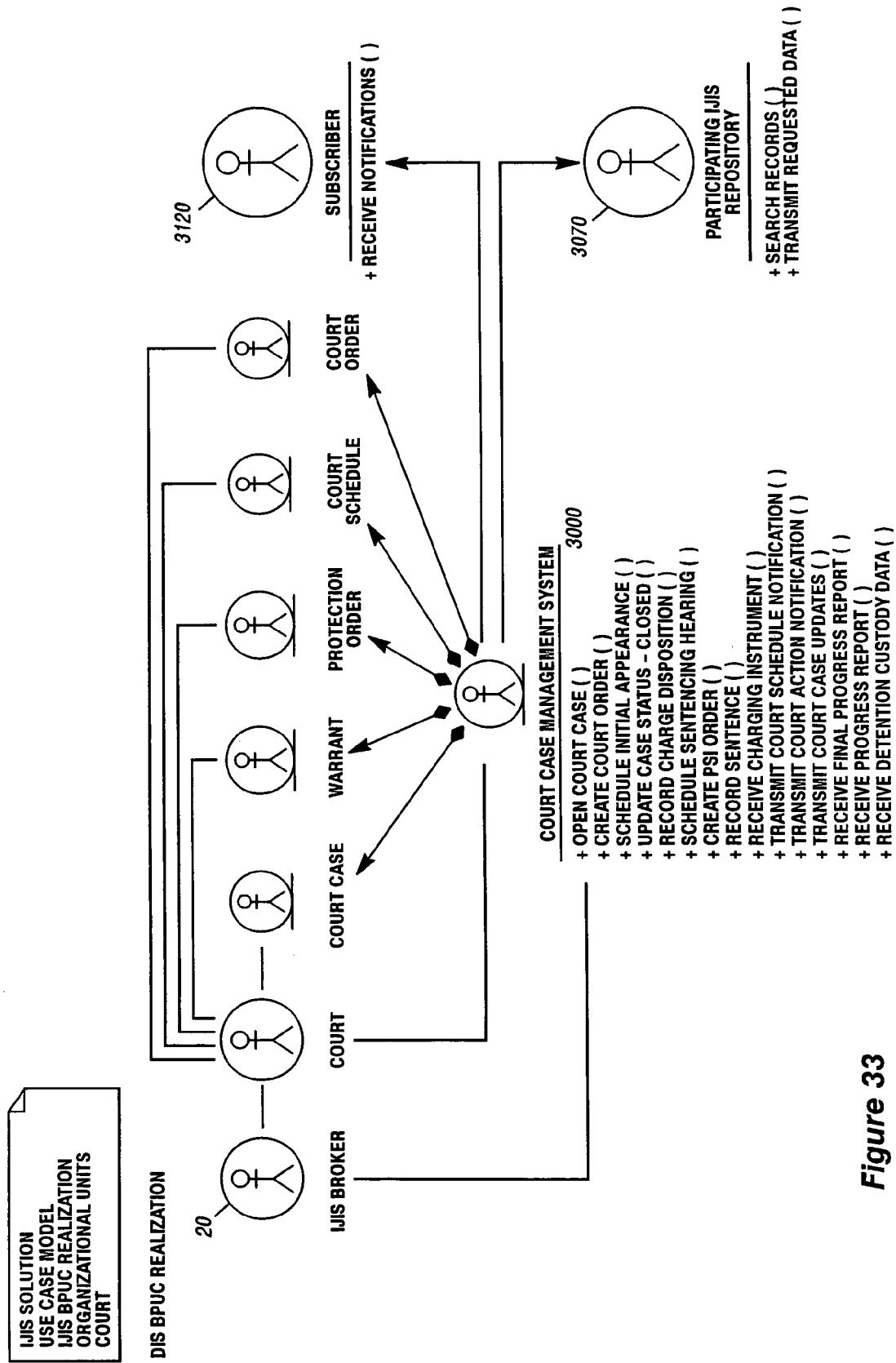
FIG. 33 illustrates the business use case realization model for the Court entity.

As illustrated in FIG. 32, use case models are also created for the organizational units that interact with the IJIS system 70, including individuals and federal agencies. Each of these organizational units is, in turn, represented by use case models as illustrated in FIG. 33 for the Court entity. As illustrated, the Court entity includes a court case management system 3000 that handles court cases, warrants, protection orders, the court schedule court orders, and the like. As illustrated in FIG. 29, the IJIS message broker 20 interacts with the court management system 3000 as well as subscriber 3120 (for receiving court notifications) and a participating IJIS system repository 3070 (for searching). Similar use case models are created for each of the other entities interacting with the IJIS system 70.

Figure 34:
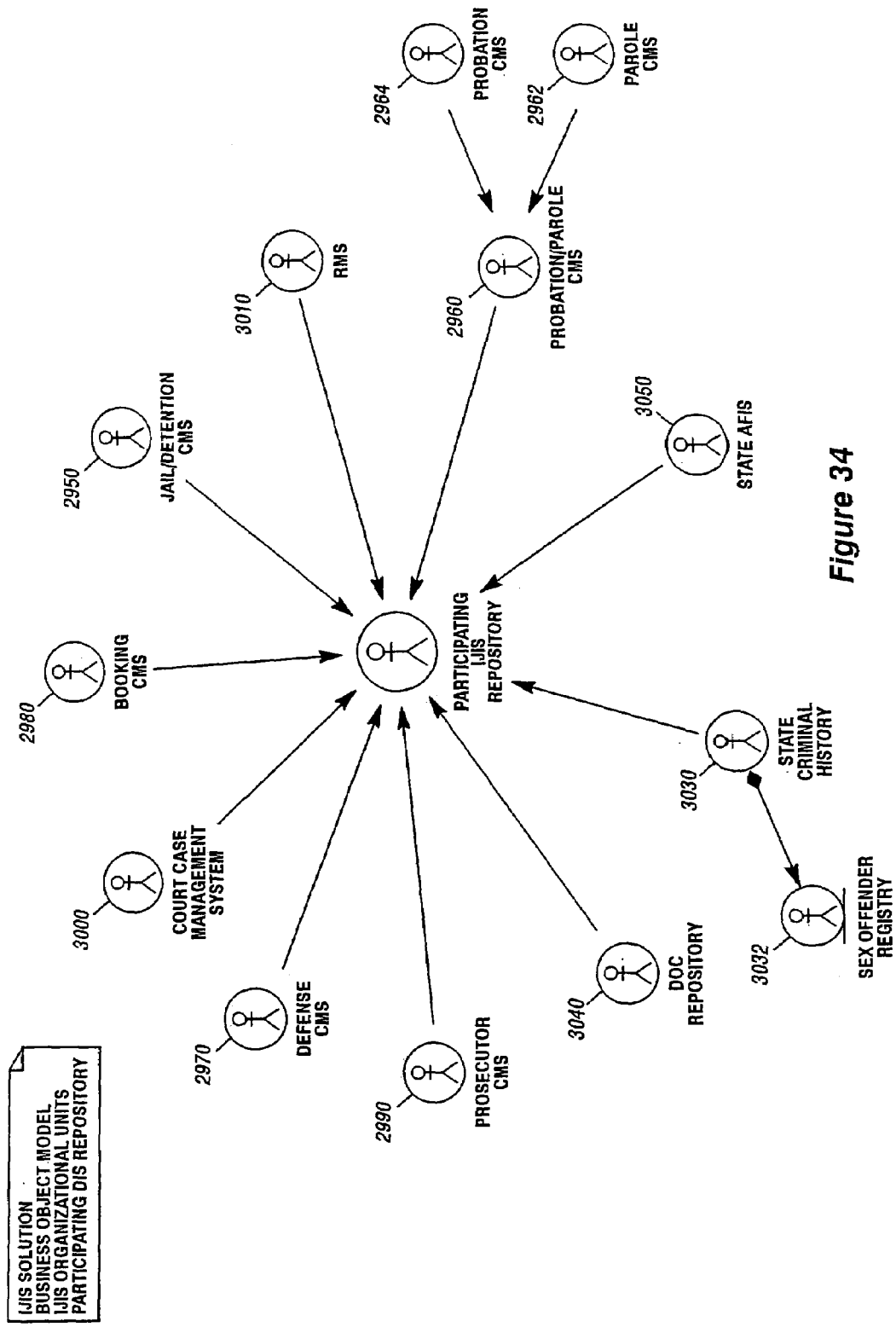
FIG. 34 illustrates how the respective case management systems and repositories interact with a particular IJIS repository.
Figure 35:
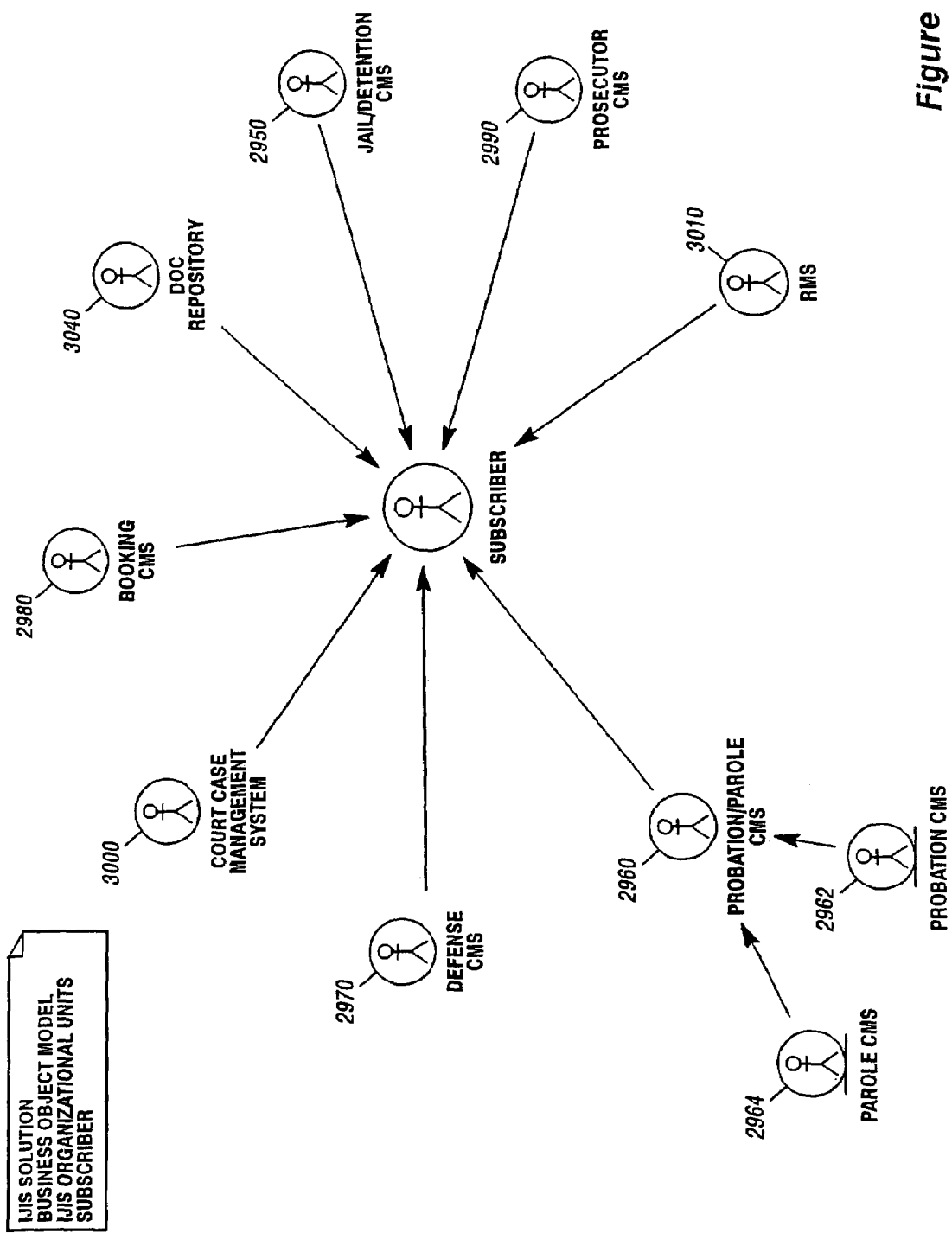
FIG. 35 illustrates a UML class diagram showing the data sources from which a subscriber may obtain subscription data.

Similarly, as illustrated in FIG. 34, a UML class diagram is created for each case management system (CMS), records management system (RMS) or other database that is to provide or obtain data to/from the IJIS system 70 of the invention. FIG. 34 illustrates how the respective case management systems and repositories interact with a particular IJIS repository, while FIG. 35 illustrates a UML class diagram showing the data sources from which a subscriber may obtain subscription data.

Those skilled in the art will appreciate that a complete business object model traces the relationships of all entities and data storage systems for which data flow is to be managed by the IJIS system 70 of the invention. As new entities and/or data storage systems are added, the business object models is modified to include the UML sequence diagrams and use case models for the new entities and/or data storage systems.

Use Case Model

Figure 36:
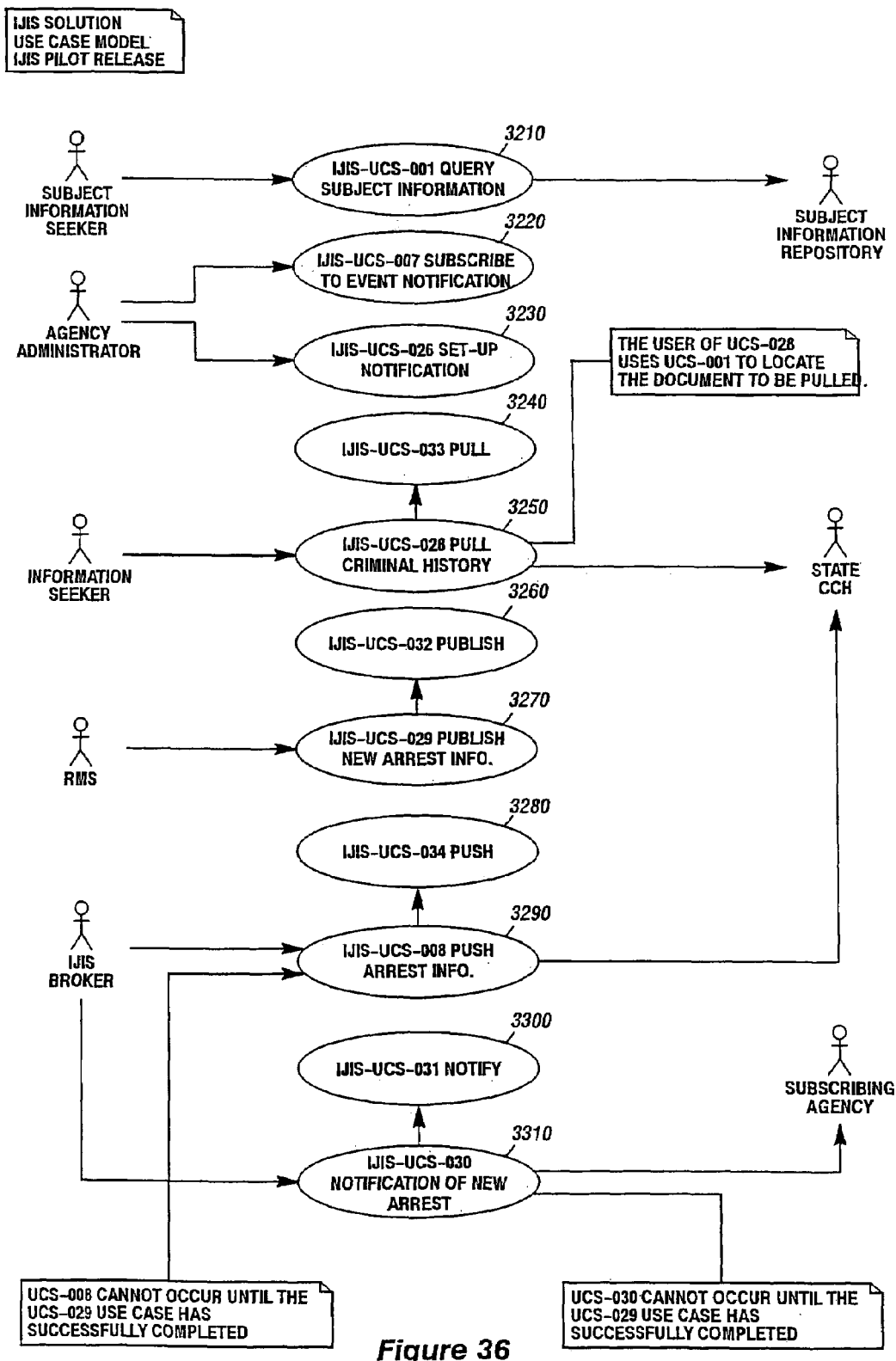
FIG. 36 illustrates the use cases and generalized actors constituting the IJIS system of the invention.

The use case model provides a high level view of the system activity amongst the actors in the IJIS system 70 and the time sequence of such actions. FIG. 36 illustrates the use cases and generalized actors constituting the IJIS system 70 of the invention. As illustrated, the primary use cases are: Query (3210), Subscribe (3220), Set Up Notification (3230), Pull (3240, 3250), Publish (3260, 3270), Push (3280, 3290), and Notify (3300, 3310). Each of these primary use cases may have one or more secondary use cases. For example, the Query use case 3210 may query subject information or vehicle information, while the Subscribe use case 3220 may subscribe to an event notification as set up by a system administrator using the Set Up Notification use case 3230. On the other hand, the Publish use case 3260 publishes data such as: charge disposition, court schedule, new arrest information, sentencing data, and data indicating the release of a sex offender. The Pull use case 3240 may be established to pull data such as search warrant, arrest warrant, and criminal history, while the Push use case 3280 may be established to push data such as: custody data, discharge information, arrest information, court orders, incident to prosecution data, arrest warrant, fingerprints and mugshots, quash warrant data, prison files, parole violation reports, booking reports, prison release date, and charges. Similarly, the Notification use case 3300 may be established to provide interested parties with notification of a new arrest. As illustrated in FIG. 36, different actors make use of these different use cases.

Figures 37, 37A:
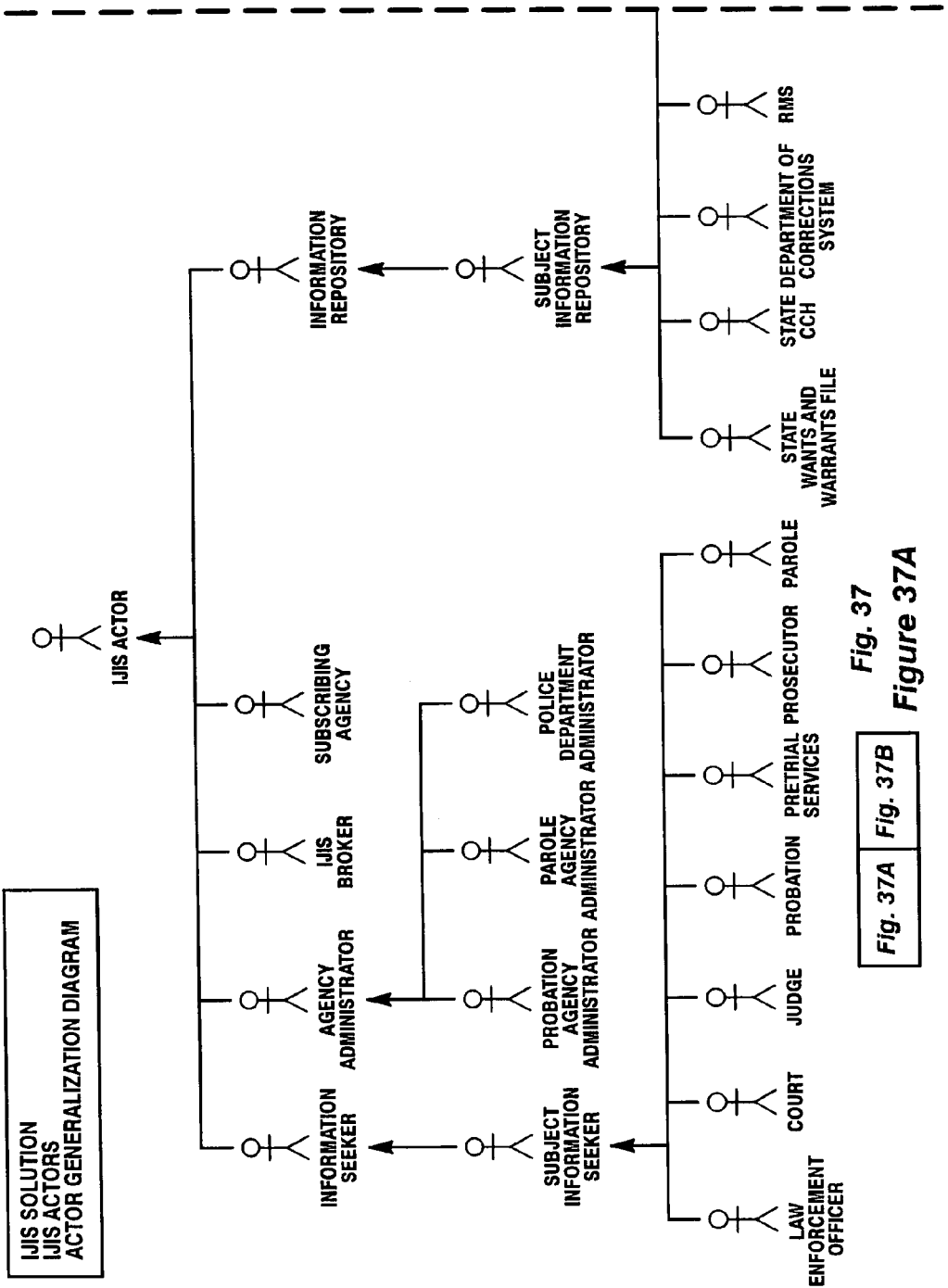
FIG. 37 illustrates different actors that use the IJIS system in a particular embodiment of the invention.
Figures 37, 37B:
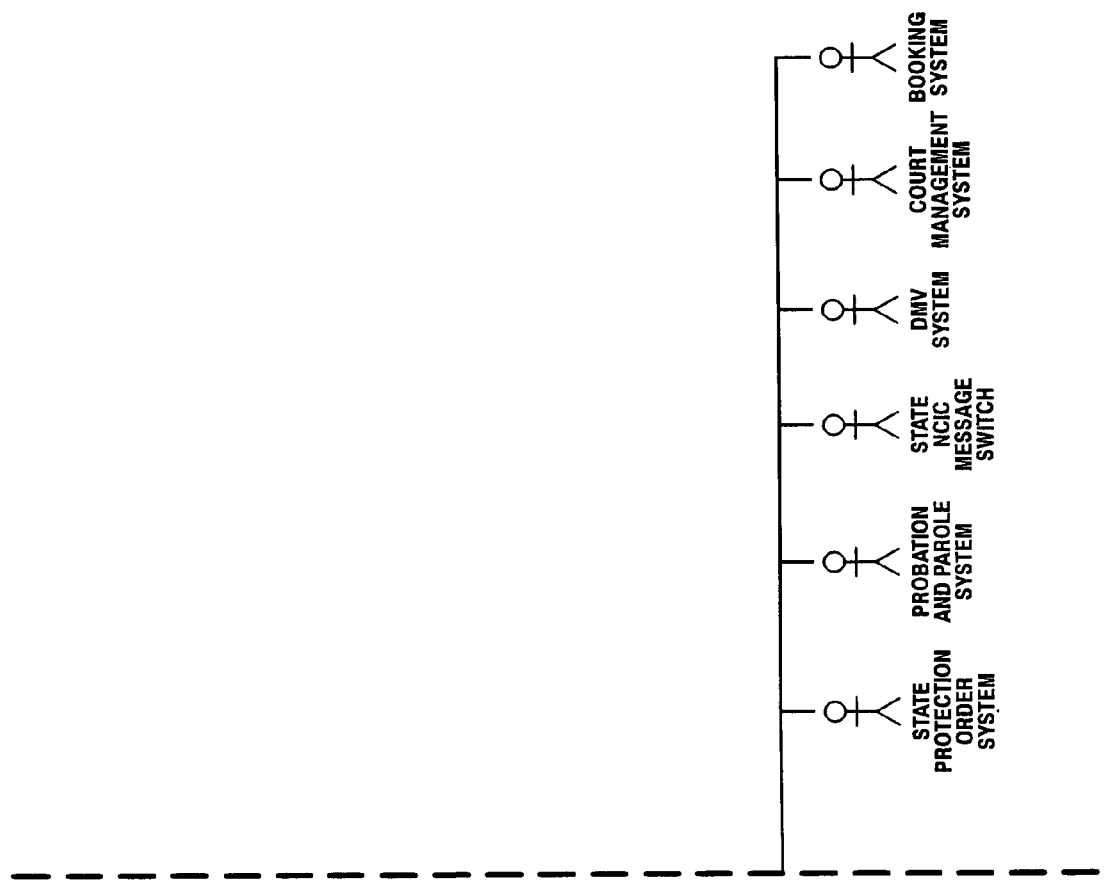

FIG. 37 illustrates different actors that use the IJIS system 70 in a particular embodiment of the invention. As illustrated, the IJIS actors (namely, someone or something outside of the IJIS system 70 that interacts with IJIS system 70) include information seekers, agency administrators, the IJIS message broker 20 of the invention, a subscribing agency, and an information repository. As noted above, IJIS message broker 20 generally comprises a piece of software that is a part of the IJIS system 70 and is responsible for controlling communications between IJIS agents within the IJIS system domain and numerous other actors in other tiers of actors. A subscribing agency, on the other hand, is any justice system department or agency that seeks to be notified of events that they have a particular interest in. The department or agency subscribes to receive notifications when the chosen events occur.

An information seeker in the IJIS system 70 could be any actor that is seeking information about an individual of interest, an event of interest, or other types of information.

A Subject Information Seeker is any authorized user who needs to query the IJIS system 70 to identify a subject. Such actors may include a law enforcement officer, a court, a judge, a probation office, a pretrial services office, a prosecutor's office, and a parole office. The definitions of these actors may be rather general. For example:

A Law Enforcement Officer may be any person involved in the enforcement of law, including persons designated by a public authority to keep the peace and arrest persons guilty or suspected of crime. Law enforcement officers may include, but are not limited to: police, sheriff, marshal, federal authorities, and the military.

Probation actors include the department that manages a subject's probation, i.e., a sentence entailing the conditional release of a convicted offender into the community under the supervision of the court (in the form of a probation officer), subject to certain conditions for a specified time. The conditions are usually similar to those of parole except that while parole is administrative release from incarceration, probation is a sentence that is an alternative to incarceration. Violation of the conditions of probation may result in revocation of probation.

Pretrial Services actors include the pretrial services officer, who is a neutral information-gathering arm of the court. The data collected is utilized by the trial courts to make more informed decisions pertaining to bail. Based on community ties and likelihood of flight, defendants are entitled to the least restrictive releases terms possible with respect to future appearances and community safety.

A Prosecutor is a generalization of all prosecuting attorney roles. A prosecuting attorney is employed by a governmental agency whose official duty is to initiate and maintain criminal proceedings on behalf of the government against persons accused of committing criminal offenses.

Parole actors include the government agency that monitors a prisoner's parole. The early release of a prisoner subject to conditions set by a parole board. Depending on the jurisdiction, inmates must serve a certain proportion of their sentences before becoming eligible for parole. If an inmate is granted parole, the conditions may require him or her to report regularly to a parole officer, refrain from criminal conduct, maintain and support his or her family, avoid contact with other convicted criminals, abstain from using alcohol and drugs, remain within the jurisdiction, and so on. Violations of the conditions of parole may result in revocation of parole, in which case the individual will be returned to prison. The concept behind parole is to allow the release of the offender to community supervision, where rehabilitation and readjustment will be facilitated.

On the other hand, the actors also include the system administrators for a justice system agency that uses the IJIS system 70 of the invention. Such actors are referred to as Agency Administrators. Agency Administrators include, for example, probation agency, parole agency and police department administrators. A probation agency administrator is the administrator of the department that manages a subject's probation, while a parole agency administrator is the administrator of the parole agency which is a government agency that monitors a prisoner's parole. Similarly, a police department administrator is the administrator of the generalization of county, city, and metropolitan area police departments.

As used herein, a Subject is a person who is taken into the custody of the law, the legal purpose of which is to restrain the accused until he or she can be held accountable for the offense at court proceedings. Accordingly, a Subject Information Repository represents the various justice agency system(s) queried by the IJIS system 70 to identify a subject.

The various justice agency systems may include, for example, a State Wants and Warrants File, a State CCH, a State NCIC Message Switch, a State Protection Order System, a DMV System, a State Stolen Vehicle Files, a Probation and Parole System, a Department of Corrections System and a Court Management System. Information Repository Actors include those entities that serve as storage houses of information pertaining to individuals processed through the justice system. Such actors include a booking system (2980), which is a police station or a detention facility where a booking occurs; a court management system (3000) including all state and local court systems and judges; a department of corrections system (3040), which is the computer system that is used by law enforcement to input incident, arrest and other justice system information regarding a subject; a Department of Motor Vehicles (DMV) system that includes information relating to driving licenses, vehicle registrations, and license plates; a probation and parole system (2960) includes the departments that manage a subject's probation and a prisoner's parole, respectively; a Records Management System (RMS) (3010) that is a centralized relational data system that includes multiple data files including, e.g., CAD data, incident data, arrest information, officer and victim information, and the like, that can be queried in tandem; a state Computerized Criminal History (CCH) system (3030), which is the state's centralized repository for data on subjects arrested for gross misdemeanor and felony offenses; the National Crime Information Center (NCIC) message switch, which is a computer system maintained by the FBI that can be queried by local agencies via state computer systems known as "control terminal agencies;" the State Protection Order System, which is a protection order repository; and a State Wants and Warrants File that is a warrants repository. Of course, other actors may provide information about subjects and may be readily incorporated into the IJIS system 70 of the invention.

Example use cases for the IJIS system 70 are set forth below. A general description is provided for numerous sample use cases and then a detailed description of the Query use cases will be provided. Of course, those skilled in the art will appreciate that different use cases may be provided for different application for different actors in different environments. These examples are exemplary only.

Sample use Cases for IJIS System

Query Subject Information

The Query Subject Information use case provides information that enables justice system personnel to complete their jobs by obtaining information in a safe and effective manner by executing a query. The information obtained by a query enables the primary actors of the criminal justice process to make decisions about how to process an individual through the justice system. The following examples illustrate the usefulness of the Query Subject Information use case:

1. A Federal Investigator may enter a query seeking state and local records of legal status, criminal history, outstanding warrants and state licensing department records about a subject suspected of terrorist activities.
2. A law enforcement officer may enter a query seeking positive identification, whether a vehicle is stolen, conditions of probation and outstanding warrants on an individual pulled over in a traffic stop.
3. The pretrial release office may enter a query seeking information such as current legal status and criminal history in order to determine whether or not to have person released on bail.

4. A judge or court staff member may enter a query seeking identification, employment verification and prior arrests to determine whether or not to release a person waiting for trial.
5. The court performing a pre-sentence investigation may enter queries gathering all known incidents, reports and criminal history on a subject, which is used to aid the judge in making a sentencing decision.
6. The Prosecutor's office may enter a query seeking recent arrests or incident reports while a subject is going through the prosecution process.
7. A probation officer performing periodic checks may enter a query seeking recent arrest or incident reports during a subject's probation period under his/her supervision.
8. A parole officer may enter a query to perform periodic checks to determine if there are any arrests or incidents, especially interested in any recent out of state records, which would indicate the parolee under his supervision has violated parole.
9. The Corrections Division may enter a query seeking previous history on an inmate, including any health issues the inmate may have, drug use and previous prison history including which prison locations and how he/she behaved there.

The goal of this use case is to provide up to the minute identification, arrest, incident and criminal history information from local, regional, statewide and national databases to justice system personnel assisting them in making arrest, charge, sentencing and release decisions during various phases of the criminal justice process. More details of this use case will be provided below.

Publish Charge Disposition

At any point in the adjudication process, between initial appearance through trial, charges may be disposed of via dismissal, plea bargain, finding of guilt, etc. Disposition is recorded for each charge in the court case management system and then disseminated to other criminal justice agencies. These include: the state's criminal history for updating the subject's criminal history file, the defense and prosecution, probation, and the arresting law enforcement agency.

Publish Court Schedule

During the adjudication process, the court schedules several hearings and court events. Every time an event is schedule, the court schedule is updated and must be disseminated to the appropriate agencies. The court schedule must be sent to the prosecution, defense, probation, and the arresting law enforcement agency. If the subject is in custody during adjudication, the court schedule must also be sent to the detention facility where the subject is held.

Publish Sentence Data

Once the sentence is pronounce and sanctions are specified, the court will disseminate this information in the form of a sentence order so it can become available to other agencies. The sentence order will be sent to the state's criminal history so the subject's criminal history can be updated with the sentencing information. The prosecutor, defense attorney, and the arresting law enforcement agency will also receive a copy of the sentence order. If the subject is to be incarcerated the sentence order will be sent to the Department of Corrections. If the subject is sentenced to probation, the sentence order will be sent to the appropriate probation agency.

Push Arrest Warrant

The court may issue an arrest warrant on the request of a law enforcement agency or the prosecutor. If a warrant is issued, the warrant approval will be sent to the requesting party.

Subscribe to Event Notification

The goal of the Subscribe to Event Notification use case is to establish a subscription to justice system events and specify notification options. These notification options are used by the IJIS system 70 to send notification in response to this subscription. The Subscribe to Event Notification use case is an effective way for criminal justice system personnel to be informed of pertinent events occurring in the justice process. The purpose of this use case is to enable the IJIS user to subscribe to receive notifications of criminal justice events if and when they occur. Notifications of these events, such as arrests, enable the actors of the justice system to make informed decisions regarding the subject/s under their supervision. By establishing a subscription, the user will receive notifications and detailed reports when available. The subscription will continue indefinitely and does not need to be renewed.

Push Arrest Information

The Push Arrest Information use case provides the automated integration value of the IJIS system 70 by systematically transmitting information, when specific events take place, from one justice system agency to another. Specific events occurring in the criminal justice process trigger the use case. This use case reduces the chance of data entry errors by replacing a manual process, as it is done today, with an automated system of data transmittal and sharing. As a person is processed through the justice system, he or she receives services from many different agencies. A report or user profile must be generated by each agency that deals with the individual. Many times the same information is re-used from one report to another. This use case will make the information available in digital form, within the agency computers so that the user can import data to build a report rather than re-enter it manually. The goal of the Push Arrest Information use case is to eliminate duplicate data entry by enabling criminal justice agencies to electronically transmit information from one agency to another. For example, the IJIS system 70 enables law enforcement to transmit information to the prosecutor and the State Criminal History repository when an arrest occurs.

Push Court Order

The court may push a Court Order to appropriate agencies. For example, during sentencing, the court may request a pre-sentence investigation (PSI) to be completed by Probation. To request a PSI, the court will issue a court order for the PSI and send the court order to Probation. Upon completion of the PSI, the probation agency will send the PSI back to the court.

Push PSI

Upon completion of the pre-sentence investigation, Probation will send the PSI report to the court.

Push Incident to Prosecution

For felony offenses, and certain lower-level offenses, law enforcement will refer the incident to prosecution for a charging decision. The incident may also be referred to the prosecutor if law enforcement was not able to make an arrest but an investigation results in probable cause to file charges. The arresting agency will send an arrest report to the prosecutor. Once the referral is made, law enforcement will subscribe to the individual and case data referred to the prosecutor in order to receive notification on the individual's or case's status change.

Pull Arrest Warrant

If during investigation, a law enforcement agency determines there is probable cause for arrest, the agency will request an arrest warrant from the court.

Pull Search Warrant

If during investigation, a law enforcement agency determines there is probable cause for a search, the agency will request a search warrant from the court.

Push to Quash Warrant

If law enforcement makes an arrest on an arrest warrant, the agency must make a request to the court to quash the warrant. Once the court grants the request, the arresting agency must update the state's and federal warrant repository to cancel the warrant.

Pull Search Warrant

When the search, granted by the search warrant, is completed, the law enforcement agency will return the return receipt portion of the search warrant to the court.

Push Booking Report

When the booking process is completed, the booking agency will send the booking report to the prosecutor if the arresting agency has made the decision to refer the case to prosecution for charging.

Push Charges

When prosecution makes the decision to charge the subject, the charging instrument (a criminal complaint) will be sent to the court.

Push Custody Data

After jail intake is completed, the detention facility will send custody information to the state's criminal history so that the subject's criminal history can be updated, and to the prosecutor and pre-trial services. If the subject is currently on probation or parole, a notification of detention will be sent to the supervising agency. If the subject's defense attorney is known, the notification of detention will also be sent to the defense. The custody information may includes information such as detention term, detention start date, detention start time, detention status code, detention reason, subject in custody indicator, credit for time served amount, time served, and comments.

Push Discharge Information

When a subject is released from probation, the discharge information is sent to the state's criminal history so that the subject's criminal history file can be updated. The same information is also sent to the court.

Push Prison File

If the subject is eligible for parole, the DOC will send a prison file to the parole board when the parole date approaches. Upon making a parole decision, the parole board will send release authorization to the DOC.

Push Release Date

When an inmate is released, the notice of the release must be sent to the state's criminal history so that the subject's criminal history file can be updated. The notification of release is also sent to the prosecutor and to parole. If the subject is a registered sex offender and community notification is required, a notification of release must be sent to the law enforcement agency in the jurisdiction where the subject will reside.

Push Violation Report

If a subject violates any condition of his or her probation term, the probation agency will send a violation report to the court and request a revocation or a warrant for the subject's arrest.

Push Fingerprints and Mugshots

Fingerprints and mugshots captured during the jail intake process will be sent to the state's criminal history for inclusion in the subject's criminal history file. After the subject is fingerprinted, the fingerprints are submitted to the Automated Fingerprints Identification System (AFIS) for scoring and analysis in order to positively identify the subject. If a match is found, AFIS will return the SID number for the subject. If no match is found, AFIS will return and new SID number for the subject. The SID number is then included in the crime report, booking document, and criminal history.

Set Up Notification

The Set Up Notification use case enables the agency administrator to specify notification options for the notifications to be received. These notifications are received because of subscriptions. The notifications may be triggered by the Publish use case. The user will invoke this use case during subscription of event notification. The contact details include contact names within the user's agency, the preferred mode of contact for each individual.

Pull Criminal History

The Pull Criminal History use case provides the automated integration value of the IJIS system 70 by systematically transmitting information, when prompted by the user, from one Justice System agency to another. Actors in the criminal justice process trigger the use case. The Pull Criminal History use case reduces data entry errors by replacing a manual process, as it is done today, with an automated system of data transmittal and sharing. The user benefits from the ability to find information about an individual of interest and to pull that information into their computer system to assist them in creating reports and documents as a regular part of their job. This use case reduces duplicate data input and increases the accuracy and efficiency of justice system personnel by automating report and file creation duties. The information is available in digital form, within the agency computers so that the user can import data to build a report rather than re-enter it manually. This use case eliminates duplicate data entry in the justice system process by enabling users to pull information from other agencies and incorporate that information into their own work, such as file or report generation.

Publish New Arrest Information

The Publish New Arrest Information use case enables publishing of arrest information when a new arrest is recorded by the agency's system (e.g., Booking System, RMS, etc.). The IJIS system 70 automatically detects the new record and then sends notification to subscribers of the arrest notification and pushes the arrest information to appropriate agencies as governed by business rules.

Notification of New Arrest

The Notification of New Arrest use case enables delivery of published event information to all subscribers of the event. This use case enables delivery of published arrest information to all subscribers of the new arrest event. The goal of the Notification of Arrest use case is to deliver notification to each of the subscribers of the new arrest event. Each notification includes event information and may also include reports (attachments to notification).

Notify

The goal of the Notify use case is to deliver notification to each of the subscribers of an event. Each notification includes event information and may also include reports (attachments to notification).

Publish

Justice agencies will publish critical information regarding individuals and cases at key decision points throughout the justice process. Publish can be viewed as a type of "Push Information". In the case of publish; information is made available to a wide audience of recipients. In most cases, the recipients are unknown to the publisher.

Pun

Justice agencies will pull critical information regarding individuals and cases at key decision points throughout the justice process. A pull is an automatic request for information from one justice agency to other justice agencies. The use case completes when the requested information is received by the requesting justice agency.

Push

Justice agencies will push critical information regarding individuals and cases at key decision points throughout the justice process. A push is an automatic transfer of information to another agency, based on events that occur within the originating agency. For example, reporting of individual and incident information with supporting data when a law enforcement agency makes an arrest and enters this information in its records management system. The law enforcement agency should "push" key data to the prosecuting attorney's office for use in the prosecutor case intake process.

Query Subject Information Detailed use Case

Figure 38A:
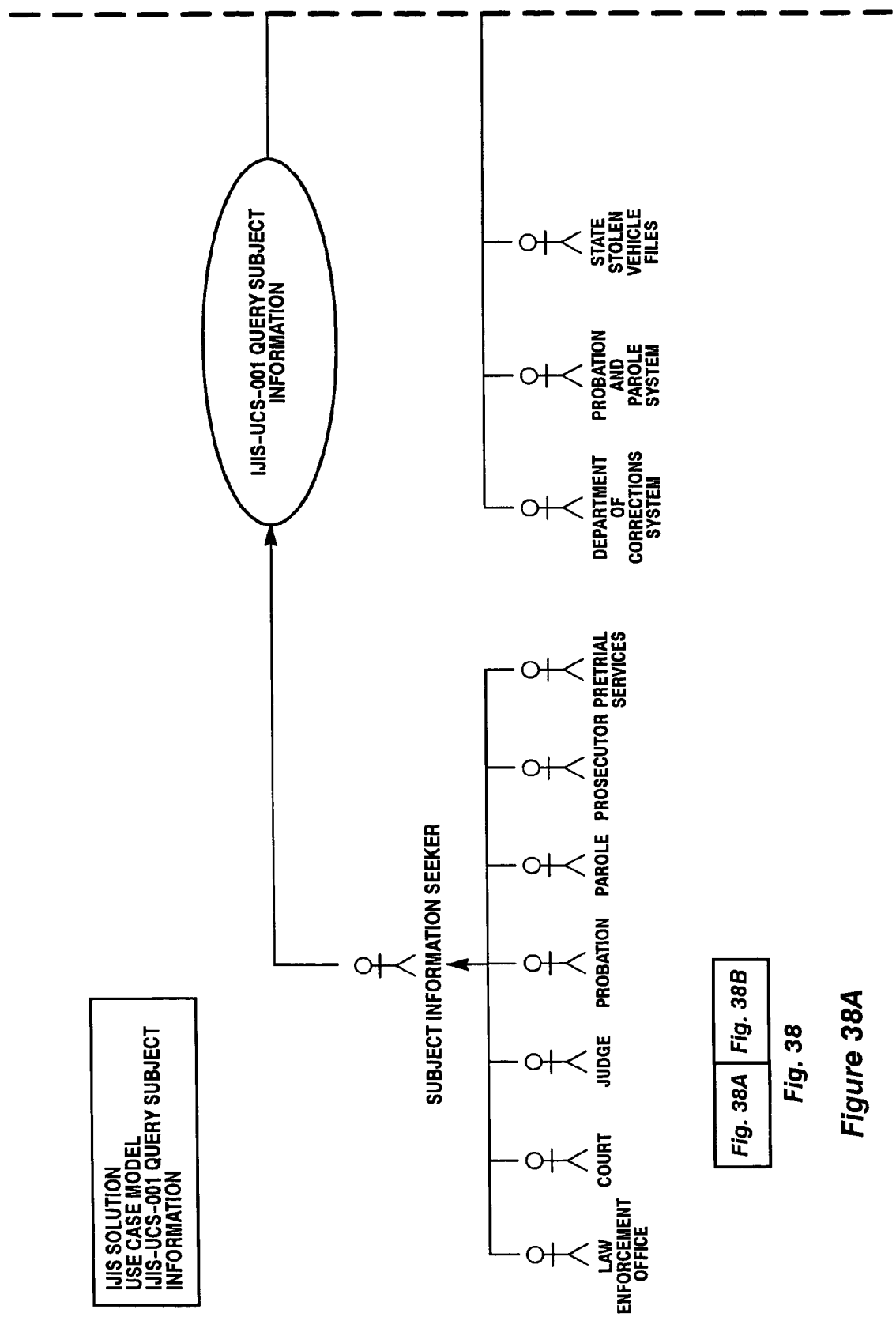
FIG. 38 illustrates several of the primary and secondary actors that may use the Query Subject Information use case to obtain information about a subject.
Figures 38, 38B:
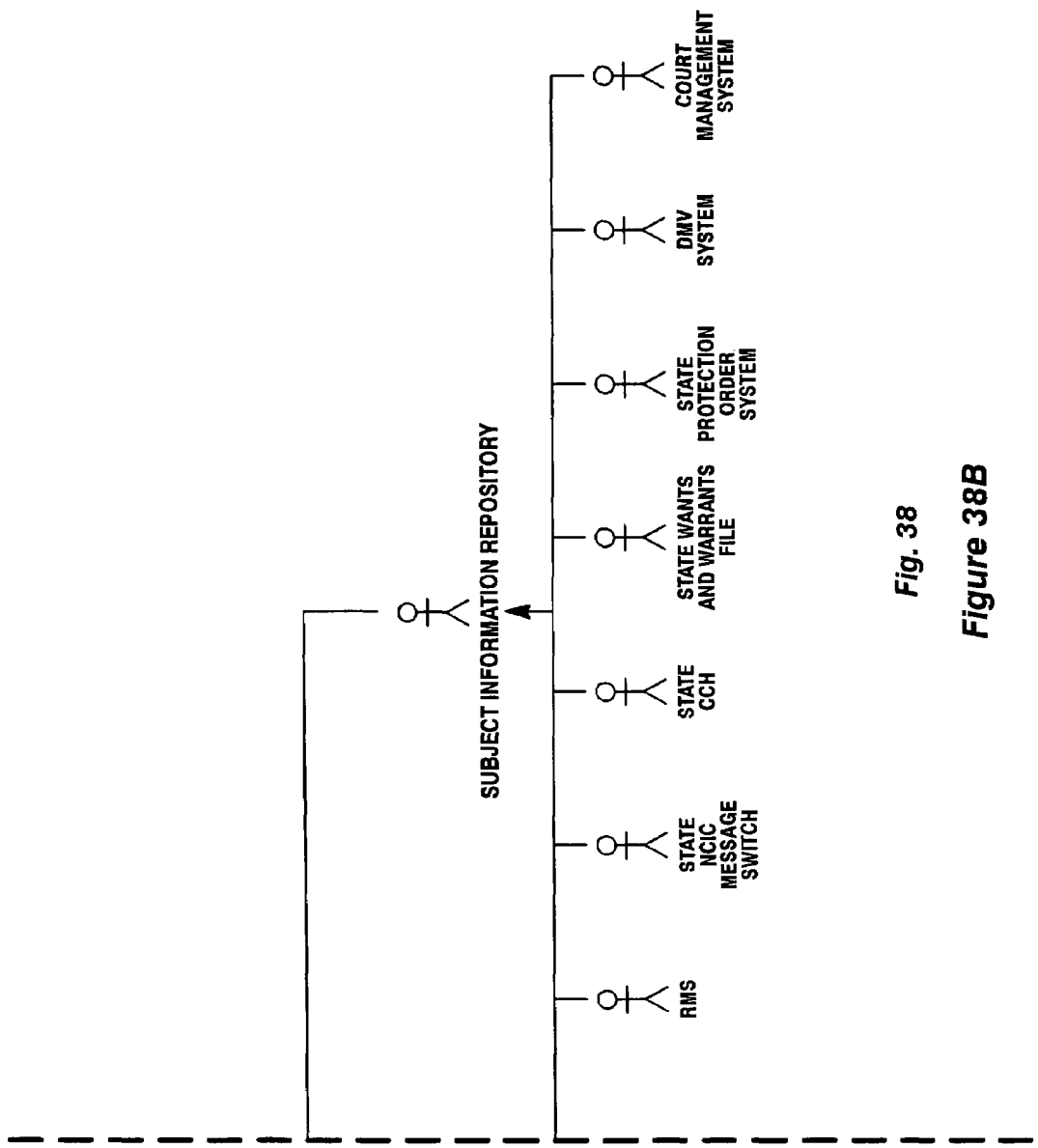

FIG. 38 illustrates several of the primary and secondary actors that may use the Query Subject Information use case to obtain information about a subject. As illustrated, the primary actor is the subject information seeker who, as noted above, may be a law enforcement officer, a judge, court staff, a probation officer, a parole officer, a pre-trial services office, a prosecutor, and the like. These actors may query secondary actors such as respective subject information repositories. As noted above, such subject information repositories include the State Wants and Warrants File system, the State Computerized Criminal History system (CCH) (3030), the State NCIC Message Switch system, the State Protection Order system, the Department of Motor Vehicles system (DMV), the Probation and Parole system (2960), the Department of Corrections (DOC) system (3040), the Court Case Management System (CMS) (3000), Records Management Systems (RMS) (3010), the Automated Fingerprints Identification System (AFIS) (3050), and the like.

In order to submit a query, the user must be authenticated and authorized to access the Query functionality. Once authorized, the Query proceeds as illustrated in the Query Subject Information use case activity diagram of FIG. 39. At the time of arrest, an officer needs to identify the subject in order to determine if there are any outstanding warrants or probable cause pickups. If a vehicle is involved, the officer needs to determine who the vehicle owner is and whether or not the vehicle has been reported stolen. The officer also needs to determine whether the arrestee is subject to any protection orders and if the arrestee is subject to any conditions of probation. To do so, the officer may perform a query based on available information such as name and date of birth. The officer will search the state's criminal history repository for a criminal history record (RAP sheet), the state's warrant repository for any outstanding warrants, through the state's protection order repository for protection orders, the DMV for vehicle registration, the state's stolen property repository for stolen vehicle reports, and a local or state probation system for conditions of probation.

Figure 39:
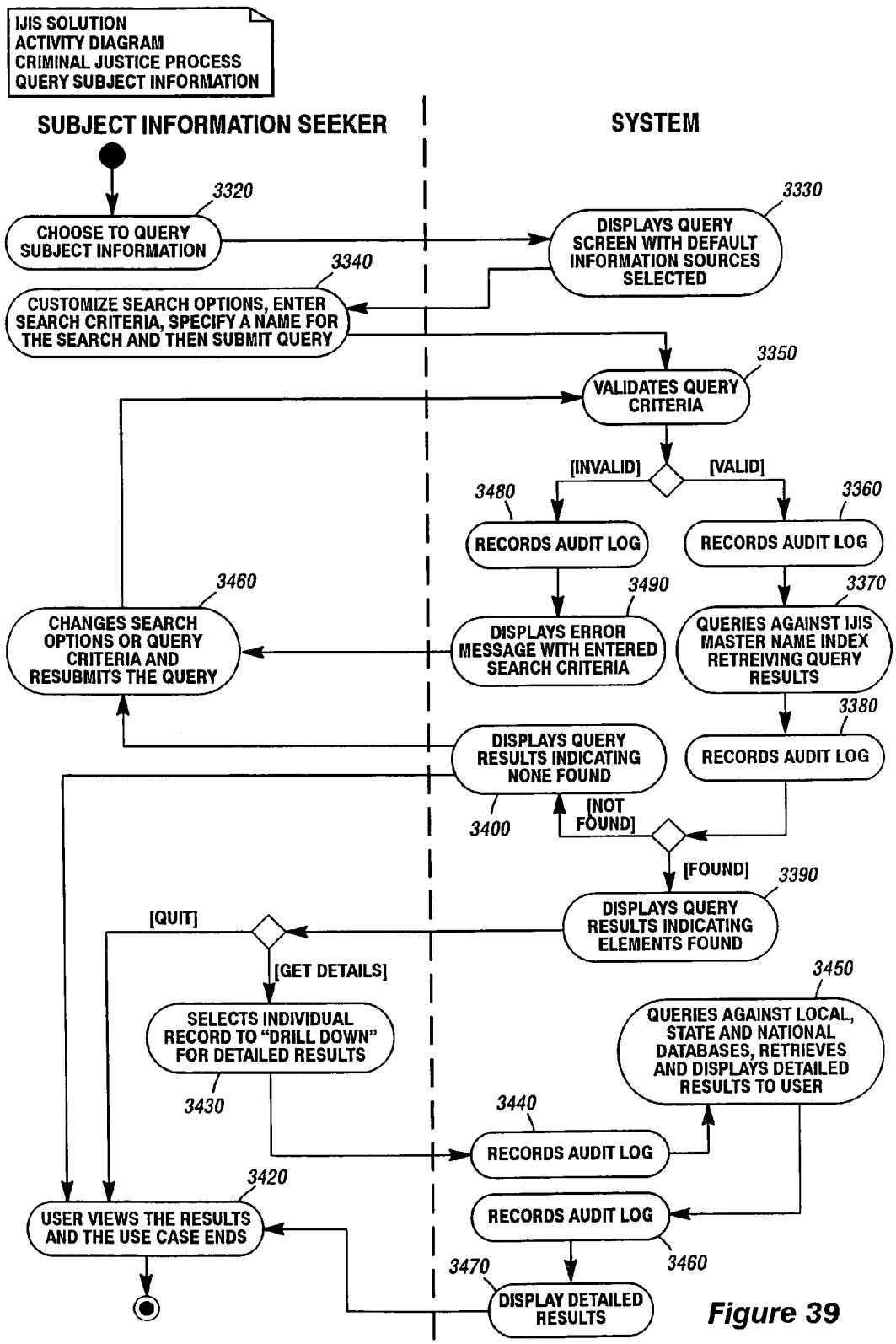
FIG. 39 illustrates the Query Subject Information use case activity diagram.

As illustrated in FIG. 39, the activity diagram sets forth the time sequence of steps the IJIS system 70 follows in response to a query from a Subject Information Seeker, such as an arresting officer. For example, the information seeker starts the use case at step 3320 and chooses to query information for a particular subject. At step 3330, the IJIS system 70 presents the query screen with default information sources selected. The query screen contains Query Criteria data elements and a list of index information sources that will be queried. The list of index information sources is filtered based on user privileges and user profile. This list specifies the default information sources that are queried. The user may change the default search option settings as desired. At step 3340, the user enters Query Criteria, including a name for the search, and submits the query. At step 3350, the IJIS system 70 validates query information entered by the user and saves the Query Criteria that was entered by the user. If the Query Criteria is validated, then, at step 3360, the IJIS system 70 records the Query Audit log for the query submitted by the user. The IJIS system 70 next queries the selected Index sources to retrieve the Query Results (step 3370) and records a Query Result Audit Log (step 3380). The IJIS system 70 then presents a Query Results screen to the user at step 3390. The user may specify a name for the query criteria and submit the data to be saved in the IJIS system 70 along with the Query name and the date. On the other hand, if no results are found, at step 3400, a display is presented so indicating, and the user is given the option to change the search at step 3410 and resubmit the query or to end the query at step 3420.

Based on the query results at step 3390, the user may identify an individual record and "drill down" for detailed results at step 3430. In this case, the user selects a particular query result item to get the detailed results. The IJIS system 70 records the pre-detailed results audit log at step 3440 and then retrieves detailed results from the appropriate information repositories for display to the user at step 3450. The post-detailed results are recorded in the audit log at step 3460. The detailed results are then presented to the user at step 3470. The Query use case then ends at step 3420. Those skilled in the art will appreciate that when the IJIS system 70 queries detailed results from various local, state and national data sources, some sources may return the results immediately while others may take longer. In any case, the information should be made available as soon as it arrives.

On the other hand, if the IJIS system 70 fails to validate the user at step 3350, then the audit log is recorded at step 3480 and an error message including the query screen with pre-filled Query Criteria values is displayed at step 3490. The user is then given the option at step 3410 to change the search query and to resubmit the query.

A sample Query Criteria is illustrated in the following table. In other words, the user is presented a query screen with a subset of these fields based on the IJIS system's business rules.

| Item Name | Item Type | Considerations | Description |
| --- | --- | --- | --- |
| First Name | String, max length 30 | Case insensitive | Subject's Given Name |
| Middle Name | String, max length 30 | Case insensitive | Subject's Middle Name |
| Last Name | String, Max length 30 | Case insensitive | Subject's Surname |
| Nickname | String Max length 30 | Case insensitive | Also Known As |
| Race | String | Case insensitive | Subject's race |
| Ethnicity | String | Case insensitive | Subject's ethnicity |

-continued

| Item Name | Item Type | Considerations | Description |
|---|---|---|---|
| Scars/Marks/Tattoos | String | Case insensitive | Description of any scars, marks or tattoos the person has on their skin. |
| Height | Numeric | Range | Subject's height (in inches). Example, if the user enters 60 inches, IJIS will search 50–70 range. |
| Weight | Numeric | Range | Subject's weight (in lbs.). Example, if user enters 180 lbs., IJIS will search 160–200 lbs. Range. |
| Eye Color | Character | Case insensitive | Subject's eye color (i.e. Green) |
| Hair Color | String | Case insensitive | Subject's hair color |
| DOB | Date (mm/dd/yyyy) | Range | Subject's Date of Birth |
| Age Range | Numeric | Range | Example, if the user enters age as 30, IJIS will search 25–35 range. |
| Sex | String | Male/Female/Other | Subject's gender |
| SSN | Numeric | | Subject's Social Security # |
| SID | String | Case insensitive | State Identification Designator |
| FBI | String | Case insensitive | FBI Number |
| Drivers License Number | String | Case insensitive | Subject's Drivers License Number |

The query results may appear as follows, where the rows are sorted according to relevance.

| Field Name | Field Type | Considerations | Description |
|---|---|---|---|
| Last name | String | | |
| First Name | String | | |
| Nickname | String | | Alias |
| Date of Birth | Date | | |
| Sex | String | | |
| SSN | Numeric | | Subject's Social Security Number. |
| Race | String | | |
| Ethnicity | String | | |
| Height | | | |
| Weight | | | |
| Hair Color | | | |
| Eye color | String | | |
| DOB | Date | | Subject's Date of Birth. |
| Marks/Scars/Tattoos | String | | Description of any scars, marks or tattoos the person has on their skin. |
| SID | Numeric | | State Identification Designator |
| FBI | Numeric | | FBI Number |
| Driver's License | String | | Subject's Drivers |

| Field Name | Field Type | Considerations | Description |
|---|---|---|---|
| Number | | | License Number |
| License Plate Number | String | | |
| Photograph | Blob | | |
| Address | | YES | Indicates whether there are addresses available. List of addresses and the source that provided the address. |
| Warrants | | "YES/NO" | Indicates whether subject has outstanding warrants. |
| Protection Orders Exists | | "YES/NO" | Indicates whether there is a protective order against the subject. |
| Probation Status | | "YES/NO" | Indicates whether or not a person is on probation. |
| Parole Status | | "YES/NO" | Indicates whether or not a person is on parole. |
| Sex Offender Status | | "YES/NO" | Indicates whether or not a person is a sex offender. |
| Criminal History Reports Exists | | "YES/NO" | Arrest information and sentence information. Charges and dispositions are kept here. |
| Department of Motor Vehicles (DMV) | | "YES/NO" | Indicates a revoked, suspended, restricted or expired drivers license. |

If the user then "drilled down into the State Wants and Warrants File for warrants information, the following results would be obtained.

| Field Name | Field Type | Considerations | Description |
|---|---|---|---|
| Issuing Court | String | | Name of issuing court |
| Judge Name | String | | Name of issuing judge |
| Issue Date | Date | | Date warrant issued |
| Status Date | Date | | Date of warrant status |
| Warrant Type | String | | Type of warrant |
| Warrant Number | String | | Warrant number |
| Charge | String | | Charge on subject |
| Extradite indicator | String | | Extradite candidate |
| Contact Information | String | | Name and number of Justice personnel to contact regarding this warrant. |
| Comments | String | | Additional information |

Of course, the user could drill down for other information available from the Court Management System 3000, the Jail Management System 2950, the Records Management System 3010, the State Protection Order System, the Probation System 2964, Parole System 2962, Sex Offender Registration System 3032, the State CCH System 3030, the DMV System, and the like.

Similar information is developed for the other use cases of the type identified above.

Analysis Model

The analysis model explains the relationships among the classes of individuals and information within the IJIS system 70. The analysis model further provides the building blocks for the software by identifying names, functions, and attributes for the processes to be performed by the IJIS system 70 software.

Figures 40, 40A:
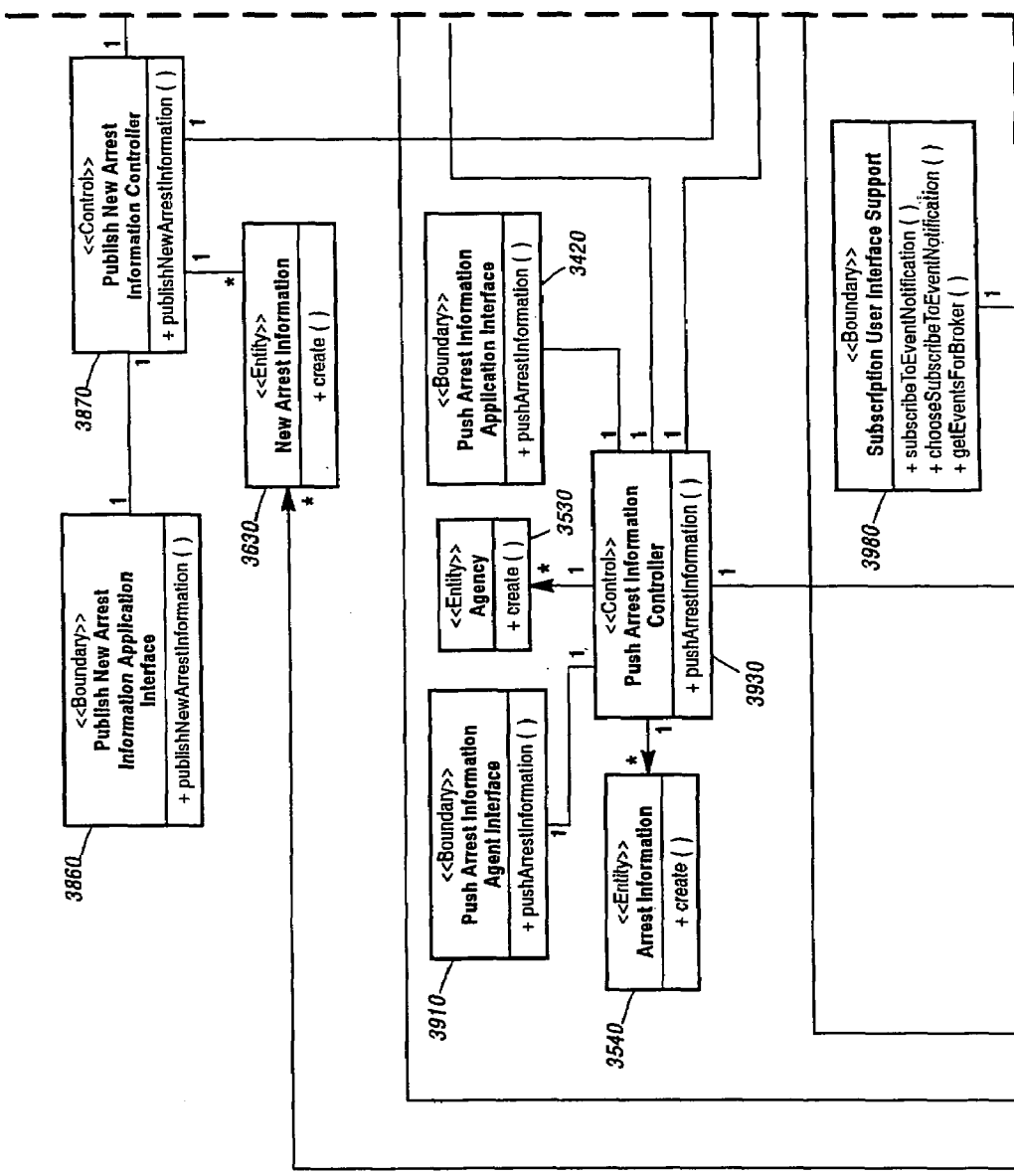
FIG. 40 illustrates a global view of the class diagram for the IJIS system of the invention, where numerous classes and their inter-relationships and associated variables are indicated.
Figures 40, 40B:
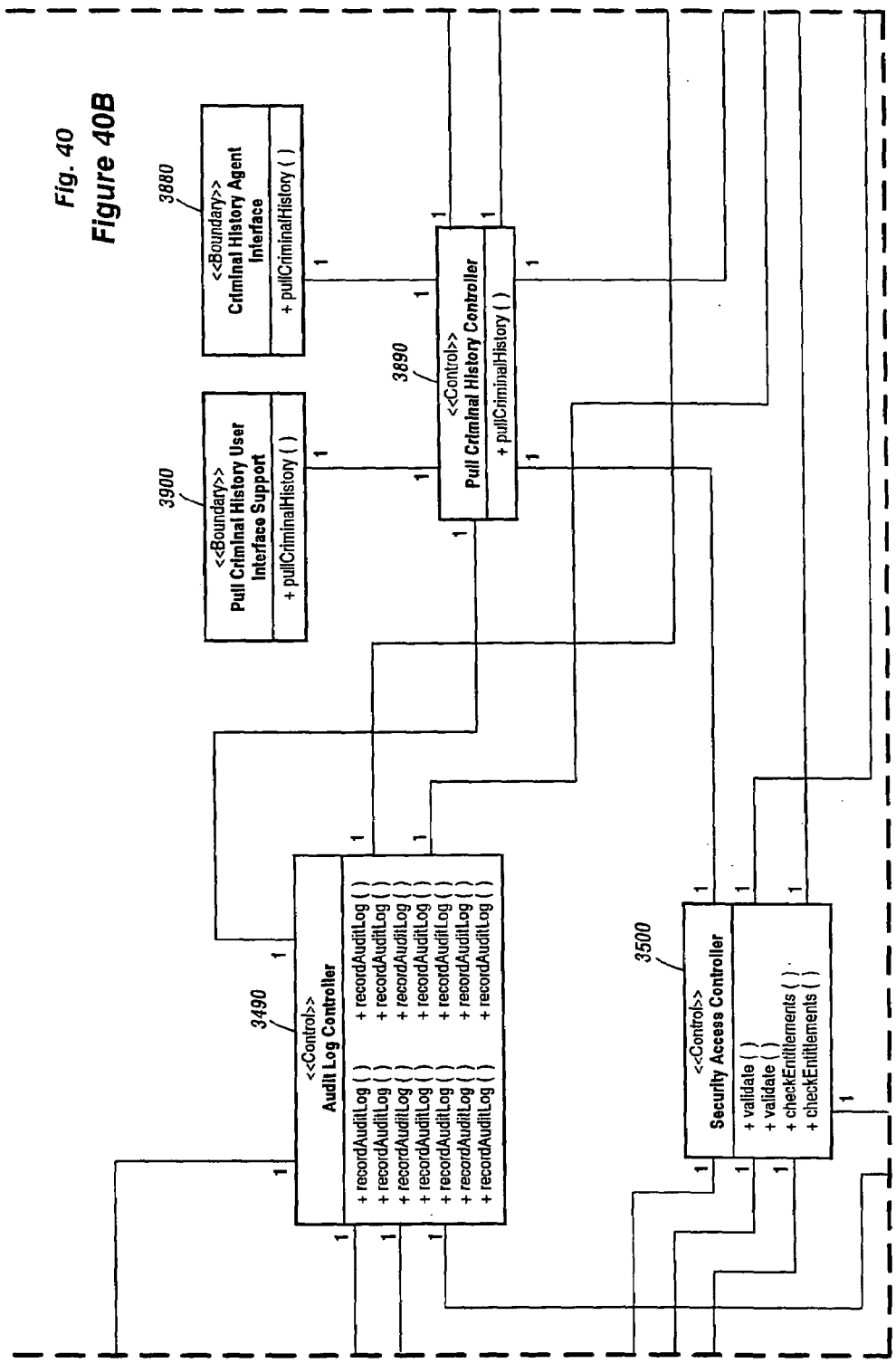
Figures 40, 40C:
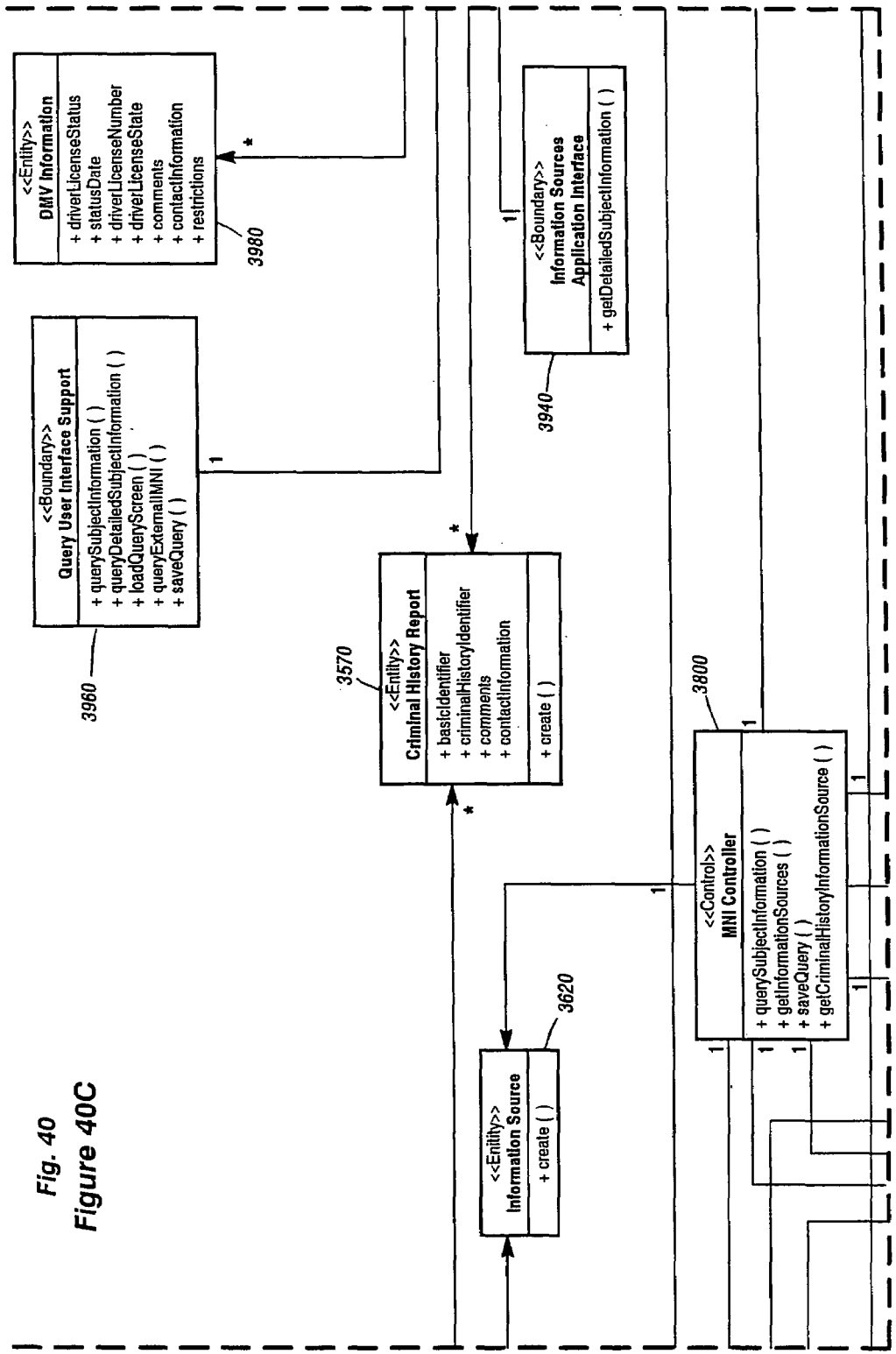
Figures 40, 40D:
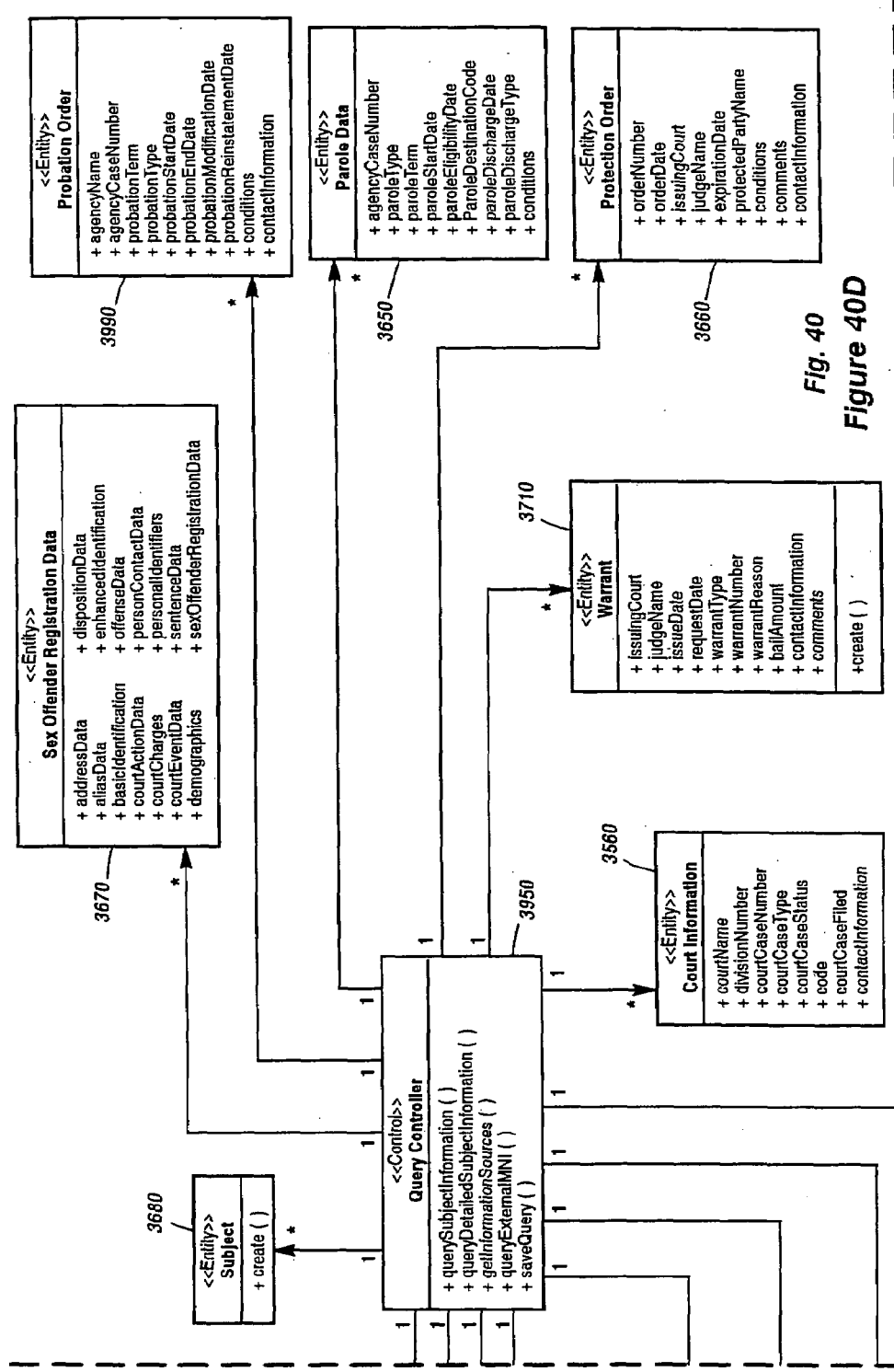
Figures 40, 40E:
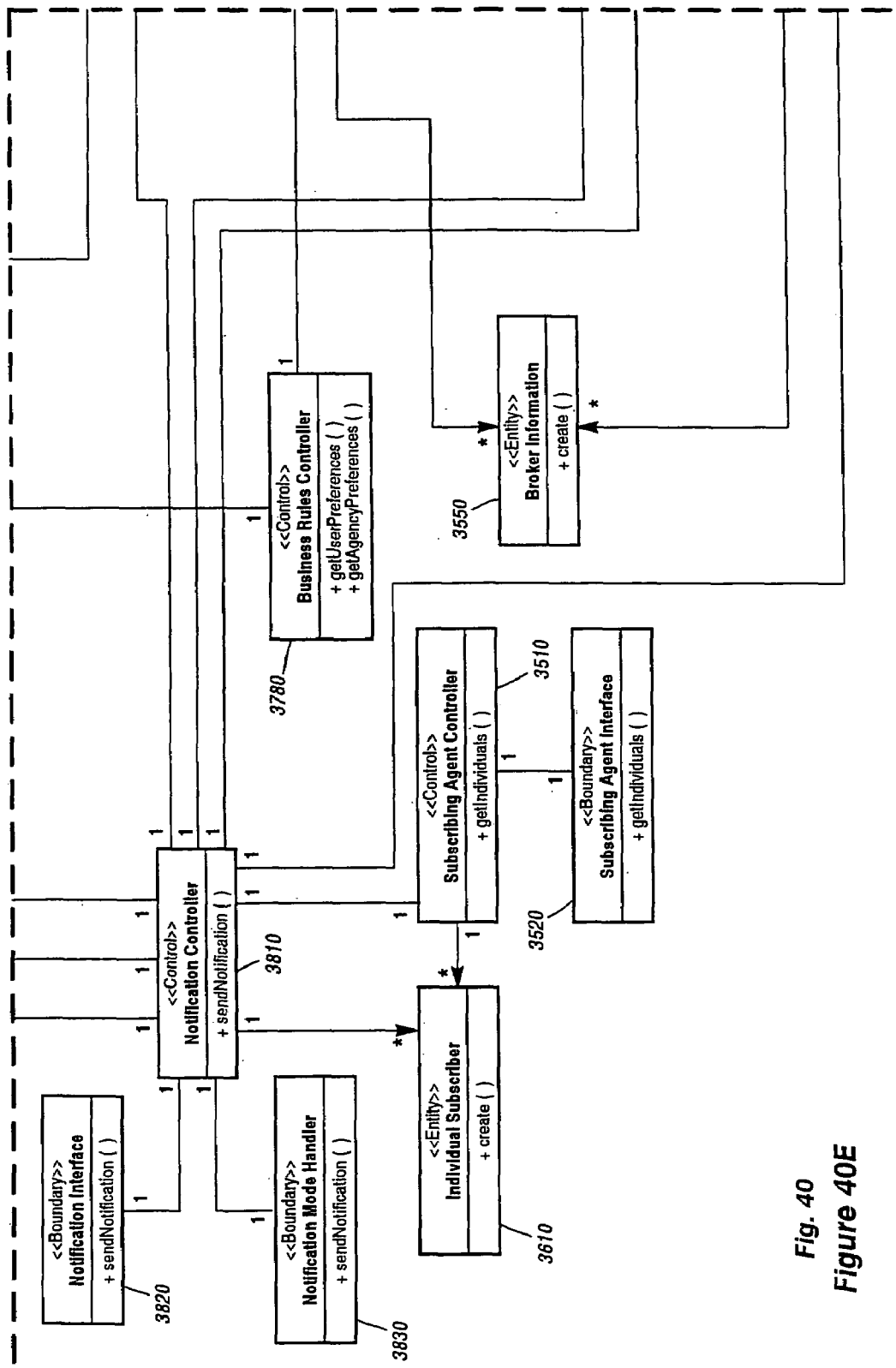
Figures 40, 40F:
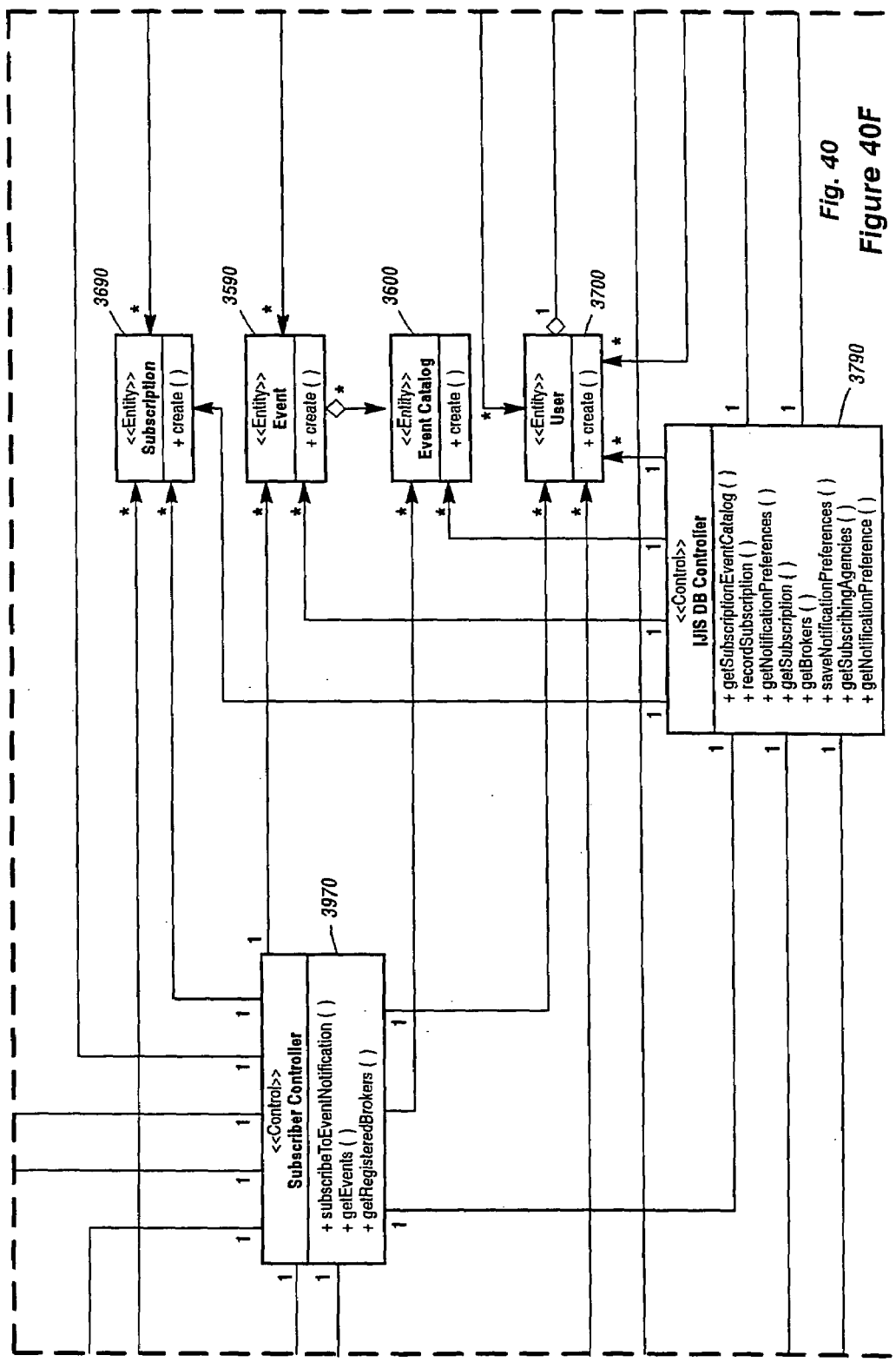
Figures 40, 40G:
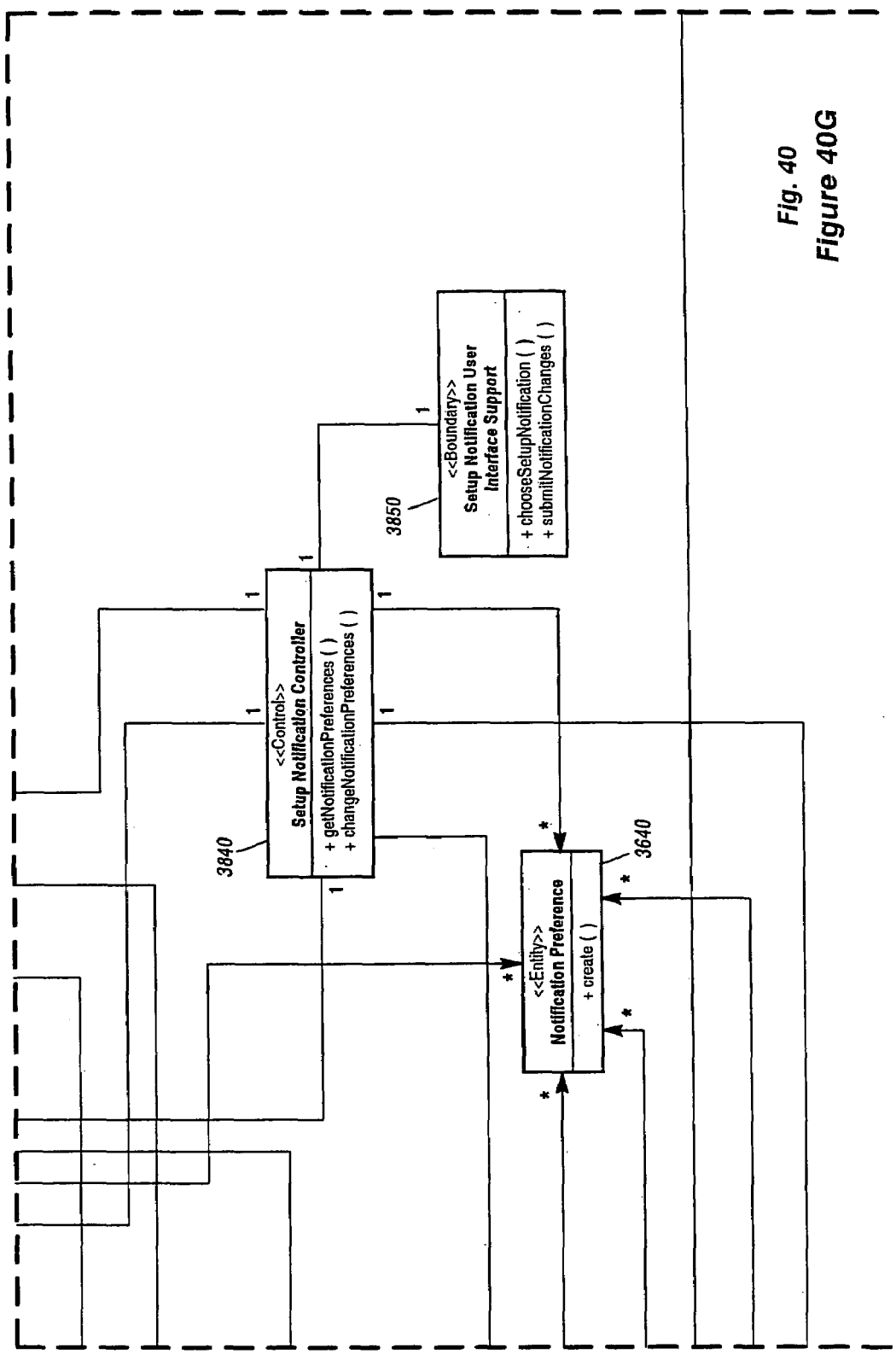
Figures 40, 40H:
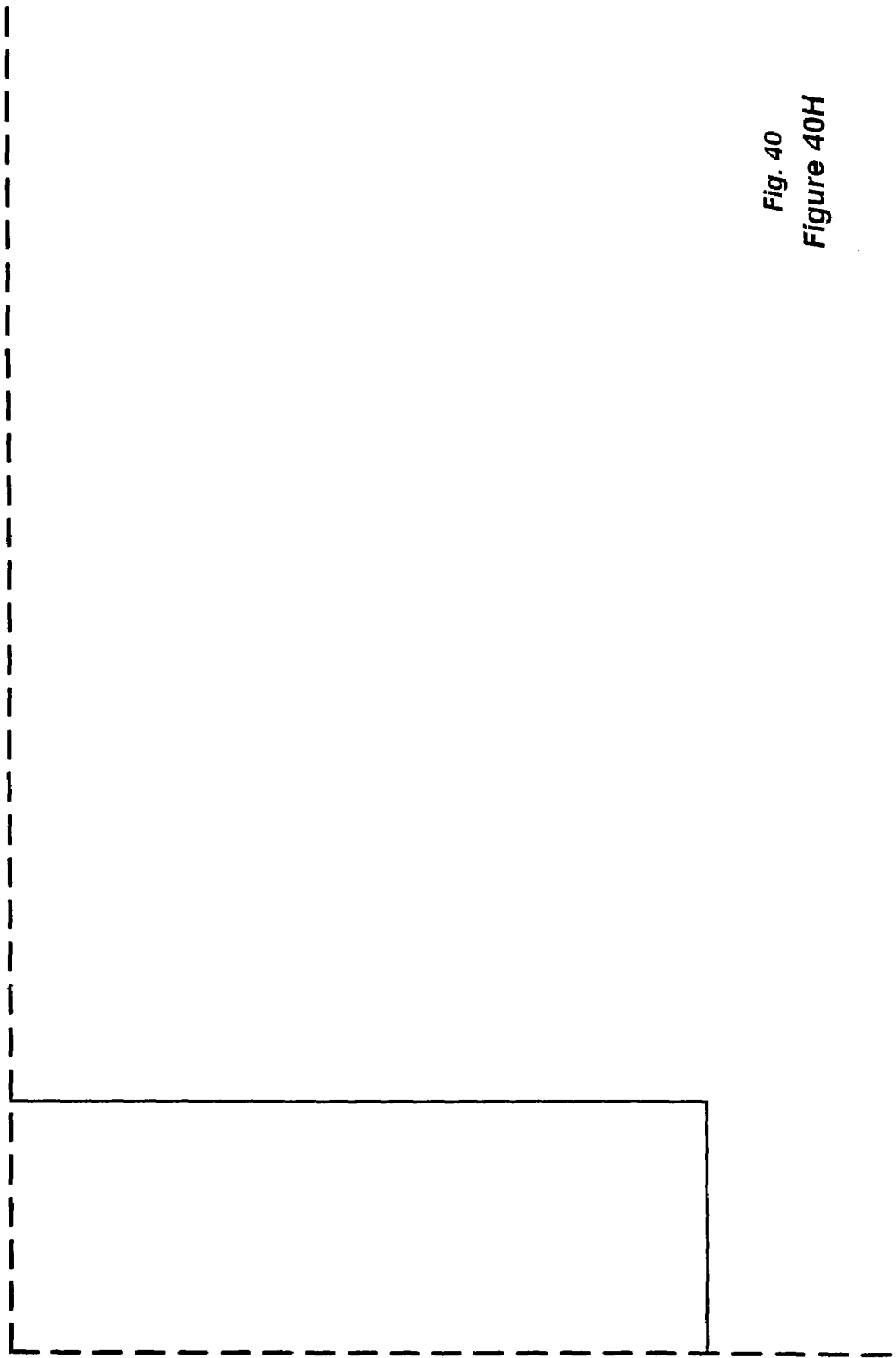

The analysis model requires the identification of a number of data classes and a mapping of the data flow. A global view of the class diagram for the IJIS system 70 of the invention is illustrated in FIG. 40, where numerous classes and their inter-relationships and associated variables are indicated. In this embodiment, the classes in the analysis model include the following:

An audit log controller 3490 provides services for activity and event logging.

A security access controller 3500 provides services such as authentication, authorization, single sign-on and entitlements.

A subscribing agent controller 3510 is responsible to retrieve individual subscribers from the justice agency system.

A subscribing agent interface 3520 provides an interface to access the subscribing agency.

An agency 3530 provides details about the agency system pushing information to other participating justice agency system.

Arrest information 3540 provides arrest information about a particular subject.

Broker information 3550 is integrated as part of the IJIS system 70. This can be a county level, federal level or a state level broker which is participating in information sharing.

Court information 3560 provides court case information of the subject.

Criminal history report 3570 contains the lists of offenses on record for a subject. It also contains the arrests and charging information for the subject.

DMV information 3580 provides driving license information for a subject.

An event 3590 represent the critical process points in the criminal justice process. Examples of events are Arrest, Release etc.

An event catalog 3600 provides a list of events.

An incident report/arrest report (not shown) contains basic/enhanced information about the arrestee, statements of victim(s) and witness(es). It also contains arresting agency information, arrest offence charge(s) and sometimes vehicle information.

Individual Subscriber 3610 provides individual subscriber information.

Information source 3620 stores information repository information for the participating justice agency system.

New arrest information 3630 stores new arrest information.

Notification preference 3640 represents the mode of delivery specified by an individual subscriber to receive notification. For example, the individual user might want to receive notification by cellphone, pager, email. This information is stored for the user as his delivery preferences.

Parole data 3650 stores parole information.

Protection order 3660 is an order made by a judge to protect one person from another. The order lists certain conditions the person named in it must follow—usually that he or she can have no direct or indirect contact with the other person. If the person disobeys the conditions, he or she may face significant consequences, including a fine and/or jail. A protection order may be either a peace bond (also known as an "810 recognizance") or a restraining order.

Query result (not shown) is the set of subject information returned to the user depending on the query criteria.

Record of Arrest and Prosecution (RAP) sheet (not shown) is a listing of an individual's history of arrests, charges, dispositions, detention and incarceration periods, probation and parole in a jurisdiction—a state. A RAP Sheet also includes the individual's identifying features, scars, marks, and tattoos, and address and employment information. The formats and contents of RAP Sheets vary slightly by state.

Sex offender registration data 3670 contains information about a sex offender.

Sex offender release information (not shown) contains release information about a sex offender.

Subject 3680 represents the subject information who needs to be identified by the user.

Subscription 3690 represents the interest shown on an event by an agency to receive notification.

user 3700 represents the user credentials using the IJIS system 70.

Vehicle data (not shown) includes vehicle information (e.g., make, model, description, license plate, and registration information) regarding motor vehicles involved in the offense.

Warrant 3710 includes information about the warrant, e.g., warrant type, warrant reason, issuing agency etc.

Business Rules Controller 3780 contains the various workflow and data flow rules for the criminal justice system. This encapsulates the various routing scenarios and keeps the track of the events and the document flow among various participating justice agency systems.

IJIS DB Controller 3790 is responsible for all the database operations to be performed by the IJIS components. It is responsible to store and update the IJIS database. In other words, this acts as the persistence layer for the IJIS business layer abstracting out the DB layer.

Master Naming Index (MM) Controller 3800 maintains key identification elements of individuals associated with participating Justice Agency Systems.

Notification Controller 3810 is responsible for get the individual preferences from IJIS database and get the current list of subscribing individuals from the subscribing agencies.

Notification Interface 3820 provides the application interface to access notification controller 3810.

Notification Mode Handler Interface 3830 is responsible to deliver notification to individual subscribers as per their preferences.

Setup Notification Controller 3840 is responsible for managing the various notification preferences of the individual subscribers. The controller store the individual preferences for a user in the IIS database using the IJIS DB controller 3790.

Setup Notification user Interface Support 3850 provides an interface for the agency administrator to setup the delivery preferences for individual subscribers. The individual subscribe can specify different preferences to receive notification of an event and the mode (e.g. cellphone, pager, email etc.) to receive it.

Publish New Arrest Information Application Interface 3860 provides the interface to publish new arrest information. This, in turn, talks to Publish New Arrest Controller 3870 to make the publish happen.

Publish New Arrest Information Controller 3870 is responsible for publishing the arrest information to be received by the individual subscribers.

Criminal History Agent Interface 3880 is responsible to query the state CCH system to retrieve the criminal history report. This contains the glue code to retrieve the report from the state CCH.

Pull Criminal History Controller 3890 interacts with the MNI controller 3800 to get the information source where criminal history is available. This then places a request to the criminal history agent interface 3880 to retrieve the criminal history report.

Pull Criminal History user Interface Support 3900 provides an interface to the user to retrieve criminal history report. This interface is responsible for the request entry and the rendering of the actual criminal history report to the information seeker.

Push Arrest Information Agent Interface 3910 provides the interface to the state CCH and prosecutor systems. This contains the glue code to interact with the state CCH and prosecutor systems to update the individual system with arrest information.

Push Arrest Information Application Interface 3920 provides the application interface for the push arrest information controller 3930.

Push Arrest Information Controller 3930 performs the activities like input document validation, sending the document to various justice agencies and audit logging. Push arrest information controller 3930 validates the document as the per rules defined in the use case specifications. Push arrest information controller 3930 with the help of the push arrest information agent interface 3910 transforms the document and sends the document to various justice agency systems.

Information Sources Application Interface (ISAI) 3940 represents the interface for the query controller 3950 to query subject information. ISAI 3940 is responsible for providing the facade for query controller 3950 to interface with various justice agency systems. The ISAI 3940 has all the information like connection information and data formats to connect to the justice agency systems. The may well be a COTS application (e.g. Federated Database) integrating various external databases in one universal schema enabling the IJIS system 70 to perform queries.

Query Controller 3950 performs the activities like query criteria validation, querying subject information, consolidating query results and audit logging. Query controller 3950 validates the query criteria entered by the user as the per rules defined in the use case specifications. Query controller 3950 with the help of the ISAI 3940 queries various justice agency systems for the subject's information, consolidates the results and sends it to query user interface support 3960 to be formatted and displayed to the user.

Query user Interface Support (QUIS) 3960 represents the interface for the users to query subject information. QUIS 3960 is responsible for providing the information entry support. For example, QUIS 3960 will enable the user with the query screen to enter the subject's information who needs to be identified. QUIS 3960 will be responsible for forwarding the requests made by the user to the query controller 3950. QUIS 3960 will also provide for formatting the results returned by the query controller 3950 to be displayed to the user in consistent format. For example, in a J2EE™ specific implementation, QUIS 3960 may be a collection of JSPs and Servlets performing the information entry and rendering functions.

Subscriber Controller 3970 is responsible for the management of subscription set by the agency administrator. The controller saves the agency subscription in the IJIS database. The agency specifies the interest in an event when it wants to receive a notification.

Subscription user Interface Support 3980 provides an interface for the agency administrator to subscribe the agency for an event. The agency administrator can choose to subscribe various events listed on the user interface.

Probation Order 3990 provides probation information.

Figures 41, 41A, 41B:
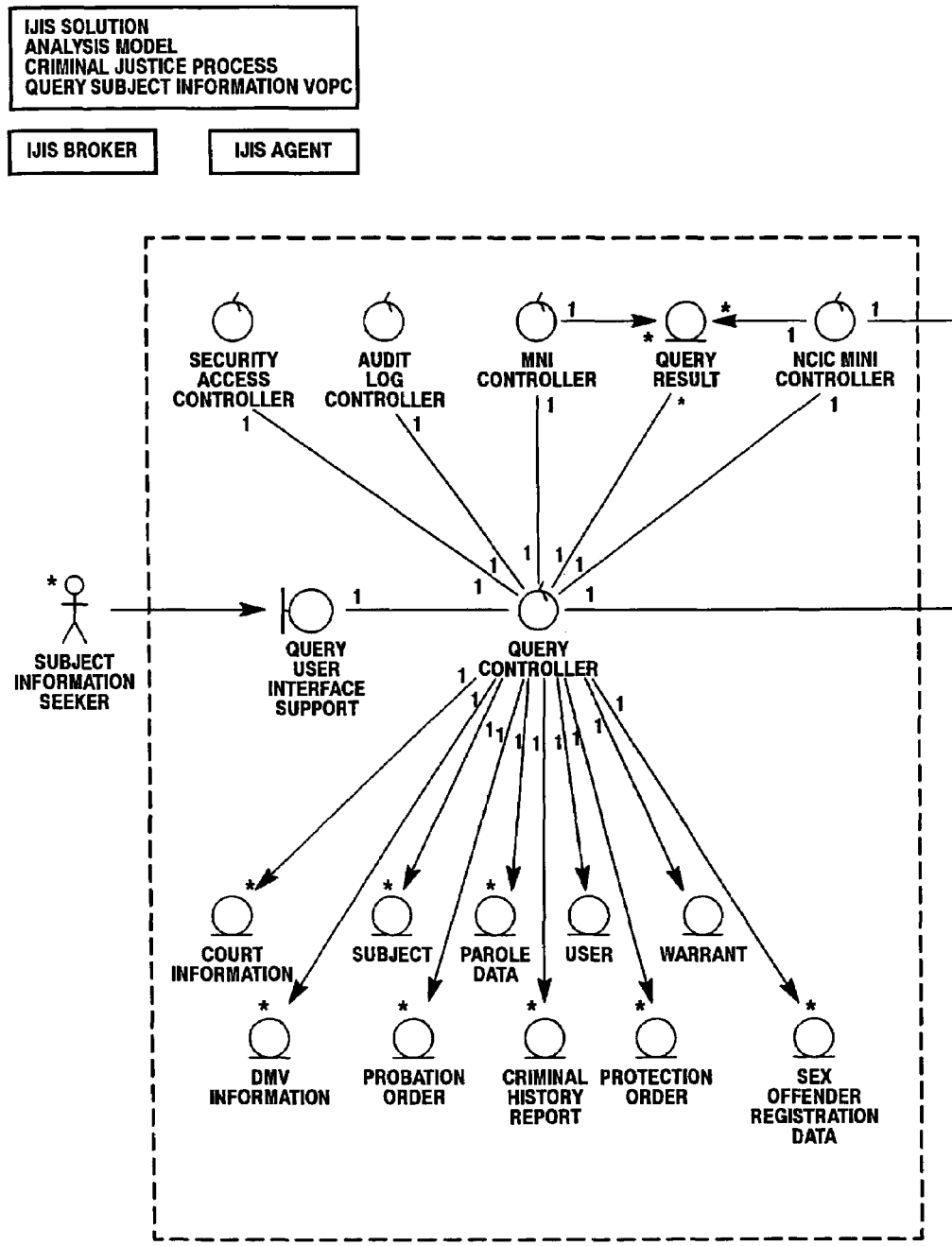
FIG. 41 illustrates the class diagram for Query Subject Information.
Figures 41, 41B:
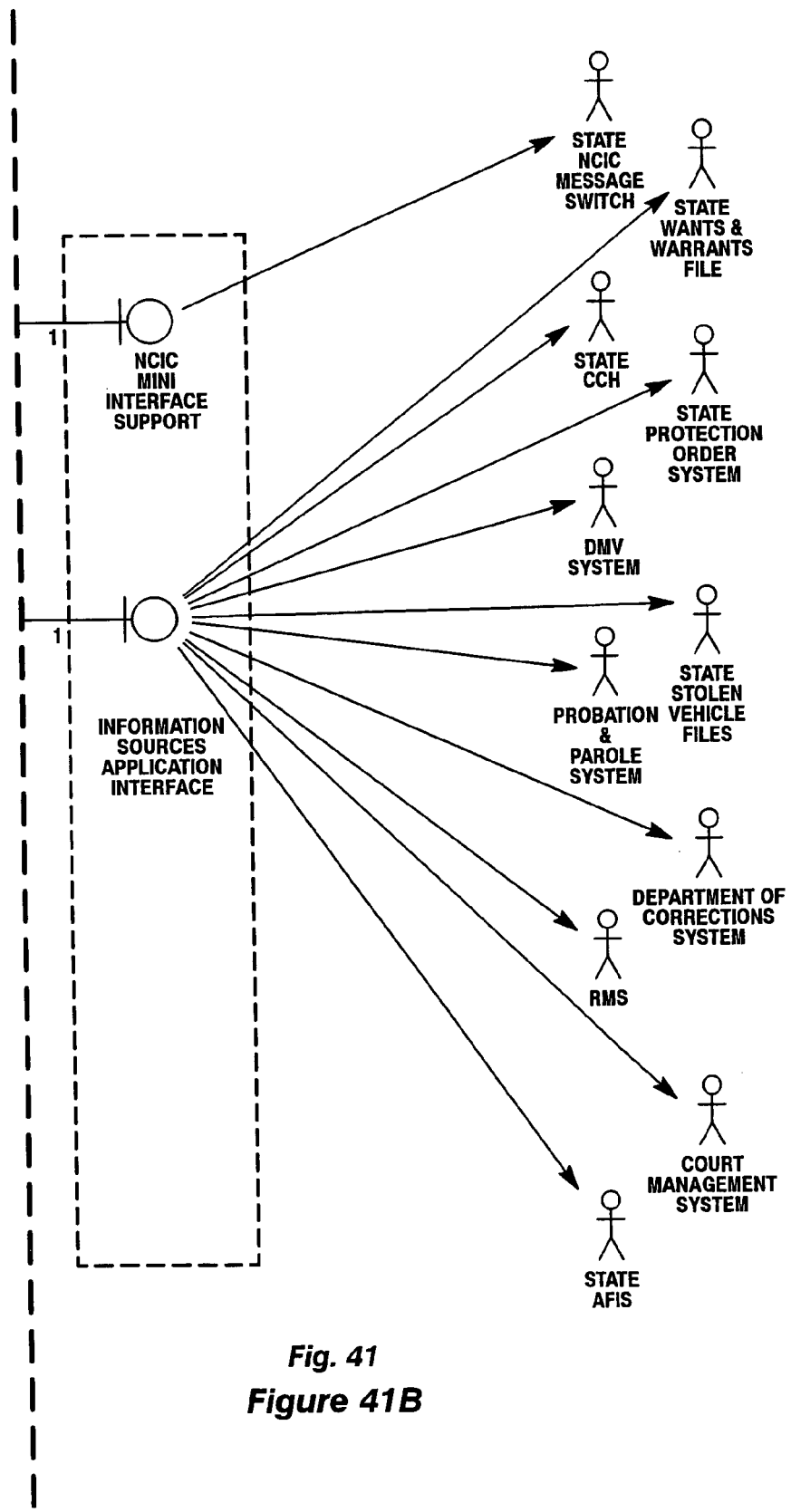
Figures 42, 42A:
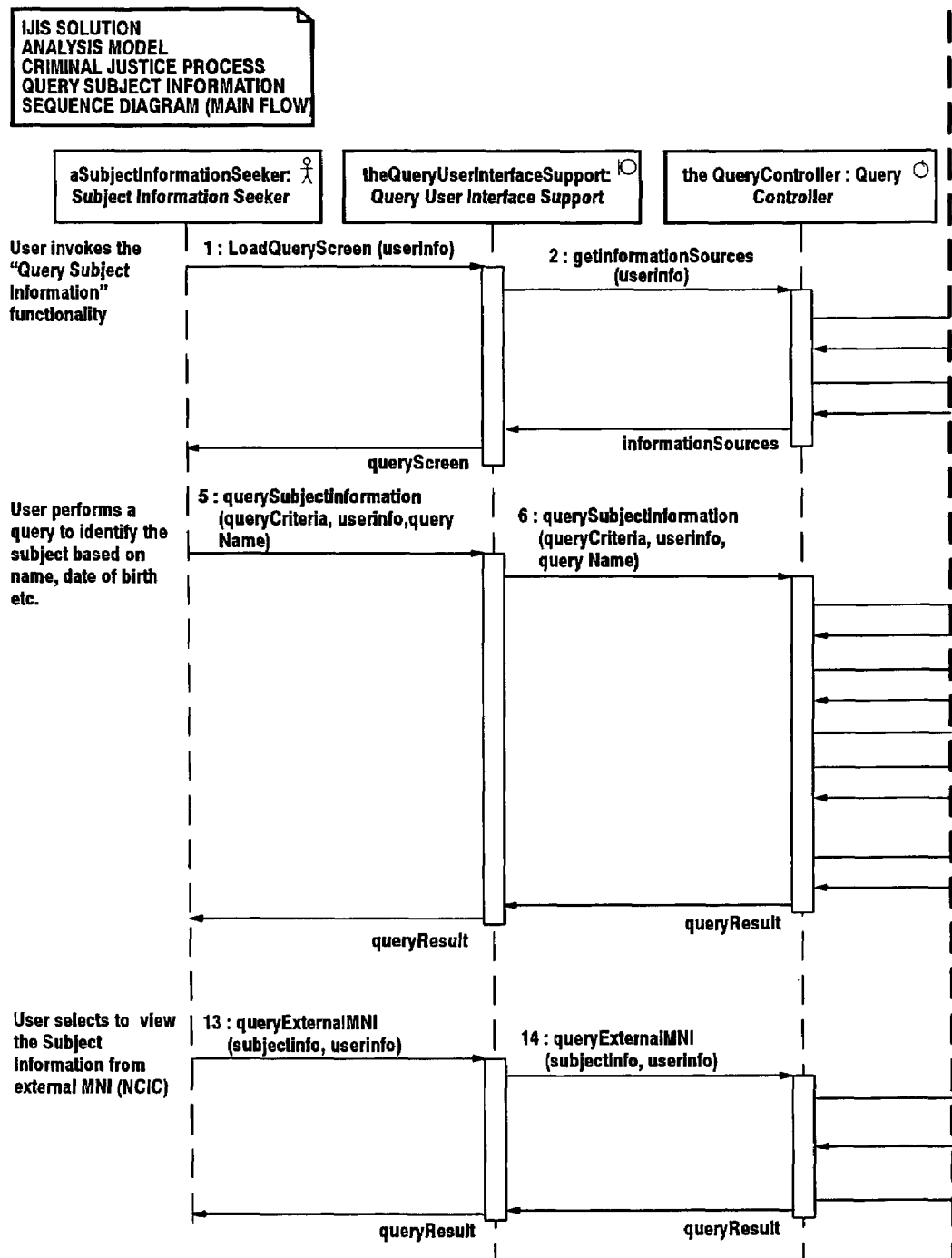
FIG. 42 illustrates the sequence diagram for Query Subject Information.
Figures 42, 42B:
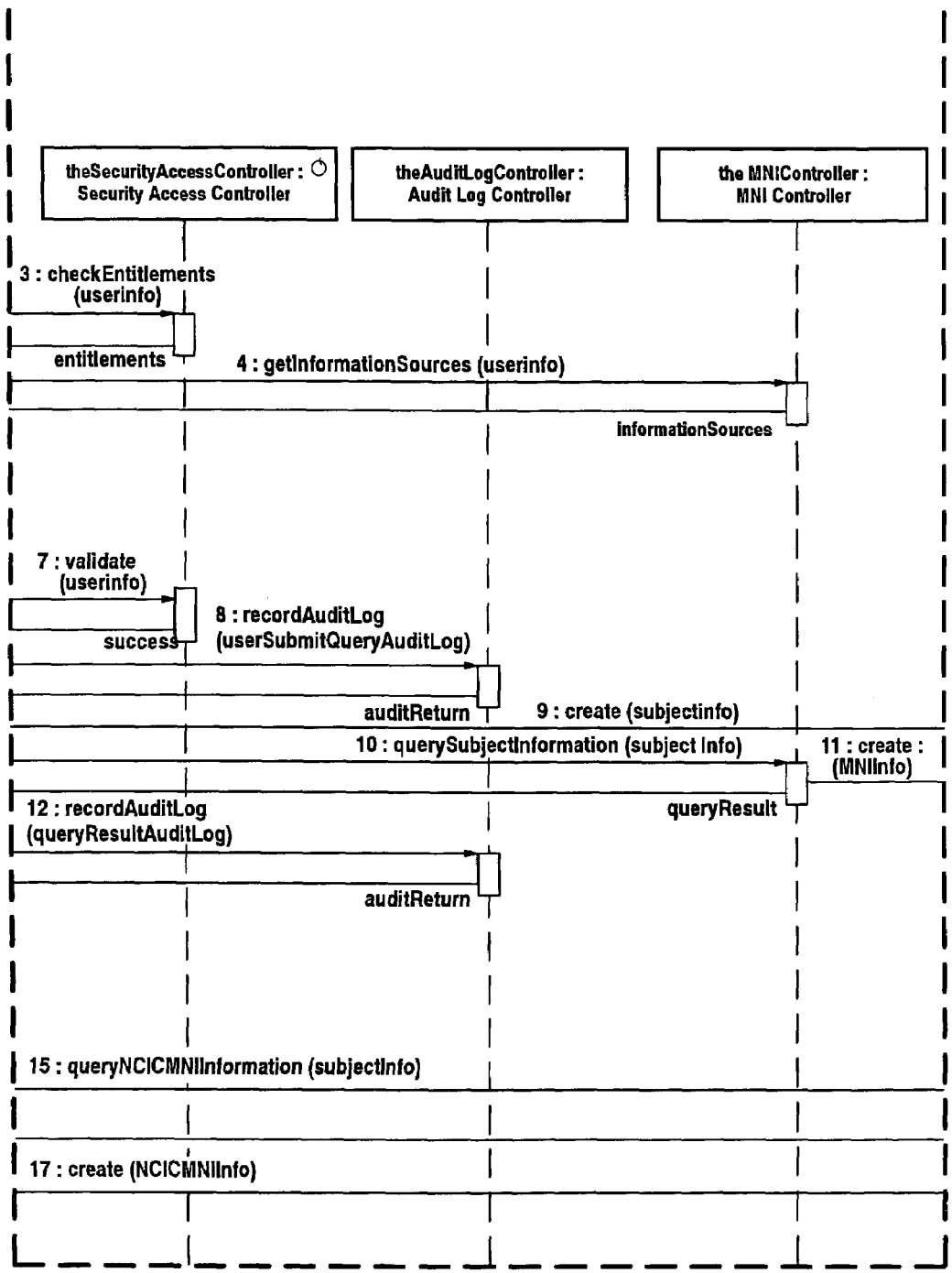
Figures 42, 42C:
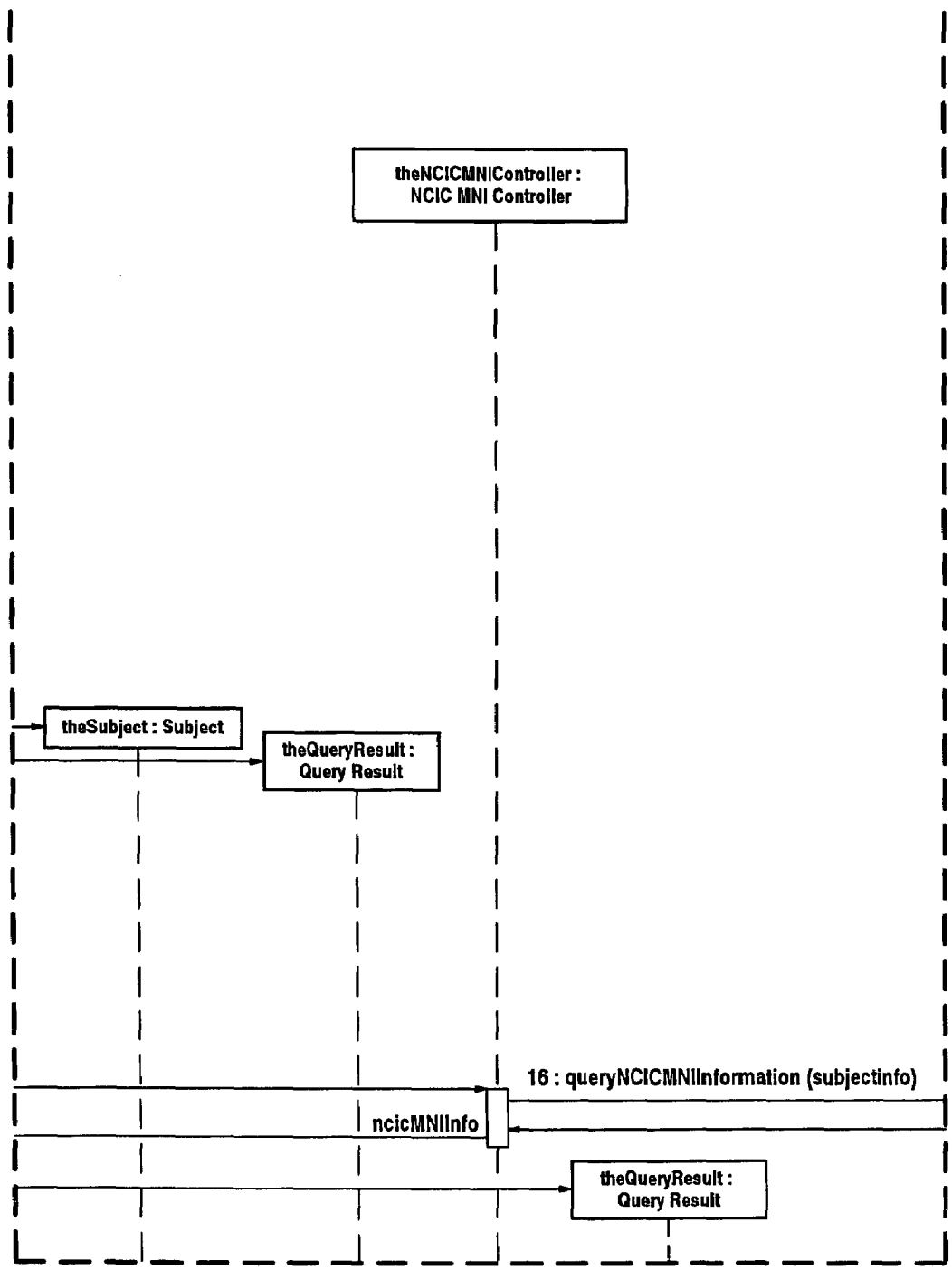
Figures 42, 42D:
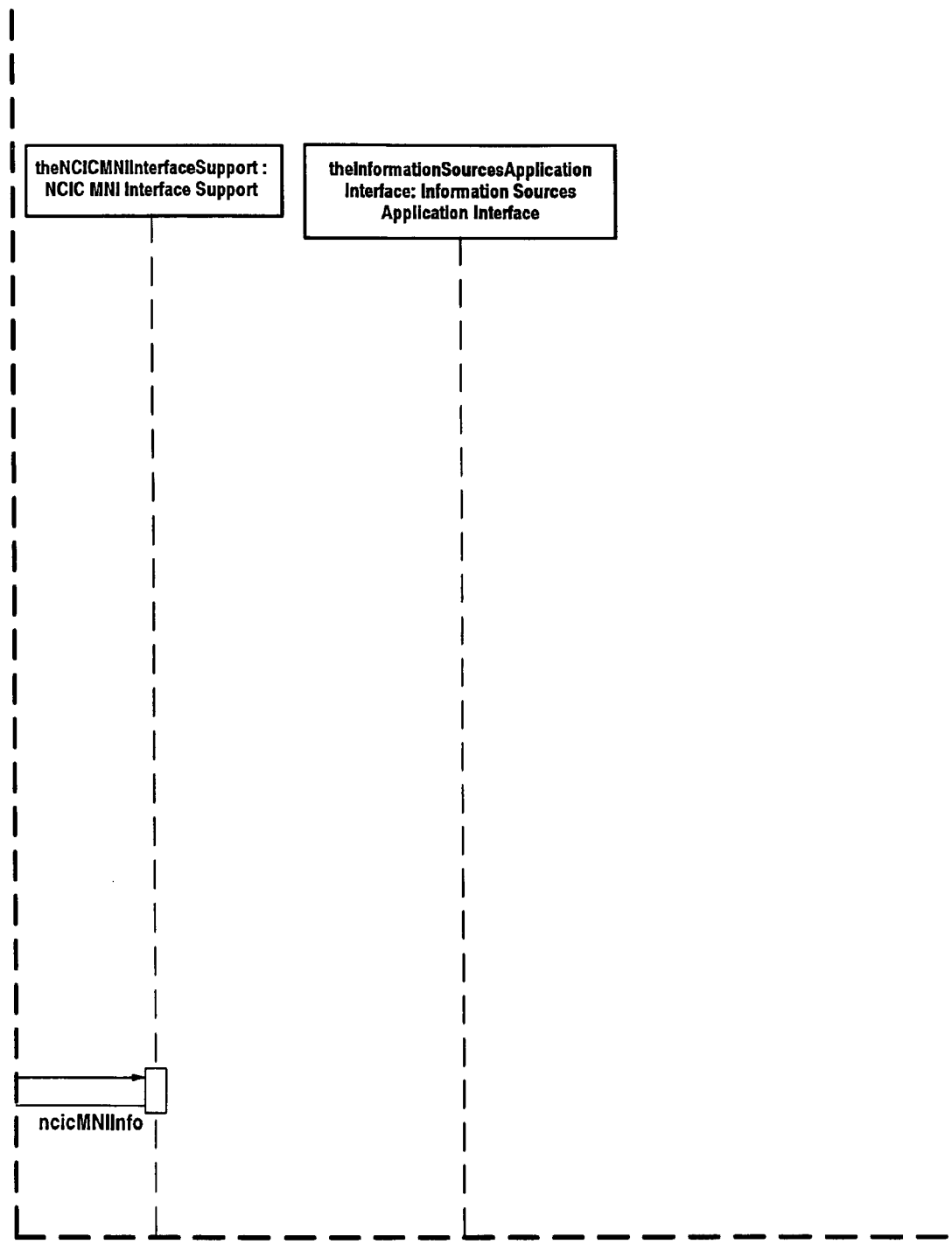
Figures 42, 42E:
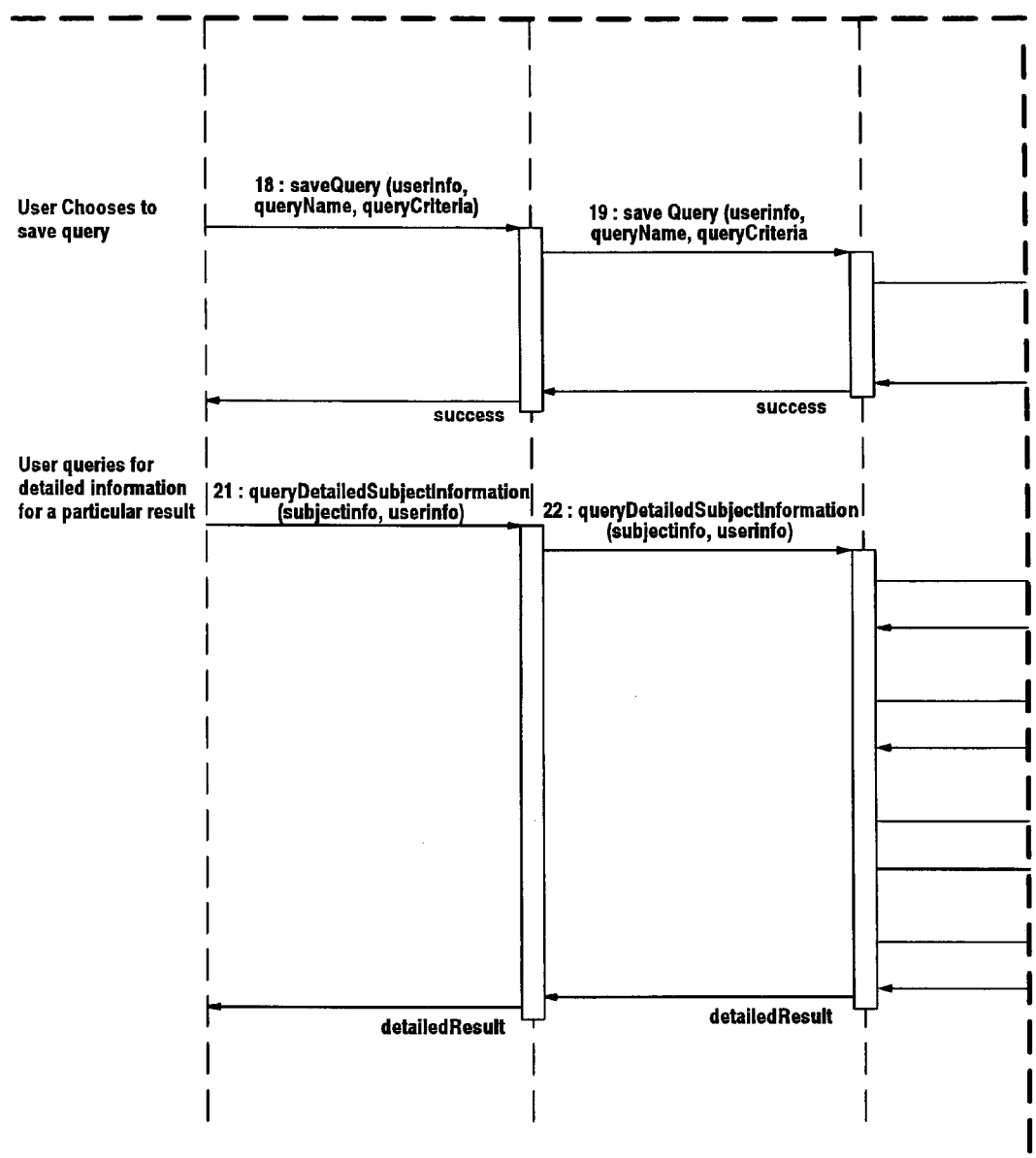
Figures 42, 42F:
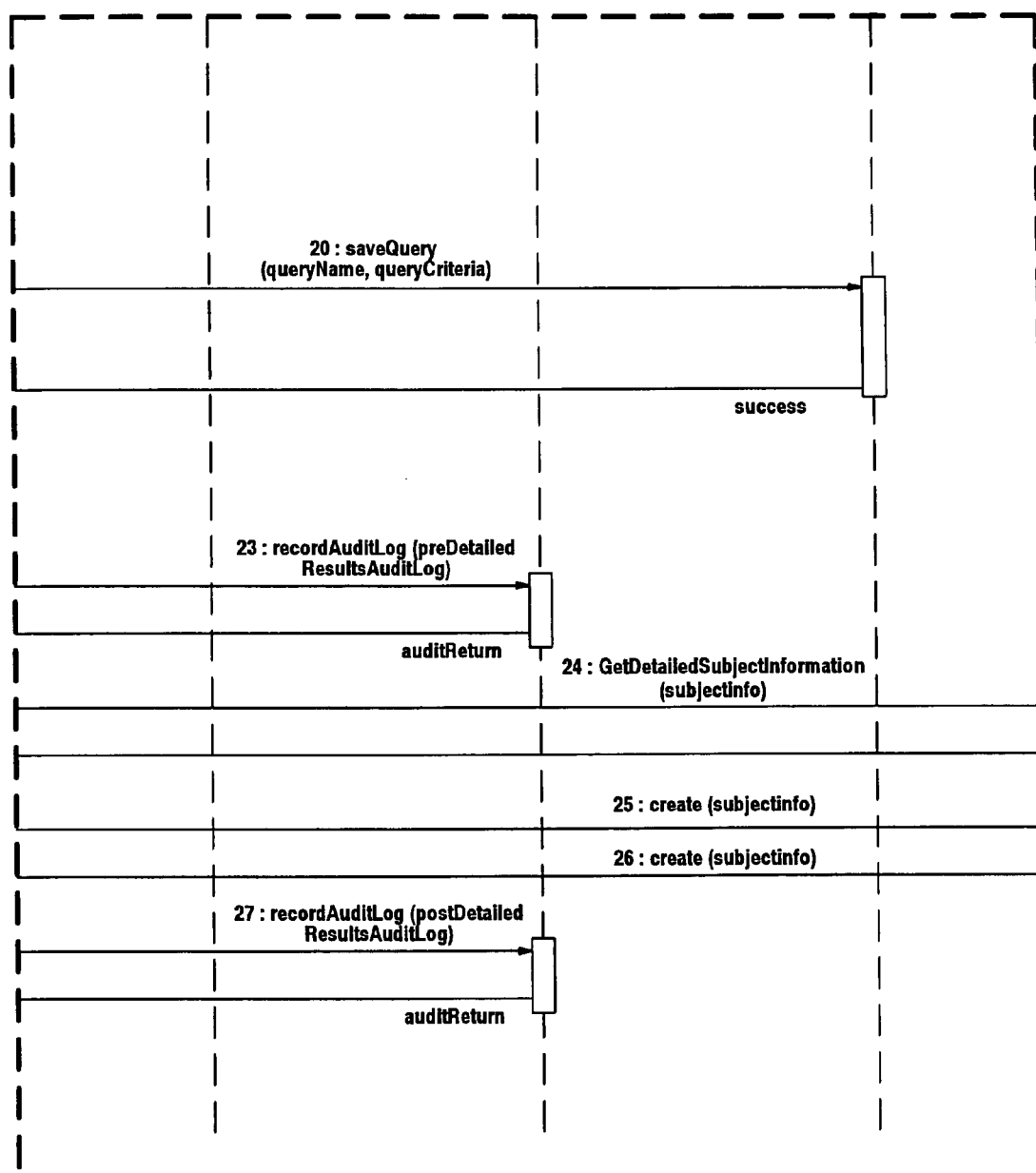
Figures 42, 42G:
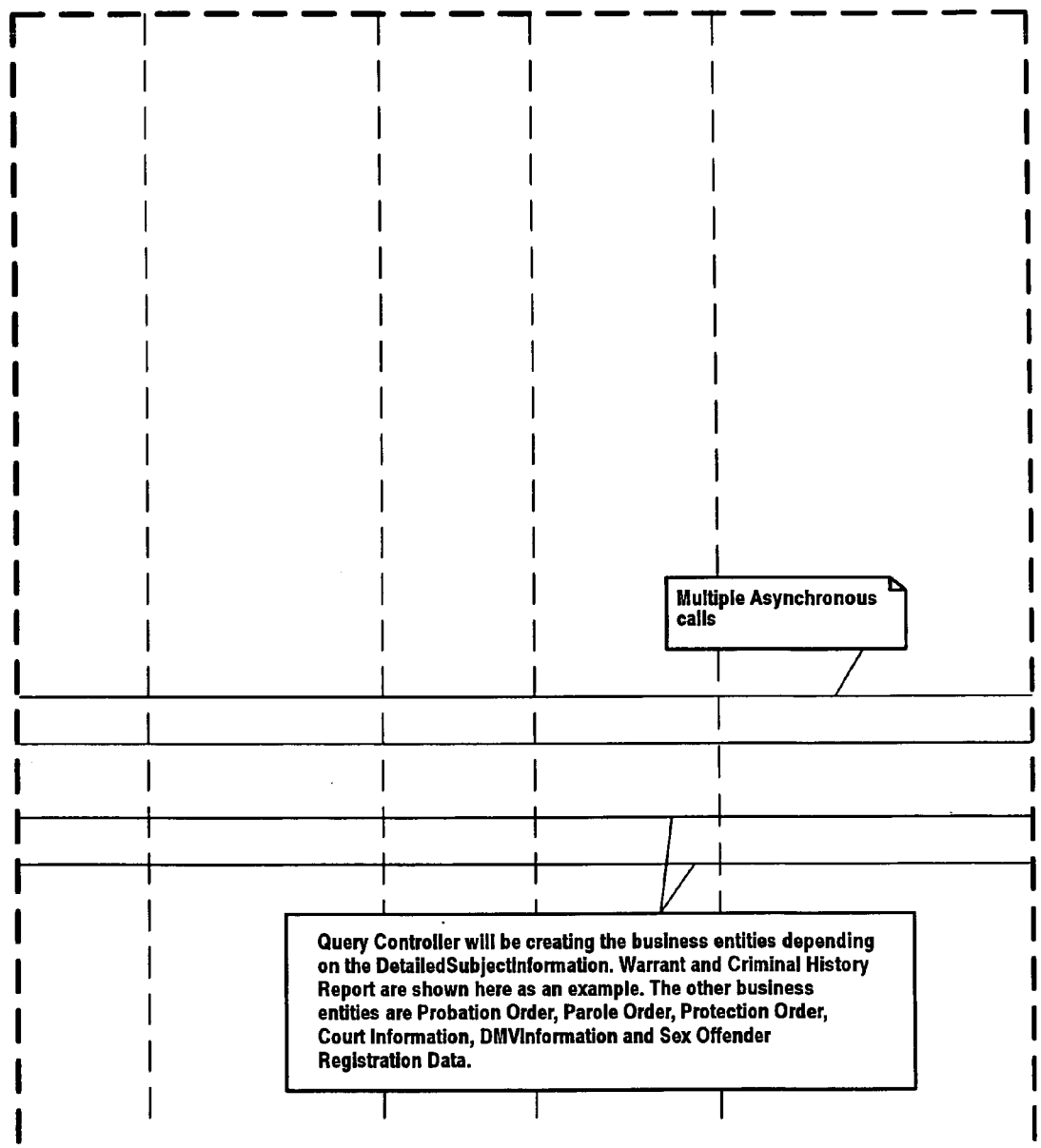
Figures 42, 42H:
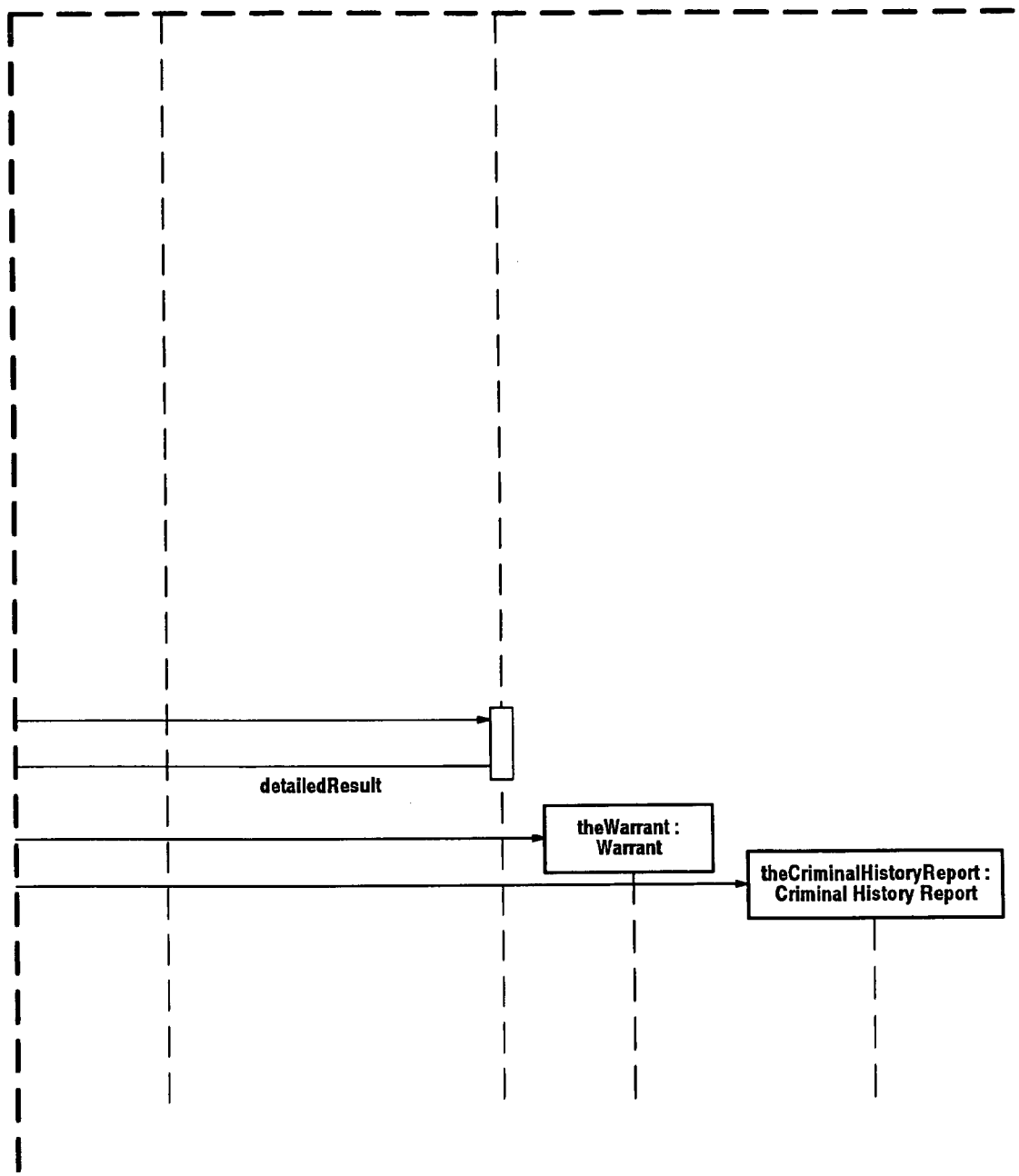

UML class diagrams and activity diagrams are generated for each of these classes. For example, FIG. 41 illustrates the class diagram for Query Subject Information, while FIG. 42 illustrates the activity diagram for Query Subject Information. These figures identify the software components as opposed to the people and objects that were the focus of the other models described above.

Platform Independent Model

The IJIS system 70 of the invention is particularly characterized by the fact that it is designed to be platform independent so that it may be used in conjunction with incumbent systems as well as new commercial-off-the-shelf (COTS) systems. Since UML is used in the design process, the platform independent model is traceable so that changes to the design may be readily documented. The analysis model described above with respect to FIG. 40 is preferably used to design and implement the platform independent model using the afore-mentioned software blueprinting approach. Using such a design approach, a platform independent model is created for the IJIS software.

In particular, in accordance with the invention, IJIS message broker 20 and IJIS adaptors/agents 80 (FIG. 4) are architected as a cohesive group of modules (subsystems and components) arranged in layers based on a Unisys canonical 6-layer architecture. The IJIS message broker 20 can be explained by a 6-layer architecture. Similarly, each of the IJIS adaptors/agents 80 such as state NCIC agent, state CCH agent, DMV agent, etc., also may be explained by 6-layer architecture.

Figure 43A:
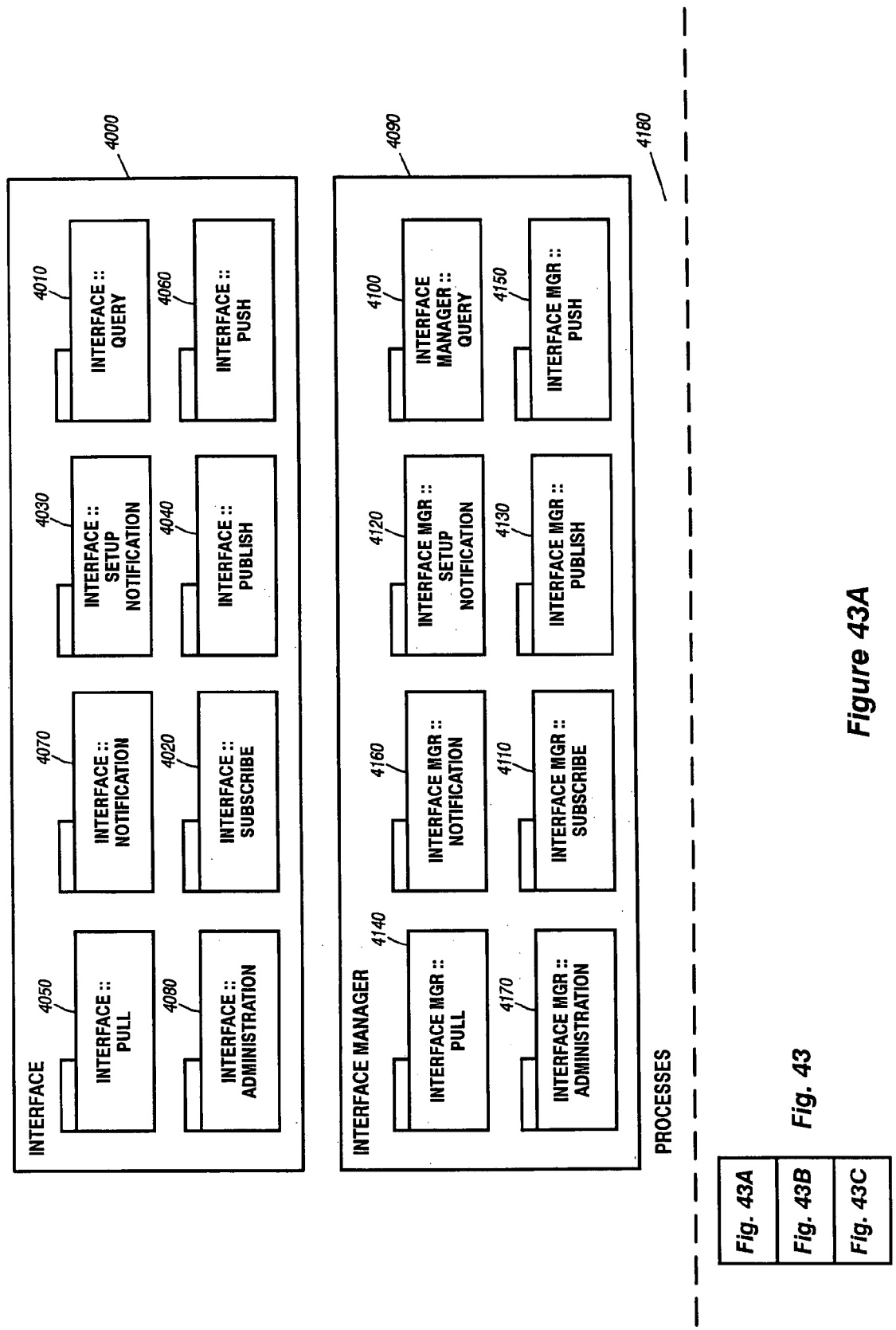
FIG. 43 illustrates the six-layered architecture of the IJIS message broker.
Figure 43B:
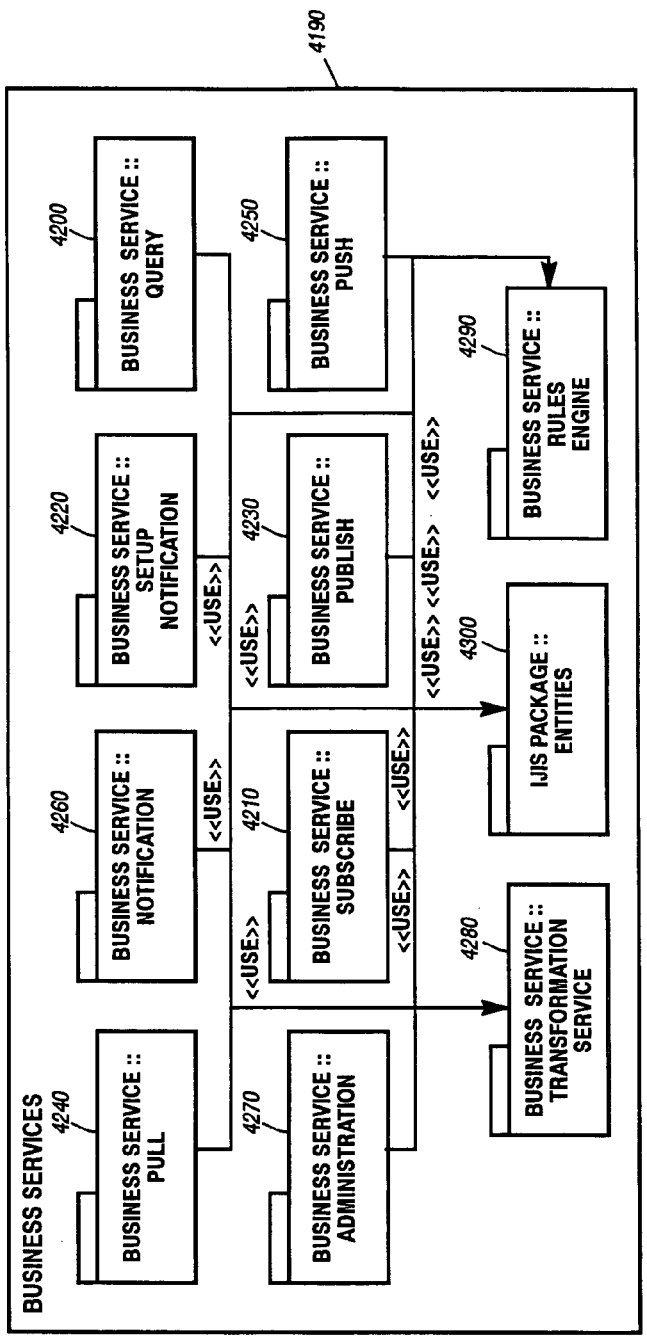
Figure 43C:
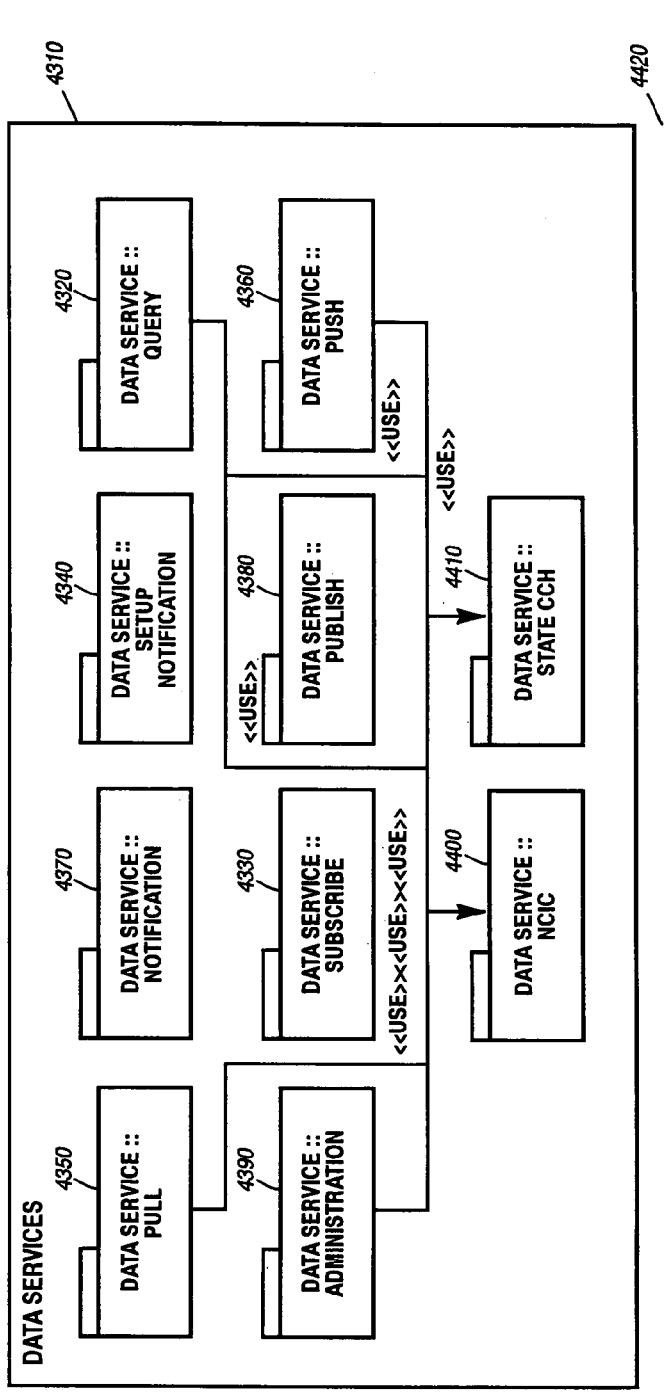

FIG. 43 illustrates the six-layered architecture of IJIS message broker 20. Interface layer 4000 components provide the entry point into the IJIS message broker 20. All requests from user and software clients will initially be processed in this interface layer 4000. Interface layer 4000 enables loose coupling between clients from underlying layer components. As illustrated in FIG. 43, interface layer 4000 may include the following components: Query Graphical user Interfaces (4010); Subscription Graphical user Interface (4020); Setup Notification Graphical user Interface (4030); Publish Information Software Interface (4040); Pull Information Graphical user Interface (4050); Push Event Software Interface (4060); Event Notification Software Interface (4070); Administration Graphical user Interfaces (4080); and IJIS Agent Callback Interfaces (not shown). Callback interfaces, such as State NCIC and State CCH, in conjunction with the interface manager listen to message queues for any arriving messages from IJIS adaptors/agents 80 and invoke appropriate business services.

Interface manager layer 4090 includes components that facilitate interaction between components of the interface layer 4000 and underlying layers. As illustrated in FIG. 43, interface manager layer 4090 may include the following components: Query user Interface Manager (4100); Subscription user Interface Manager (4110); Setup Notification user Interface Manager (4120); Publish Information Interface Manager (4130); Pull Information Interface Manager (4140); Push Event Interface Manager (4150); Event Notification Interface Manager (4160); Business Service Locator (not shown); Administration user Interface Manager (4170); and IJIS Agent Callback Interface Managers (not shown). These callback components, such as State NCIC and State CCH, listen to message queue for any arriving messages from IJIS adaptors/agents 80 and invoke appropriate business services.

Process Layer 4180 is provided for business process workflow management, as needed.

Business Layer 4190 is the core layer. As shown in FIG. 43, it contains the following major service components, as well as other helper components: Query Service (4200); Subscription Service (4210); Setup Notification Service (4220); Publish Information Service (4230); Pull Information Service (4240); Push Event Information Service (4250); Event Notification Service (4260); Service Locator (not shown); Administration Services (4270); and Transformation Interface and Interface Managers (4280). This layer may also include Business Rules Engine (4290) and Entities (4300). Entities objects represent data objects and often map to database tables.

Query Service 4200 comprises functionality to access Subject Name Index type data-sources. When queries are performed, it may access local Master Name Index or external Name Index data-sources such as NCIC depending on options specified by THE client. Query would also retrieve detailed information on Subject if the name index data-source contains pointers to external system that contain detailed information.

Subscription Service 4210 maintains a subscription to the Event catalog. Agency administrators subscribe their agencies to specific events in the justice process. The publish component is a recipient component of the IJIS message broker 20. It receives event information from IJIS adaptors/agents 80. Publish-Subscribe services work with Notification and Push Services to accomplish operations required to complete the event publication.

Setup Notification Service 4220 provides the administrators a means to set up the notification preferences to receive notification. The notification preferences of the user may be to receive notification on cell phones, pagers and e-mail. The Setup Notification Service provides the functionality to specify the mode to deliver notification.

Publish Information Service 4230 allows IJIS adaptors/agents 80 to publish event information to the IJIS message broker 20. The publish service components receive this publish event information and trigger notification and information push operation by interacting with Notification and Push service components, respectively.

Push Event Information Service 4250 allows IJIS adaptors/agents 80 to publish event information to the IJIS message broker 20. On receiving this event publication, IJIS message broker 20 performs notification and document push operations based on rules. The push rules and push interactions with the IJIS adaptor/agent 80 are abstracted by Push Services components.

Event Notification Service 4260 allows IJIS message broker 20 to receive event publication from IJIS adaptors/agents 80 via its Publish-Subscribe services. It relies on Notification services to lookup subscribers of the event and then send Notifications to subscribers. Notification Service 4260 sends notification via various channels (e.g. email, pager, etc.) and relies on Transformation Services 4280 to convert the message to appropriate format and content.

Administration Services 4270 provide administration functionality of the IJIS message broker 20 such as maintaining user accounts and agency system accounts.

Data Services Layer 4310 contains components that facilitate access to Relational Database Management System (RDBMS) engines (such as IBM D2, Oracle and Microsoft SQL Server) message queues, infrastructure systems and IJIS adaptors/agents 80. It also contains callback components for the IJIS adaptors/agents 80. Data Services Layer 4310 includes the following data services access facade elements for the above mentioned business services: Query Data Access Façade (4320); Subscription Data Access Facade (4330); Setup Notification Data Access Facade (4340); Pull Information Data Access Facade (4350); Push Events Data Access Facade (4360); Event Notification Data Access Facade (4370); Publish Events Data Access Facade (4380); Administration Data Access Facade (4390); and Agency Systems Data Access Facades such as state NCIC data access (4400), state CCH data access (4410), etc.

The Data Services Layer 4310 may also include data access elements such as query data access interface and managers and query message interface and managers. Similarly, the IJIS adaptors/agents 80 may include system access elements such as a state NCIC proxy and a state CCH proxy. Other elements that access infrastructure systems such as security and auditing are also provided with an interface and interface manager.:

Persistence Layer 4420 includes engines that store relation data and store-forward engines (Message Queues) such as the RDBMS engines and message queue engines.

Figures 44, 44A:
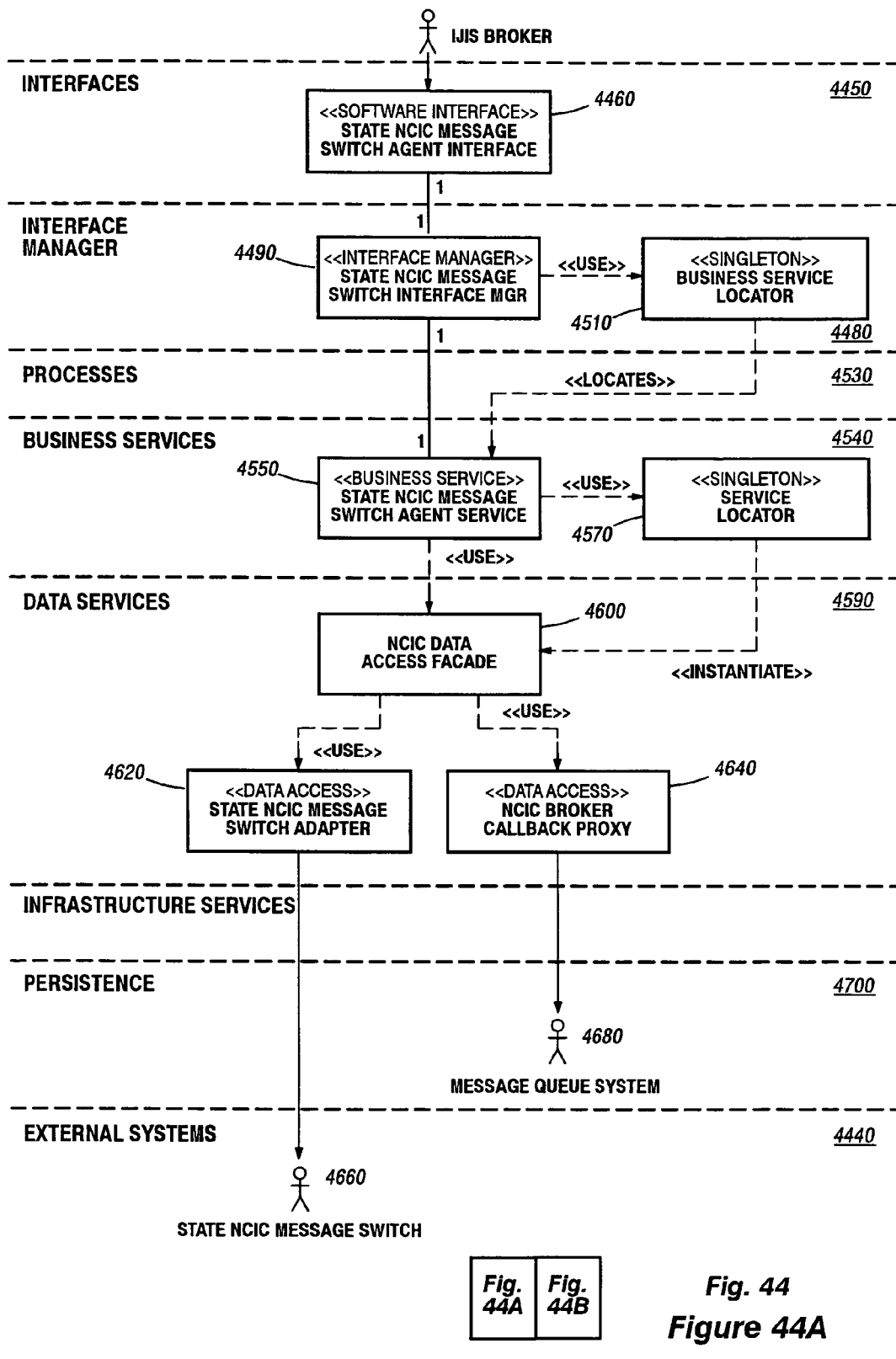
FIG. 44 illustrates the six-layered architecture of the IJIS agency systems for a state CCH agent and a state NCIC agent.
Figures 44, 44B:
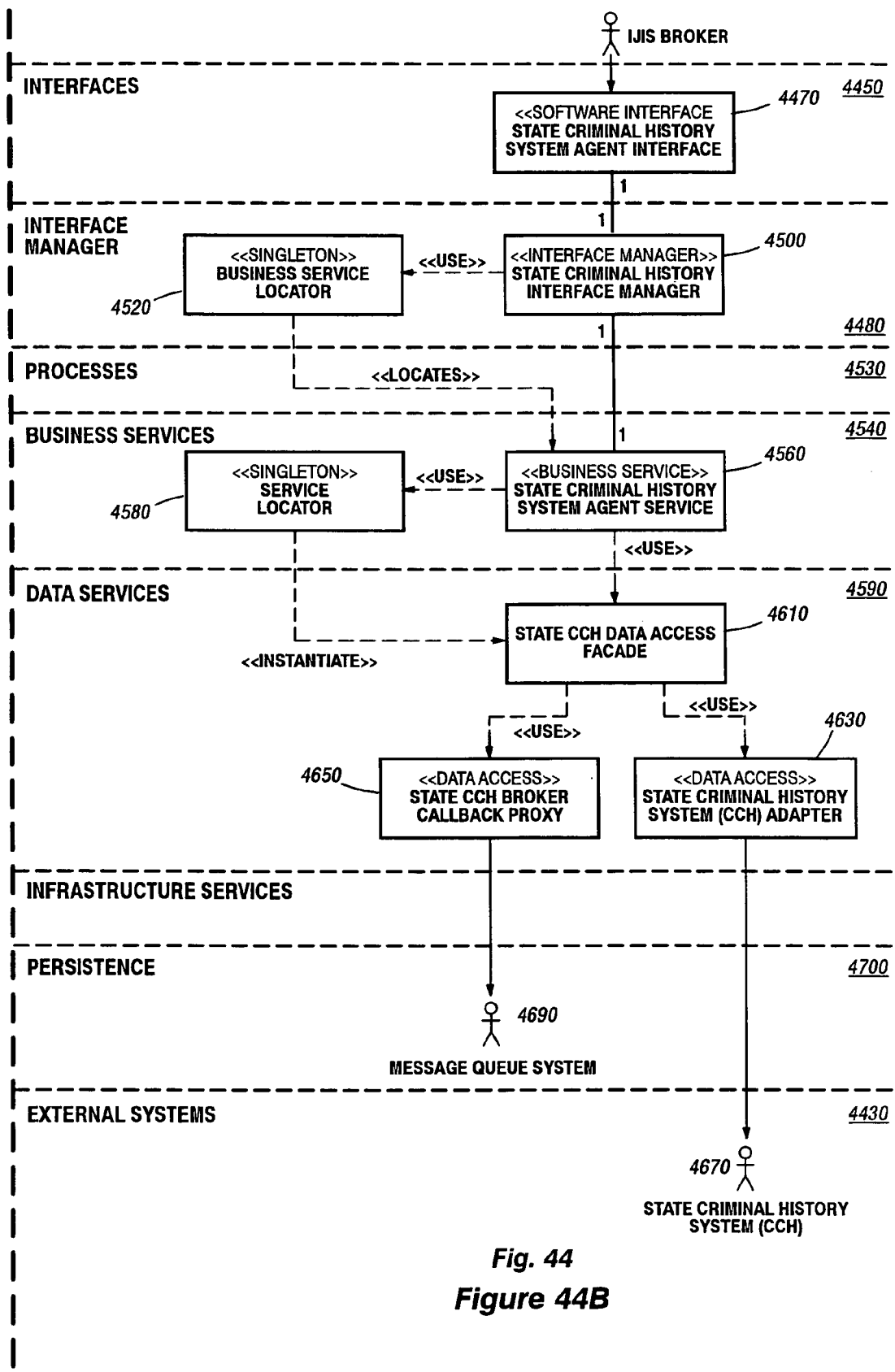

FIG. 44 illustrates the 6 layer structure of the IJIS adaptors/agents 80 for two such agents (state CCH 4430 and state NCIC 4440) within the IJIS system 70. These IJIS adaptors/agents 80 abstract the business interactions with the agency systems. For the most part, IJIS message broker 20 interacts with agency system via IJIS adaptors/agents 80 as described above. As also noted above, IJIS message broker 20 may interact with an agency system directly if the agency system has been instrumented to cater to IJIS message broker 20 requests.

Each agent 4430 and 4440 includes an interface layer 4450. The primary client for IJIS adaptors/agents 80 such as state NCIC agent 4430 and state CCH agent 440 is the IJIS message broker 20. Thus, extensive graphical user interface components are not necessary. These agents have corresponding interface components such as State NCIC Message Switch Agent Interface 4460 and State CCH System Agent Interface 4470.

Each agent 4430 and 4440 also includes an interface manager 4480. State NCIC agent 4440 and state CCH agent 4430 have the following components in interface manager layer 4480 that facilitate interaction between the interface and underlying business layer components: State NCIC Message Switch Interface Manager 4490 and State CCH System Interface Manager 4500. Each interacts with a business service locator (4510, 4520) to interact with the business services layer 4540 via process layer 4530.

Business layer components 4540 represent the core of the agents. They encapsulate the business functionality that has been defined in the interface layer components. They are actually responsible for interacting with adapters to retrieve or send information to underlying agency systems. The following are service components in the corresponding agents: State NCIC Message Switch Agent Service 4550 and State CCH System Agent Service 4560. Each interacts with a service locator (4570, 4580) to access data services in the data services layer 4590 via NCIC Data Access Facade 4600 and CCH Data Access Facade 4610, respectively.

Data services layer 4590 includes adapter components (4620, 4630) to access underlying agency systems and broker callback proxies (4640, 4650) for accessing the message queue system (4680, 4690) in the persistence layer 4700. Thus, State NCIC agent 4440 has State NCIC Adapter 4620 to communicate with State NCIC Message switch 4660. These adapters abstract the means of interacting with agency system. For example, State NCIC Adapter 4620 communicates with State NCIC Message switch 4660 such as a Law Enforcement Message Switch (LEMS). LEMS is a message-based "middleware" server connecting disparate law enforcement data system elements. Thus, if State NCIC Message switch 4660 changes, then only State NCIC Adapter 4620 would need to replaced without affecting the entire agent. The same is true for State CCH Adapter 4610 and State CCH system 4670.

FIG. 45 illustrates the IJIS message broker-view of elements of the platform independent model for the Query functionality. These elements provide graphical user presentation for query functionality to users of IJIS message broker 20.

Query Graphical user Interface and Query Interface Manager is used in 'Query Subject Information' functionality described above users of the IJIS system 70 interact with Query Graphical Interfaces 4710, 4720, 4730 to perform searches. The functions of Query Screens are to provide graphical interaction for query criteria, query result and query detailed entities. The Query Graphical user Interface Manager 4740 is responsible for control and navigation of the graphical interface. It is also responsible for session management between screens and pre-population of graphical interfaces. The query interface manager 4740 interacts with underlying business services such as 'Query Service' 4750 to actually perform a query on various systems.

The IJIS Broker Query Service 4750 elements provide the core business functionality of Query. Query Service 4750 is used in Query functionality. Interface, Interface Managers or other services can interact with Query Service 4750 to perform searches on Master Name Index and/or external agency systems via Data Access Facade 4760. Query Service 4750 relies on Query Data Access Facade 4760 to access database, external systems and infrastructure components. As illustrated in FIG. 45, Query Service 4750 performs searches on Master Name Index stored in relational database to retrieve subject identification information and places search requests for subject identification to agency system agents such as State NCIC IJIS Agent via agent proxies. It later also receives responses send by the agents via callbacks. Query Service 4750 also places document information requests to agency system agents such as State CCH IJIS Agent via agent proxies. It later also receives responses send by agents via callbacks. Query Service 4750 further interacts with infrastructure services 4770 such as Auditing and Security for performing audit logs and authorization, respectively.

Query Data Access Facade 4760 is primarily used by Query Service 4750 during execution of Query functionality. Query Data Access Facade 4760 hides complexity of creating and accessing data, infrastructure and external system access components. Other components such as Query Service 4750 can communicate with just Query Data Access Facade 4760 to use several service access components such as security, auditing, external system access proxies such as State NCIC Agent and persistence store access components.

Query Message Interface 4780 and Query Message Managers 4790 work together to abstract asynchronous functionality by loosely coupling Query elements from the underlying asynchronous message queuing system. They also create message packets in format appropriate for the underlying asynchronous message queuing system and provide an interface for other elements to retrieve messages that are placed by IJIS adaptors/agents 80 on the queue as well as an interface for other elements to place messages on underlying asynchronous message queuing systems.

These elements are used during executing of Query functionality. When external systems such as State NCIC, State CCH needs to be searches to identify subject, the Query Message Interface 4780 and Query Message Manager 4790 are used to place search requests for these justice system IJIS adaptors/agents 80. The IJIS adaptors/agents 80 would search underlying agency system and place the search results back on the asynchronous message queues. When these messages arrive for IJIS message broker 20, these message elements are used to retrieve these search results from the asynchronous queue.

FIG. 44 described above illustrates the agent-view of elements of the platform independent model for Query functionality. Operation of this model follows from the above description and will not be further described here.

Platform Specific Model

The platform specific model is a platform specific modification of the platform independent model described above. This model is unique to each implementation and provides the specific hardware structure for the IJIS system implementation on a particular platform such as .NET™ or J2EE™ using the hardware and software tools for these platforms mentioned above.

As noted above, the platform independent model incorporates the analysis model, the use case model and use case specifications, design parameters, and any supplemental design specifications into a framework that is independent of the enterprise platform e.g., .NET™ or J2EE™. In accordance with the invention, the platform independent model described above is converted using platform specific transformation rules into the design constructs of the architecturally critical components (e.g., directory services, security, transactionality, persistence, etc.) of a platform specific model, such as .NET™ or J2EE™. In particular, the platform independent model is mapped to J2EE™-specific or .NET™ specific models by identifying objects targeted for the web model, Enterprise Java™ Bean (EJB) model and data model, as appropriate. This transformation is performed for the entire platform independent model.

FIG. 46 illustrates a platform specific model (PSM) illustrating a view of specific classes for the query functionality of the IJIS message broker 20 implemented on the J2EE™ platform. In FIG. 46, each of the listed functions is a Java™ service that adds a specific behavior which is modified for the PSM implementation. Query Home 4800 is a Java™ class that locates Enterprise Java™ Beans such as Query EJB 4810 as a business enterprise information handler for query-specific implementations 4820. A Query service 4830 is based on a service oriented architecture and is a reusable Java™ service for querying different systems while providing reusable services. Security Manager 4840 and Audit Manager 4850 implement Java™ services as components to provide security and audit related functions, respectively, for the IJIS message broker 20. Server Factory 4860 acts as a container for locating such Java™ services. Callback service 4870 provides a communication mechanism for the IJIS adaptors/agents 80 to communicate with (provide a query to) the IJIS message broker 20. The external systems CCH and NCIC respectively communicate with the IJIS message broker 20 either via interface 4880 for CCH or interface 4890 for NCIC. These interfaces are enabled as web services using CCH web service 4910 implementation and NCIC web service 4920 implementation. The IJIS message broker 20 uses service proxies 4930 or 4940 to communicate with the external agencies. These proxies 4930 and 4940 are also enabled as web services.

FIG. 47 illustrates the interface for the STRUTS Action class of Java™. As illustrated, a Java™ action class 4950 inherits user interface layer components for a query from action class 4960 which, in turn, inherits action class characteristics from STRUTS open source framework elements 4970–5020. Similarly, the STRUTS Action Form class of Java™ inherits a generic display at 5030 from Action Form 5040, which, in turn, extends Action Form classes by adding detail and customized extensions to the Action Form data from elements 5050–5080.

FIG. 48 illustrates generic behavior of a Value Object in a bean 5090 provided to query bean 5100, user bean 5110, query result bean 5120 and subject bean 5130. These beans 5100–5130 act as Value Objects or holders of information as depicted by the name of that bean. All the beans, in turn, inherit generic behavior from the bean 5090. Subject bean 5130, in turn, provides information about a subject to information handler beans 5140–5220 which act as Value Objects or holders of information for different types of information held by external systems as indicated by the name.

Those skilled in the art will appreciate that similar transformations are performed for other functions of the platform independent model to provide specific functionality on a specific platform.

Those skilled in the art also will readily appreciate that many additional modifications are possible in the exemplary embodiment without materially departing from the novel teachings and advantages of the invention. For example, those skilled in the art will appreciate that the invention will create a growing body of UML artifacts and solution assemblies for each system implementation. These elements may be stored in a common repository for a variety of blueprints for different environments. Thus, each implementation will become more flexible, faster and more cost-effective. Accordingly, any such modifications are intended to be included within the scope of this invention as defined by the following exemplary claims.

What is claimed:

1. A platform independent model for exchanging information among numerous entities in a justice system with diverse system components, comprising:

a plurality of software agents, each software agent communicating with a system component of an entity of the justice system, translating from a common communication format to a communication format of the system component of said entity, and managing the timing of a flow of information to/from the system component of said entity;

an information broker that communicates with each agent in the common communication format, determines what information is needed by which entity, and routes the needed information to/from respective agents for the entities that need the information; and a plurality of traceable and linked UML models defining said information broker including at least a business use case model and a platform independent solution model for implementation on a given solution platform.

2. A system as in claim 1, wherein the common communication format is an XML format.

3. A system as in claim 1, wherein an entity obtains a subscription to information relating to at least one of an individual and an event in said system and said information broker routes said information relating to said at least one of an individual and an event to said entity.

4. A system as in claim 1, wherein said information broker notifies predetermined agents that certain information has been received based on business rules implemented by said information broker.

5. A system as in claim 1, wherein said information broker publishes certain information based on business rules implemented by said information broker.

6. A system as in claim 1, wherein said information broker provides an interface to an entity that enables said entity to query other entities in said system for certain information relating to at least one of an individual and an event.

7. A system as in claim 1, wherein said plurality of traceable and linked UML models defining said information broker comprise a software infrastructure model, a hardware infrastructure model, a business use case model, a platform independent model, and a platform specific model that are modifiable and traceable for changes to said justice system.

8. A system as in claim 7, wherein said plurality of traceable and linked UML models defining said information broker further comprise at least one of a business object model, a use case model, and an analysis model for said justice system.

9. A method of creating a platform specific system from a platform independent model for exchanging information among numerous entities in a justice system with diverse system components, comprising the steps of:

creating a plurality of software agents, each software agent communicating with a system component of an entity of the justice system, translating from a common communication format to a communication format of the system component of said entity, and managing the timing of a flow of information to/from the system component of said entity;

creating a plurality of traceable and linked UML models defining an information broker including at least a business use case model and a platform independent solution model for implementation on a given solution platform; and implementing said UML models on said given solution platform as said platform specific system, said platform specific system including said information broker, said information broker communicating with each agent in the common communication format, determining what information is needed by which entity, and routing the needed information to/from respective agents for the entities that need the information.

10. A method as in claim 9, comprising the further step of providing an interface to an entity that enables said entity to query other entities in said justice system for certain information relating to at least one of an individual and an event.

11. A method as in claim 9, wherein said step of creating a plurality of traceable and linked UML models defining said information broker comprise the steps of creating a software infrastructure model, creating a hardware infrastructure model, creating a business use case model, creating a platform independent model, and creating a platform specific model that are modifiable and traceable for changes to said justice system.

12. A method as in claim 11, wherein said step of creating a plurality of traceable and linked UML models defining said information broker further comprise the step of creating at least one of a business object model, a use case model, and an analysis model for said justice system.

* * * * *